(12) United States Patent
Kinbara et al.

(10) Patent No.: US 10,435,509 B2
(45) Date of Patent: Oct. 8, 2019

(54) HETERO TYPE MONODISPERSED POLYETHYLENE GLYCOL, INTERMEDIATE FOR PRODUCTION OF HETERO TYPE MONODISPERSED POLYETHYLENE GLYCOL, METHODS FOR PRODUCING SAME, AND HETERO TYPE MONODISPERSED POLYETHYLENE GLYCOL CONJUGATE

(71) Applicants: TOHOKU TECHNO ARCH CO., LTD., Sendai-shi, Miyagi (JP); NOF CORPORATION, Tokyo (JP)

(72) Inventors: Kazushi Kinbara, Sendai (JP); Takahiro Muraoka, Sendai (JP); Adam Marcin Wawro, Sendai (JP); Tomoyuki Ohtake, Tsukuba (JP); Eui-chul Kang, Tsukuba (JP); Tomoki Uruga, Tsukuba (JP); Ryutaro Imamura, Tsukuba (JP)

(73) Assignees: TOHOKU TECHNO ARCH CO., LTD., Sendai-si, Miyagi (JP); NOF CORPORATION, Tokyo (JP)

( * ) Notice: Subject to any disclaimer, the term of this patent is extended or adjusted under 35 U.S.C. 154(b) by 0 days.

(21) Appl. No.: 15/740,252

(22) PCT Filed: Jun. 29, 2016

(86) PCT No.: PCT/JP2016/069266
§ 371 (c)(1),
(2) Date: Dec. 27, 2017

(87) PCT Pub. No.: WO2017/002853
PCT Pub. Date: Jan. 5, 2017

(65) Prior Publication Data
US 2018/0186931 A1 Jul. 5, 2018

(30) Foreign Application Priority Data
Jun. 30, 2015 (JP) .................................. 2015-131744

(51) Int. Cl.
| | | |
|---|---|---|
| *C08G 65/46* | (2006.01) | |
| *C08G 65/333* | (2006.01) | |
| *C08G 65/334* | (2006.01) | |
| *B01D 11/04* | (2006.01) | |
| *B01D 15/36* | (2006.01) | |
| *C08G 65/48* | (2006.01) | |

(52) U.S. Cl.
CPC .......... *C08G 65/46* (2013.01); *B01D 11/0492* (2013.01); *B01D 15/362* (2013.01); *B01D 15/363* (2013.01); *B01D 15/366* (2013.01); *C08G 65/333* (2013.01); *C08G 65/334* (2013.01); *C08G 65/48* (2013.01); *C08G 2650/50* (2013.01)

(58) Field of Classification Search
USPC ........................................................ 528/492
See application file for complete search history.

(56) References Cited

U.S. PATENT DOCUMENTS

| | | |
|---|---|---|
| 5,672,662 A | 9/1997 | Harris et al. |
| 7,888,536 B2 | 2/2011 | Davis et al. |
| 8,637,711 B2 | 1/2014 | Davis et al. |
| 2005/0171291 A1 | 8/2005 | Kozlowski et al. |
| 2006/0020134 A1 | 1/2006 | Davis et al. |
| 2010/0004428 A1 | 1/2010 | Kozlowski et al. |
| 2012/0276124 A1 | 11/2012 | Bouchard et al. |

FOREIGN PATENT DOCUMENTS

| | | |
|---|---|---|
| JP | 7-48450 A | 2/1995 |
| JP | 2007538111 A | 12/2007 |
| JP | 2009256214 A | 11/2009 |
| JP | 201184632 A | 4/2011 |
| JP | 2013506653 A | 2/2013 |

OTHER PUBLICATIONS

Franco Dosio, et al., "Immunotoxins and Anticancer Drug Conjugate Assemblies: The Role of the Linkage between Components", Toxins 2011, 3, pp. 848-879 (Total 32 pages), doi: 10.3390/toxins3070848.

Robert Y. Zhao, et al., "Synthesis and Evaluation of Hydrophilic Linkers for Antibody—Maytansinoid Conjugates", Journal of Medicinal Chemistry, 2011, 54, pp. 3606-3623 (Total 9 pages).

(Continued)

*Primary Examiner* — Terressa Boykin
(74) *Attorney, Agent, or Firm* — Sughrue Mion, PLLC

(57) ABSTRACT

A hetero type monodispersed polyethylene glycol containing a compound represented by the following formula (1):

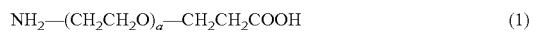

$$NH_2-(CH_2CH_2O)_a-CH_2CH_2COOH \qquad (1)$$

(in the formula (1), a represents an integer from 6 to 40);
wherein any of (A) a chromatogram detected by a differential refractometer when the hetero type monodispersed polyethylene glycol is separated using reverse phase chromatography, (B) a chromatogram detected by a differential refractometer when the hetero type monodispersed polyethylene glycol is separated using cation exchange chromatography, and (C) a chromatogram detected by a differential refractometer when the hetero type monodispersed polyethylene glycol containing a compound represented by the formula (1) shown above is derivatized and separated using anion exchange chromatography satisfy specific relational expressions, respectively.

6 Claims, 12 Drawing Sheets

(56) References Cited

OTHER PUBLICATIONS

Neville Boden, et al., "The Design and Synthesis of Simple Molecular Tethers for Binding Biomembranes to a Gold Surface", Tetrahedron, 1997, vol. 53, No. 31, pp. 10939-10952 (Total 14 pages).
Alister C. French, et al., "High-Purity Discrete PEG-Oligomer Crystals Allow Structural Insight", Angew. Chem. Int. Ed., 2009, 48, pp. 1248-1252 (Total 5 pages), DOI: 10.1002/anie.200804623.
Abderrahim Bouzide, et al., "Silver(I) Oxide Mediated Highly Selective Monotosylation of Symmetrical Diols. Application to the Synthesis of Polysubstituted Cyclic Ethers", Organic Letters, 2002, vol. 4, No. 14, pp. 2329-2332 (Total 4 pages).
Gyorgy Szekely, et al., "Iterative synthesis of monodisperse PEG homostars and linear heterobifunctional PEG", Polymer Chemistry, 2014, 5, pp. 694-697 (Total 4 pages).
International Search Report dated Oct. 4, 2016, issued by the International Searching Authority in counterpart International Application No. PCT/JP2016/069266.
Herzner, et al., "Spacer-separated sialyl LewisX cyclopeptide conjugates as potential E-selectin ligands", Jan. 2007, Carbohydrate Research, vol. 342, Issue No. 3-4, XP 005865374, pp. 541-557.
McReynolds, et al., "Synthesis of Biotinylated Glycoconjugates and Their Use in a Novel ELISA for Direct Comparison of HIV-1 Gp120 Recognition of GalCer and Related Carbohydrate Analogues", Nov. 1999, Bioconjugate Chemistry, vol. 10, Issue 6, XP 055552728, pp. 1021-1031.
Liu, et al., "Impact of PKM Linkers Impact of PKM Linkers on Biodistribution Characteristics of the 99m Tc-Labeled Cyclic RGDfK Dimer", Nov. 2006, Bioconjugate Chemistry, vol. 17, Issue No. 6, XP 055552734, pp. 1499-1507.
Tsvetkov, et al., "Synthesis and Molecular Recognition Studies of the HNK-1 Trisaccharide and Related Oligosaccharides. The Specificity of Monoclonal Anti-HNK-1 Antibodies as Assessed by Surface Piasmon Resonance and STD NMR", Jan. 2012, vol. 134, Issue No. 1, Journal of the American Chemical Society, XP 055111656, pp. 426 435.
Hlzl, et al., "Protein~Resistant Self-Assembled Monolayers on Gold with Latent Aldehyde Functions", May 8, 2007, American Chemical Society, vol. 23, Issue No. 10, XP 009112076, pp. 5571-5577.
Ueda, et al., "The high performance of 3XFLAG for target purification of a bioactive metabolite: A tag combined with a highly effective linker structure", Jan. 2011, Bioorganic & Medical Chemistry Letters, vol. 21, Issue No. 5, XP 028144481, pp. 1359-1362.
Quiles, et al., "Synthesis and Preliminary Biological Evaluation of High-Drug-Load Paclitaxcl-Antibody Conjugates for Tumor-Targeted Chemotherapy", Jan. 2010, Journal of Medical Chemistry, vol. 53, Issue No. 2, XP 055127608, pp. 586-594.
Heister, et al., "Drug loading, dispersion stability, and therapeutic efficacy in targeted drug delivery with carbon nanotubes", Aug. 2011, Carbon, vol. 50, Issue No. 2, XP 028331085, pp. 622-632.
Pearce, et al., "The role of spacers on the self-assembly of DNA aptamer-amphiphiles into micelles and nanotapes", Jan. 2014, Royal Society of Chemistry, Chemical Communications, XP 055552166, 11 pages total.
Vera, et al., "Aplysqualenol A Binds to the Light Chain of Dynein Type 1 (DYNLL1)", Aug. 2011, Angewandte Chemie International Edition, vol. 50, Issue No. 35, Aug. 2011, XP 009510980, pp. 8134-8138.
Communication dated Feb. 18, 2019, issued by the European Patent Office in counterpart European Patent Application No. 16817961.2.

HETERO TYPE MONODISPERSED POLYETHYLENE GLYCOL, INTERMEDIATE FOR PRODUCTION OF HETERO TYPE MONODISPERSED POLYETHYLENE GLYCOL, METHODS FOR PRODUCING SAME, AND HETERO TYPE MONODISPERSED POLYETHYLENE GLYCOL CONJUGATE

TECHNICAL FIELD

The present invention relates to a hetero type monodispersed polyethylene glycol, an intermediate for production of the hetero type monodispersed polyethylene glycol, methods for producing the same, and a hetero type monodispersed polyethylene glycol conjugate. More particularly, it relates to a hetero type monodispersed polyethylene glycol, which is used for modification of a biofunctional polymer; a drug or a drug carrier in a drug delivery system; a material or device for diagnosis and the like and in particular, which is useful as a linker material for antibody-drug conjugate.

BACKGROUND ART

In recent years, an antibody-drug conjugate (Antibody-Drug Conjugate: ADC), in which a drug and an antibody are connected through a linker and which is capable of actively transporting the drug to an antigen-presenting cell, is practically used and has attracted high attention in the field of pharmaceuticals (Toxins, 2011, 3, p. 848-883 (Non-Patent Document 1), J. Med. Chem., 2011, 54, p. 3606-3623 (Non-Patent Document 2)).

One of the linker materials for ADC which have been utilized is a hetero type monodispersed polyethylene glycol. The hetero type monodispersed polyethylene glycol is a monodispersed polyethylene glycol, which contains as a main component, a hetero type polyethylene glycol having functional groups different from each other at both terminals thereof and has a definite molecular weight.

In the ADC, since an antibody and a drug are separately conjugated to each of the terminals of the hetero type polyethylene glycol as a linker, when a compound having the mutually same functional groups at the both terminals (homo type polyethylene glycol or the like) is present as an impurity in the hetero type monodispersed polyethylene glycol, a compound having two antibodies conjugated or a compound having two drugs conjugated is generated. The compound having two antibodies conjugated does not exhibit the effect of ADC because the drug is not conjugated. The compound having two drugs conjugated is transported to a position other than the antigen-presenting cell to be a cause of side effects because the antibody is not conjugated. Further, the same problems as described above also arise in the case where other hetero type compound having a different combination of functional groups from the desired combination of functional groups is present as an impurity, because a compound losing either the desired antibody or the desired drug is generated. Therefore, from the standpoint of use and effect of the drug, it can be said to be important that the hetero type monodispersed polyethylene glycol contains only one kind of hetero type polyethylene glycol having the different functional groups each other at the both terminals thereof in high purity.

Further, in recent years, for the purpose of increasing the effect of ADC, it has been attempted to use ADC in which a plurality of drugs are conjugated to an antibody. In the production of such ADC, the number of the drugs conjugated is ordinarily confirmed by using a mass spectrometer and HPLC. Therefore, when a compound having a different ethylene glycol chain length is present as an impurity in the hetero type monodispersed polyethylene glycol which is used as the linker material, a problem arises on the production in that the confirmation thereof becomes difficult. In addition, when the compound having a different ethylene glycol chain length is present as an impurity, there is a problem in that since the equivalents of the antibody and drug to be added in the production of ADC become uncertain, it is necessary to use excess amount of the expensive antibody and drug, and there is a problem in that since the compound having a different ethylene glycol chain length is treated as a different compound from the main agent at the time of drug application, identification of the compound, implementation of various tests, evaluation of permissible amount and the like are further required. Therefore, it can be said to be important that the hetero type monodispersed polyethylene glycol contains only one kind of polyethylene glycol having the same ethylene glycol chain length in high purity.

Thus, it has been desired for the hetero type monodispersed polyethylene glycol used as the linker material for ADC to contain as the main component, a compound of a hetero type polyethylene glycol having functional groups different from each other at both terminals thereof, in which the ethylene glycol chain length of the hetero type polyethylene glycol is the same, in particularly high purity.

Further, as the functional group, for example, a maleimide group or an iodoacetamide group, each of which reacts with a thiol group of antibody, drug or the like; a carboxyl group, an active ester group, an active carbonate group or an aldehyde group, each of which reacts with an amino group of antibody, drug or the like; an amino group, which reacts with a carboxyl group of antibody, drug or the like; or an azido group or an alkynyl group, each of which is used in a click reaction is used. Among them, since a hetero type polyethylene glycol having an amino group and a carboxyl group at each terminal is able to be used as it is, as the linker for ADC and is also able to be used as a raw material for functional group transformation, it is a useful compound as the hetero type monodispersed polyethylene glycol.

As the method for producing the hetero type monodispersed polyethylene glycol, a method containing a terminal functionalization step and an extension step of ethylene glycol chain length by Williamson ether syntheses is exemplified. For example, in U.S. Pat. No. 5,672,662 (Patent Document 1) or Japanese National Publication of International Patent Application No. 2007-538111 (Patent Document 2), a method of introducing a carboxyl group into a terminal of monomethoxypolyethylene glycol is disclosed. In Patent Document 1, monomethoxypolyethylene glycol and acrylonitrile are reacted by Michael addition reaction, the nitrile is converted to an amide under conditions of concentrated hydrochloric acid, and the amide is hydrolyzed under conditions of an aqueous potassium hydroxide solution, thereby introducing a carboxyl group. However, the purity and the yield are insufficient, because under the conditions of such strong acid and strong base, a compound having a hydroxyl group instead of a carboxyl group is generated by a reverse reaction of the Michael addition reaction or a compound having a short ethylene glycol chain length is generated by cleavage of the ethylene glycol chain. As to the purity, in the comparative example of Patent Document 2, the result of performing double check is described and it is confirmed to generate a compound without a methoxy group at the terminal. On the other hand, in Patent Document 2, monomethoxypolyethylene glycol and tert-butyl acrylate are reacted by Michael addition reaction and a carboxyl group is introduced under conditions of trifluoroacetic acid. However, in the technique described in the document, the introduction ratio of tert-butyl acrylate is low as 70% or less and a problem arises in that a compound having a hydroxyl group at the terminal remains.

Further, in the methods described in Patent Documents 1 and 2, monomethoxypolyethylene glycol is used as the raw material and in the case of using the reaction described above, a compound having a short ethylene glycol chain length and a compound having a hydroxyl group instead of a carboxyl group at the terminal are also generated as impurities in the case of obtaining a hetero type monodispersed polyethylene glycol. When the hetero type monodispersed polyethylene glycol containing such impurities is used in the production of ADC, the problem arises on the production of ADC described above based on the compound having a short ethylene glycol chain length and a compound losing either the antibody or the drug is generated due to the compound having a hydroxyl group at the terminal to cause decrease in effectiveness as drug.

Further, for example, the difference between the compound having a hydroxyl group at the terminal and the desired compound having a carboxyl group at the terminal resides only in the structure of the terminal so that it is difficult to perform separation and purification. In Patent Document 2, although the resulting product is purified using anion exchange chromatography, there is a problem from the standpoint of convenience and yield, because the method using anion exchange chromatography is a low versatility purification method and the yield decreases further.

Moreover, in the case of producing a hetero type monodispersed polyethylene glycol containing a hetero type polyethylene glycol having an ethylene glycol chain length of 5 or more, an extension reaction of the ethylene glycol chain length by Williamson ether synthesis is ordinarily necessary. This is because triethylene glycol or tetraethylene glycol, in which the ethylene glycol chain length is 4 or less, is able to be subjected to distillation purification so that the raw material having purity of 98% or more is available, but the compound having an ethylene glycol chain length of 5 or more cannot be subjected to distillation purification so that it is difficult to obtain a high purity product at a low cost. It is known that during the extension reaction of the ethylene glycol chain length by Williamson ether synthesis, by-products are generated by the side reaction. For example, as described in Tetrahedron, 1997, 53, p. 10939-10952 (Non-Patent Document 3), a compound having an ethylene glycol chain length less than the ethylene glycol chain length of the desired compound by 1 due to elimination of ethylene glycol is generated and compounds different in the ethylene glycol chain length and the terminal functional groups are generated by E2 elimination. In fact, in Angew. Chem. Int. Ed., 2009, 48, p. 1248-1252 (Non-Patent Document 4), it is described that a compound having an ethylene glycol chain length less than the ethylene glycol chain length of the desired compound by 1 due to elimination of ethylene glycol is generated in a yield of 3% at the time of Williamson ether synthesis. When a hetero type monodispersed polyethylene glycol is produced using a mixture containing such a compound having an ethylene glycol chain length less than the ethylene glycol chain length of the desired compound by 1, the hetero type monodispersed polyethylene glycol obtained contains the compound having an ethylene glycol chain length less than the ethylene glycol chain length of the desired main component by 1 as an impurity. Therefore, when such a hetero type monodispersed polyethylene glycol is used in the production of ADC, the problem arises on the production of ADC described above. The compounds having the ethylene glycol chain length different from each other are difficult to perform separation and purification because of similarity in the structure of the compounds, and as described in Non-Patent Document 4, it is necessary to perform multiple times of reverse phase chromatography or the like.

Further, in order to produce the hetero type polyethylene glycol having functional groups different from each other at the both terminals thereof, it is useful to use an intermediate for the production of a hetero type monodispersed polyethylene glycol having a protective group or a leaving group at one terminal and a hydroxyl group at the other terminal. As a method of obtaining such an intermediate, for example, in Org. Lett., 2002, 4, p. 2329-2332 (Non-Patent Document 5), a method in which tetraethylene glycol or hexaethylene glycol is used as a starting material and one terminal thereof is selectively tosylated using silver oxide is disclosed and it is described that a one terminal tosylated compound can be efficiently obtained by using silver oxide. However, this method has a problem in that a compound having tosyl groups at both terminals is generated in a yield of several percent.

Moreover, in Polym. Chem., 2014, 5, p. 694-697 (Non-Patent Document 6), synthesis of a one terminal Dmtr compound having an ethylene glycol chain length of 8 is disclosed. A part of the synthetic route is represented by following formula:

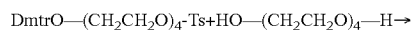

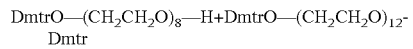

(in the formula, Dmtr represents a 4,4'-dimethoxytrityl group.)

In Non-Patent Document 6, it is described that in the case of obtaining a one terminal Dmtr octamer by a 1:1 reaction of a one terminal tosyl compound with tetraethylene glycol, a both terminal Dmtr dodecamer by a 2:1 reaction of a one terminal tosyl compound with tetraethylene glycol is generated. However, when a hetero type polyethylene glycol having an amino group and a carboxyl group at both terminals respectively is synthesized using a mixture containing such a compound having a tosyl group and a Dmtr group at both terminals, a compound having amino groups at both terminals or a compound having carboxyl groups at both terminals is generated as an impurity. Therefore, when the hetero type monodispersed polyethylene glycol containing such an impurity is used in the production of ADC, a compound having two drugs conjugated or a compound having two antibodies conjugated is generated to cause decrease in effectiveness as drug.

On the other hand, as a method of evaluating the purity of the hetero type monodispersed polyethylene glycol, methods using $^1$H-NMR measurement, MS measurement, HPLC measurement and the like are exemplified. However, since a plurality of impurities are contained in the case of producing the hetero type monodispersed polyethylene glycol according to a known production method as described above, it can be said that it is difficult to evaluate the purity.

For example, in the case where a compound having amino groups at both terminals and a compound having an amino group and a hydroxyl group at both terminals respectively are intermixed in the hetero type monodispersed polyethylene glycol containing as a main component, a hetero type polyethylene glycol having an amino group and a carboxyl group at both terminals respectively, since an α-position proton of the hydroxyl group is overlap with the ethylene glycol chain and cannot be distinguished in $^1$H-NMR measurement, the content of the compound having an amino group and a hydroxyl group at both terminals respectively cannot be measured, and accordingly, it is also difficult to identify the content of the compound having amino groups at both terminals. Further, in MS measurement, although it is possible to identify a plurality of impurities, there is a problem of low quantitativity, because the efficiency of ionization varies depending on structure of the compound. Although it is possible to quantify by synthesizing a standard compound of the impurity and preparing a calibration curve, it is difficult that all of compounds including compounds having different ethylene glycol chain lengths and compounds having different combinations of the terminal functional groups are synthesized and quantified. Moreover, in HPLC measurement, it is possible to quantify if all impurities can be separated, but in the case where a plurality of compounds having different ethylene glycol chain lengths and compounds having different combinations of the terminal functional groups are present, the separation of these compounds is difficult.

Thus, it is difficult to evaluate the purity of the hetero type monodispersed polyethylene glycol and conventional evaluation methods have a problem in that as to the hetero type monodispersed polyethylene glycol, it is difficult to accurately measure the content of a compound in which the different combination of the functional groups at the both terminals from the desired compound and the content of a compound in which the different ethylene glycol chain length from the desired compound.

PRIOR ART DOCUMENTS

Patent Documents

Patent Document 1: U.S. Pat. No. 5,672,662
Patent Document 2: Japanese National Publication of International Patent Application No. 2007-538111

Non-Patent Documents

Non-Patent Document 1: Toxins, 2011, 3, p. 848-883
Non-Patent Document 2: J. Med. Chem., 2011, 54, p. 3606-3623
Non-Patent Document 3: Tetrahedron, 1997, 53, p. 10939-10952
Non-Patent Document 4: Angew. Chem. Int. Ed., 2009, 48, p. 1248-1252
Non-Patent Document 5: Org. Lett., 2002, 4, p. 2329-2332
Non-Patent Document 6: Polym. Chem., 2014, 5, p. 694-697

SUMMARY OF THE INVENTION

Problems to be Solved by the Invention

The invention has been made in view of the problems involved in the prior art described above, and an object of the invention is to provide a hetero type monodispersed polyethylene glycol containing as a main component, a hetero type polyethylene glycol which has an amino group and a carboxyl group at both terminals respectively, and in which the ethylene glycol chain length is the same in high purity, an intermediate for production of the hetero type monodispersed polyethylene glycol and a hetero type monodispersed polyethylene glycol conjugate, and production methods for easily obtaining the hetero type monodispersed polyethylene glycol and the intermediate for production of the hetero type monodispersed polyethylene glycol.

Means for Solving the Problems

As a result of the intensive investigations to achieve the object described above, the inventors have found that a hetero type monodispersed polyethylene glycol containing as a main component, one kind of hetero type polyethylene glycol which has an amino group and a carboxyl group at both terminals respectively, and in which the ethylene glycol chain length is the same in particularly high purity can be obtained only with a simple separatory extraction and without using a purification method, for example, column chromatography or the like by combining synthesis steps in a specific order in the synthesis of a hetero type polyethylene glycol having an amino group and a carboxyl group at both terminals respectively. Further, the inventors have found that an intermediate for production of the hetero type polyethylene glycol can be obtained in high yield only with a simple separatory extraction and without using a purification method, for example, column chromatography or the like by combining synthesis steps in a specific order to complete the invention. That is, the invention provides [1] to [9] described below.

[1]
A hetero type monodispersed polyethylene glycol containing a compound represented by formula (1) shown below:

$$NH_2-(CH_2CH_2O)_a-CH_2CH_2COOH \qquad (1)$$

(in the formula (1), a represents an integer from 6 to 40);
Wherein (A) when the hetero type monodispersed polyethylene glycol is separated by using reverse phase chromatography, on a chromatogram detected by a differential refractometer, when a straight line connecting from an elution start point to an elution end point is taken as $baseL_1$, a total peak area derived from polyethylene glycol above the $baseL_1$ is taken as $areaA_1$, a height of a top $P_{1top}$ of a maximum refractive index difference peak $P_1$ from the $baseL_1$ is taken as $P_{1top}H$, on an elution curve on the $P_1$ directed from the elution start point to the $P_{1top}$, a straight line connecting a point where a height from the $baseL_1$ is ¼ of the $P_{1top}H$ with a point where a height from the $baseL_1$ is ¾ of the $P_{1top}H$ is taken as $P_1L_a$, an elution time at which the $P_1L_a$ and the $baseL_1$ are crossed is taken as $T_1a$, on an elution curve on the $P_1$ directed from the $P_{1top}$ to the elution end point, a straight line connecting a point where a height from $baseL_1$ is ¼ of the $P_{1top}H$ with a point where a height from $baseL_1$ is ¾ of the $P_{1top}H$ is taken as $P_1L_b$, an elution time at which the $P_1L_b$ and the $baseL_1$ are crossed is taken as $T_1b$, and a peak area between $T_1a$ and $T_1b$ above the $baseL_1$ is taken as $areaP_1$, the $areaA_1$ and the $areaP_1$ satisfy a condition represented by formula (F1) shown below:

$$areaP_1/areaA_1 \geq 0.90 \qquad (F1)$$

(B) when the hetero type monodispersed polyethylene glycol is separated by using cation exchange chromatography, on a chromatogram detected by a differential refractometer, when a straight line connecting from an elution start point to an elution end point is taken as $baseL_2$, a total peak area derived from polyethylene glycol above the $baseL_2$ is taken as $areaA_2$, a height of a top $P_{2top}$ of a maximum refractive index difference peak $P_2$ from the $baseL_2$ is taken as $P_{2top}H$, on an elution curve on the $P_2$ directed from the elution start point to the $P_{2top}$, a straight line connecting a point where a height from the $baseL_2$ is ½ of the $P_{2top}H$ with a point where a height from the $baseL_2$ is ⅛ of the $P_{2top}H$ is taken as $P_2L$, an elution time at which the $P_2L$ and the $baseL_2$ are crossed is taken as $T_2$, and a peak area between the elution start point and $T_2$ above the $baseL_2$ is taken as $areaB_2$, the $areaB_2$ and the $areaA_2$ satisfy a condition represented by formula (F2) shown below:

$$areaB_2/areaA_2 \leq 0.02 \tag{F2}$$

and (C) when the hetero type monodispersed polyethylene glycol containing the compound represented by the formula (1) is derivatized to form a mixture containing a compound represented by formula (2) shown below:

tBoc-NH—(CH$_2$H$_2$CH$_2$O)$_a$—CH$_2$CH$_2$COOH (2)

(in the formula (2), tBoc represents a tert-butoxycarbonyl group, and a represents an integer from 6 to 40) and the mixture is separated by using anion exchange chromatography, on a chromatogram detected by a differential refractometer, when a straight line connecting from an elution start point to an elution end point is taken as $baseL_3$, a total peak area derived from polyethylene glycol above the $baseL_3$ is taken as $areaA_3$, a height of a top $P_{3top}$ of a maximum refractive index difference peak $P_3$ from the $baseL_3$ is taken as $P_{3top}H$, on an elution curve on the $P_3$ directed from the elution start point to the $P_{3top}$, a straight line connecting a point where a height from the $baseL_3$ is ½ of the $P_{3top}H$ with a point where a height from the $baseL_3$ is ⅛ of the $P_{3top}H$ is taken as $P_3L$, an elution time at which the $P_3L$ and the $baseL_3$ are crossed is taken as $T_3$, and a peak area between the elution start point and $T_3$ above the $baseL_3$ is taken as $areaB_3$, the $areaB_3$ and the $areaA_3$ satisfy a condition represented by formula (F3) shown below:

$$areaB_3/areaA_3 \leq 0.02 \tag{F3}$$

[2]

A method for producing the hetero type monodispersed polyethylene glycol as recited in [1] comprising:

step A of obtaining a compound represented by formula (5) shown below by Michael addition reaction of a compound represented by formula (3) shown below with a compound represented by formula (4) shown below under temperature condition of 5° C. or less:

TsO—(CH$_2$CH$_2$O)$_a$—H (3)

(in the formula (3), Ts represents a tosyl group, and a represents an integer from 6 to 40)

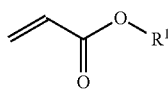
(4)

(in the formula (4), $R^1$ represents a hydrocarbon group having from 1 to 6 carbon atoms)

TsO—(CH$_2$CH$_2$O)$_a$—CH$_2$CH$_2$—COOR$^1$ (5)

(in the formula (5), Ts represents a tosyl group, $R^1$ represents a hydrocarbon group having from 1 to 6 carbon atoms, and a represents an integer from 6 to 40);

step B of obtaining a compound represented by formula (6) shown below by a reaction of the compound represented by the formula (5) with potassium phthalimide:

PI—(CH$_2$CH$_2$O)$_a$—CH$_2$CH$_2$—COOR$^1$ (6)

(in the formula (6), PI represents a phthalimido group, $R^1$ represents a hydrocarbon group having from 1 to 6 carbon atoms, and a represents an integer from 6 to 40);

step C of obtaining a compound represented by formula (7) shown below by dephthalimidation of the compound represented by the formula (6):

H$_2$N—(CH$_2$CH$_2$O)$_a$—CH$_2$CH$_2$—COOR$^1$ (7)

(in the formula (7), $R^1$ represents a hydrocarbon group having from 1 to 6 carbon atoms, and a represents an integer from 6 to 40);

and step D of obtaining the hetero type monodispersed polyethylene glycol containing the compound represented by the formula (1) by subjecting a reaction product containing the compound represented by the formula (7) obtained in the step C to separatory extraction treatment and acid hydrolysis treatment.

[3]

The method for producing the hetero type monodispersed polyethylene glycol as recited in [2], wherein a in each of the formulae (3) and (5) to (7) is an integer from 6 to 10, the step D is a step of performing the acid hydrolysis treatment after the separatory extraction treatment, the separatory extraction treatment is a treatment including washing step (w1) of performing an acid washing treatment in which the reaction product containing the compound represented by the formula (7) is dissolved in an aqueous acidic solution and the solution is subjected to separatory washing with an organic solvent and after the washing step (w1), extraction step (e1) of performing separatory extraction of the compound represented by the formula (7), and the acid hydrolysis treatment is a treatment of obtaining the hetero type monodispersed polyethylene glycol containing the compound represented by the formula (1) by acid hydrolysis of the compound represented by the formula (7).

[4]

The method for producing the hetero type monodispersed polyethylene glycol as recited in [2], wherein a in each of the formulae (3) and (5) to (7) is an integer from 11 to 40, the step D is a step of performing the separatory extraction treatment after the acid hydrolysis treatment, the acid hydrolysis treatment is a treatment of obtaining a reaction product containing the compound represented by the formula (1) by acid hydrolysis of the compound represented by the formula (7) in the reaction product, and the separatory extraction treatment is a treatment including washing step (w2) of performing an acid washing treatment in which the reaction product containing the compound represented by the formula (1) is dissolved in an aqueous acidic solution and the solution is subjected to separatory washing with an organic solvent and a base washing treatment in which the reaction product containing the compound represented by the formula (1) is dissolved in an aqueous basic solution and the solution is subjected to separatory washing with an organic solvent and after the washing step (w2), extraction step (e2) of performing separatory extraction of the hetero type monodispersed polyethylene glycol containing the compound represented by the formula (1).

[5]

An intermediate for production of a hetero type monodispersed polyethylene glycol containing a compound represented by formula (3) shown below:

TsO—(CH$_2$CH$_2$O)$_a$—H (3)

(in the formula (3), Ts represents a tosyl group, and a represents an integer from 6 to 40) wherein (D) when the intermediate is separated by using reverse phase chromatography, on a chromatogram detected by a differential refractometer,
when a straight line connecting from an elution start point to an elution end point is taken as $baseL_4$, a total peak area derived from polyethylene glycol above the $baseL_4$ is taken as $areaA_4$, a height of a top $P_{4top}$ of a maximum refractive index difference peak $P_4$ from the $baseL_4$ is taken as $P_{4top}H$, on an elution curve on the $P_4$ directed from the elution start point to the $P_{4top}$, a straight line connecting a point where a height from the $baseL_4$ is ¼ of the $P_{4top}H$ with a point where a height from the $baseL_4$ is ¾ of the $P_{4top}H$ is taken as $P_4L_a$, an elution time at which the $P_4L_a$ and the $baseL_4$ are crossed is taken as $T_4a$, on an elution curve on the $P_4$ directed from the $P_{4top}$ to the elution end point, a straight line connecting a point where a height from $baseL_1$ is ¼ of the $P_{4top}H$ with a point where a height from $baseL_4$ is ¾ of the $P_{4top}H$ is taken as $P_4L_b$, an elution time at which the $P_4L_b$ and the $baseL_4$ are crossed is taken as $T_4b$, and a peak area between $T_4a$ and $T_4b$ above the $baseL_4$ is taken as $areaP_4$, the $areaA_4$ and the $areaP_4$ satisfy a condition represented by formula (F4) shown below:

$$areaP_4/areaA_4 \geq 0.92 \tag{F4}$$

[6]

A method for producing the intermediate for production of the hetero type monodispersed polyethylene glycol as recited in [5] comprising:
step a of obtaining a compound represented by formula (10) shown below by subjecting a compound represented by formula (8) shown below and a compound represented by formula (9) shown below to a nucleophilic substitution reaction so as to satisfy a condition represented by formula (F5) shown below:

$$HO\text{—}(CH_2CH_2O)_b\text{—}H \tag{8}$$

(in the formula (8), b represents an integer from 3 to 37)

$$LO\text{—}(CH_2CH_2O)_c\text{—}R^2 \tag{9}$$

(in the formula (9), L represents a tosyl group or a mesyl group, $R^2$ represents a trityl group or a benzyl group, and c represents an integer from 3 to 37)

$$6 \leq b+c \leq 40 \tag{F5}$$

(in the formula (F5), b represents b in the formula (8), and c represents c in the formula (9))

$$HO\text{—}(CH_2CH_2O)_a\text{—}R^2 \tag{10}$$

(in the formula (10), $R^2$ represents a trityl group or a benzyl group, and a represents an integer from 6 to 40);
step b of obtaining a compound represented by formula (11) shown below by tosylation of the compound represented by the formula (10):

$$TsO\text{—}(CH_2CH_2O)_a\text{—}R^2 \tag{11}$$

(in the formula (11), Ts represents a tosyl group, $R^2$ represents a trityl group or a benzyl group, and a represents an integer from 6 to 40);
step c of obtaining the compound represented by the formula (3) by detritylation or debenzylation of the compound represented by the formula (11); and
step d of obtaining the intermediate for production of the hetero type monodispersed polyethylene glycol by performing purification of the reaction product containing the compound represented by the formula (3) obtained in the step c.
[7]

A hetero type monodispersed polyethylene glycol which is obtained by using the hetero type monodispersed polyethylene glycol as recited in [1] and contains a compound represented by formula (12) shown below:

$$X\text{—}(CH_2CH_2O)_a\text{—}CH_2CH_2\text{—}Y \tag{12}$$

(in the formula (12), X and Y each represents an atomic group containing a functional group capable of forming a covalent bond with a functional group present in a biofunctional molecule, the functional group contained in the atomic group X and the functional group contained in the atomic group Y are different from each other, and a represents an integer from 6 to 40).
[8]

The hetero type monodispersed polyethylene glycol as recited in [7], wherein the functional group contained in the atomic group X in the formula (12) is one kind functional group selected from the group consisting of a maleimide group, an azide group, an alkynyl group and an iodoacetamide group, and the functional group contained in the atomic group Y in the formula (12) is one kind functional group selected from the group consisting of a carboxyl group and an active ester group.
[9]

A hetero type monodispersed polyethylene glycol conjugate which is obtained by using the hetero type monodispersed polyethylene glycol as recited in [1] or the hetero type monodispersed polyethylene glycol as recited in any one of [7] and [8] and in which a biofunctional molecule is conjugated to the compound represented by the formula (1) or the compound represented by the formula (12).

Advantage of the Invention

According to the invention, it is possible to provide a hetero type monodispersed polyethylene glycol containing as a main component, a hetero type polyethylene glycol which has an amino group and a carboxyl group at both terminals respectively, and in which the ethylene glycol chain length is the same in high purity, an intermediate for production of the hetero type monodispersed polyethylene glycol and a hetero type monodispersed polyethylene glycol conjugate, and production methods which can easily obtain the hetero type monodispersed polyethylene glycol and the intermediate for production of the hetero type monodispersed polyethylene glycol.

MODE FOR CARRYING OUT THE INVENTION

Figure 1:
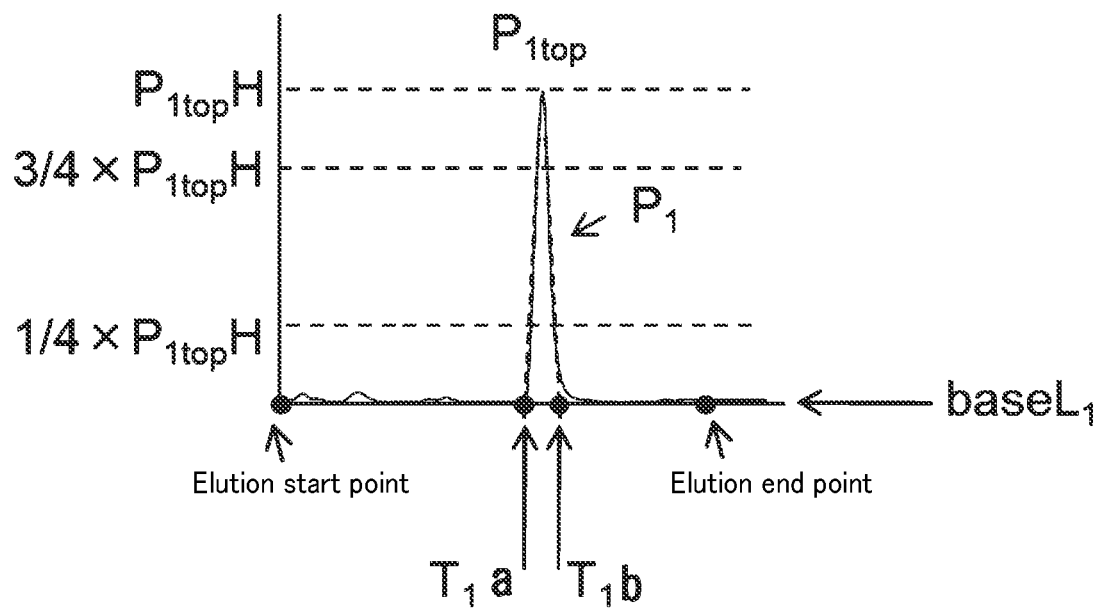
FIG. 1 is a schematic diagram of a chromatogram obtained by using (A) reverse phase chromatography according to the invention.

Preferred embodiments of the invention will be described in detail hereinafter. The hetero type monodispersed polyethylene glycol is characterized by satisfying specific conditions in chromatograms obtained by separating using (A) reverse phase chromatography, (B) cation exchange chromatography, and (C) anion exchange chromatography.

<Hetero Type Monodispersed Polyethylene Glycol>

In the invention, the hetero type monodispersed polyethylene glycol indicates a monodispersed polyethylene glycol, which contains as a main component, a hetero type polyethylene glycol having functional groups different from each other at the both terminals and has a definite molecular weight. In the invention, a compound represented by formula (1) shown below (hetero type polyethylene glycol) is contained as the main component.

$$NH_2-(CH_2CH_2)_a-CH_2CH_2COOH \quad (1)$$

In formula (1), a represents an integer from 6 to 40, and from the standpoint of using as a linker for ADC, a is preferably an integer from 6 to 24. The hetero type monodispersed polyethylene glycol of the invention contains the compound represented by formula (1) in which the ethylene glycol chain length (that is a value of a) is the same (hetero type polyethylene glycol) in high purity, and specifically, it satisfies the specific conditions described below on chromatograms detected by a differential refractometer when separated by using (A) reverse phase chromatography, (B) cation exchange chromatography, and (C) anion exchange chromatography.

In the invention, hereinafter, the term "chromatogram detected by a differential refractometer" means a chromatogram in which a vertical axis (y axis) indicates a signal intensity obtained from a differential refractometer as a detector and a horizontal axis (x axis) indicates elution time (column retention time), respectively. Further, the term "elution start point" indicates elution time at which a sample having passed through a column of chromatography is first detected by a detector, and the term "elution end point" indicates elution time at which the sample having passed through the column is finally detected by a detector.

Moreover, in the chromatogram, the term "peak derived from polyethylene glycol" indicates a peak except for peaks caused by components other than the sample, for example, a developing solvent and pseudo-peaks due to fluctuation of the base line caused by the column and apparatus used. The peaks caused by the developing solvent or the like and the pseudo-peaks due to fluctuation of the base line caused by the column and apparatus used can be identified by performing measurement by injection of only the developing solvent containing no sample into the column.

In the invention, the term "polyethylene glycol" indicate a compound having an ethylene glycol chain represented by the following formula: $-(CH_2CH_2O)_n-$ (n represents a positive integer), and includes, for example, in addition to the compound represented by formula (1), intermediates and impurities described later, for example, a compound represented by formula (1), wherein the amino group ($NH_2$) is replaced with a carboxyl group (COOH), a hydrogen atom, a halogen atom or other functional group; a compound represented by formula (1), wherein the carboxyl group is replaced with an amino group, a hydrogen atom, a halogen atom or other functional group; and a compound wherein a in formula (1) is an integer other than 6 to 40. The other functional group described above is not particularly limited, and includes a hydroxyl group, a tosyl group (Ts), a mesyl group (Ms), a phthalimide group, a trityl group (Trt), a benzyl group (Bn), a group represented by TsO, a group represented by MsO, a group represented by TrtO, a group represented by BnO, a group represented by COOR (R represents a hydrocarbon group) and a tert-butoxycarbonyl group (tBoc). The halogen atom described above includes a chlorine atom.

<(A) Reverse Phase Chromatography>

As to the hetero type monodispersed polyethylene glycol of the invention, when it is separated by using reverse phase chromatography, on the chromatogram detected by a differential refractometer, when a straight line connecting from an elution start point to an elution end point is taken as $baseL_1$, the total peak area derived from polyethylene glycol above the $baseL_1$ is taken as $areaA_1$, the height of the top $P_{1top}$ of the maximum refractive index difference peak $P_1$ from the $baseL_1$ is taken as $P_{1top}H$, on the elution curve on the $P_1$ directed from the elution start point to the $P_{1top}$, a straight line connecting a point where the height from the $baseL_1$ is ¼ of the $P_{1top}H$ with a point where the height from the $baseL_1$ is ¾ of the $P_{1top}H$ is taken as $P_1L_a$, the elution time at which the $P_1L_a$ and the $baseL_1$ are crossed is taken as $T_1a$, on the elution curve on the $P_1$ directed from the $P_{1top}$ to the elution end point, a straight line connecting a point where the height from $baseL_1$ is ¼ of the $P_{1top}H$ with a point where the height from $baseL_1$ is ¾ of the $P_{1top}H$ is taken as $P_1L_b$, the elution time at which the $P_1L_b$ and the $baseL_1$ are crossed is taken as $T_1b$, and a peak area between $T_1a$ and $T_1b$ above the $baseL_1$ is taken as $areaP_1$, the $areaA_1$ and the $areaP_1$ satisfy the condition represented by formula (F1) shown below.

$$areaP_1/areaA_1 \geq 0.90 \tag{F1}$$

On the chromatogram described above, the "maximum refractive index difference peak $P_1$" is a peak including the peak derived from the compound represented by formula (1) (hetero type polyethylene glycol). It is confirmed by performing measurement under the same conditions except for using a mass spectrometer in place of the differential refractometer as the detector that the maximum refractive index difference peak is a peak including the peak derived from the compound represented by formula (1).

In FIG. 1, a schematic diagram of a chromatogram detected by a differential refractometer when the hetero type monodispersed polyethylene glycol is separated using reverse phase chromatography. When a sample solution is injected and developed in a reverse phase column, the compounds contained in the sample solution are eluted in order from a compound having higher hydrophilicity. A straight line connecting from an elution start point to an elution end point is taken as $baseL_1$, and the total peak area above the $baseL_1$ is taken as $areaA_1$. Next, the top of the maximum refractive index difference peak $P_1$ is taken as $P_{1top}$, and the height of the top $P_{1top}$ from the $baseL_1$ is taken as $P_{1top}H$. On the elution curve on the $P_1$ directed from the elution start point to the $P_{1top}$, a straight line connecting a point where the height from the $baseL_1$ is ¼ of the $P_{1top}H$ with a point where the height from the $baseL_1$ is ¾ of the $P_{1top}H$ is taken as $P_1L_a$, and the elution time at which the $P_1L_a$ and the $baseL_1$ are crossed is taken as $T_1a$. Further, on the elution curve on the $P_1$ directed from the $P_{1top}$ to the elution end point, a straight line connecting a point where the height from the $baseL_1$ is ¼ of the $P_{1top}H$ with a point where the height from the $baseL_1$ is ¾ of the $P_{1top}H$ is taken as $P_1L_b$, and the elution time at which the $P_1L_b$ and the $baseL_1$ are crossed is taken as $T_1b$. A peak area between $T_1a$ and $T_1b$ above the $baseL_1$ is taken as $areaP_1$.

As to the hetero type monodispersed polyethylene glycol of the invention, the $areaP_1/areaA_1$ obtained in this manner is 0.90 or more. Since the value of $areaA_1$ represents the total peak area derived from polyethylene glycol and the value of $areaP_1$ represents the peak area of the maximum refractive index difference peak $P_1$, in the case where the maximum refractive index difference peak $P_1$ is the peak derived only from the compound represented by formula (1), the value of $areaP_1/areaA_1$ corresponds to the content of the compound represented by formula (1). Additionally, in the case where impurities which cannot be separated by reverse phase chromatography, for example, a compound having an ethylene glycol chain length different by one from that of the desired compound represented by formula (1) or a compound having different functional groups at the terminals partially from the desired compound represented by formula (1) are contained in the hetero type monodispersed polyethylene glycol, there is a case in which the content of these compounds is also included in the value of $areaP_1/areaA_1$.

The value of areaP$_1$/areaA$_1$ is preferably 0.94 or more when a is from 6 to 24, and is preferably 0.90 or more when a is from 25 to 40. As to the hetero type monodispersed polyethylene glycol of the invention, since the number of production steps is increased along with the increase in the value of a in formula (1), the content of the compound having an ethylene glycol chain length different from that of the desired compound represented by formula (1) tends to increase. In the case where the value of areaP$_1$/areaA$_1$ is less than the lower limit described above, since the content of the impurity, for example, the compound having an ethylene glycol chain length different from that of the compound represented by formula (1), the compound having different combination of functional groups at the terminals from the compound represented by formula (1) increases, when such a hetero type monodispersed polyethylene glycol is used as a linker material for ADC, the problems, in that the difficulty of confirmation of the number of drugs conjugated, in that the unclearly of drug addition amount, and in that the superfluous evaluations are required at the time of drug application arise, and a compound losing either the antibody or the drug is generated to cause decrease in effectiveness as drug.

In the invention, the measurement conditions of the reverse phase chromatography are described below.
Equipment: build GPC system HLC-8220, produced by Tosoh Corp.
Detector: RI-8020, produced by Tosoh Corp.
Column: TSKgel ODS-80 Ts (particle diameter: 5 Gm, column size: 4.6 mm×25 cm), produced by Tosoh Corp.
Flow rate: 0.6 mL/min
Sample volume: 0.2 mg/g, 40 μL In addition, in the case where a in the compound represented by formula (1) is from 6 to 10, the measurement conditions are as follows.
Developing solvent: 5 mM ammonium acetate in methanol/distilled water=25/75 Column temperature: 40° C.

In the case where a in the compound represented by formula (1) is from 11 to 20, the measurement conditions are as follows.
Developing solvent: 5 mM ammonium acetate in methanol/distilled water=30/70
Column temperature: 40° C.

In the case where a in the compound represented by formula (1) is from 21 to 40, the measurement conditions are as follows.
Developing solvent: 5 mM ammonium acetate in methanol/distilled water=50/50
Column temperature: 45° C.

<(B) Cation Exchange Chromatography>

As to the hetero type monodispersed polyethylene glycol of the invention, when it is separated by using cation exchange chromatography, on the chromatogram detected by a differential refractometer, when a straight line connecting from an elution start point to an elution end point is taken as baseL$_2$, the total peak area derived from polyethylene glycol above the baseL$_2$ is taken as AreaA$_2$, the height of the top P$_{2top}$ of the maximum refractive index difference peak P$_2$ from the baseL$_2$ is taken as P$_{2top}$H, on the elution curve on the P$_2$ directed from the elution start point to the P$_{2top}$, a straight line connecting a point where the height from the baseL$_2$ is ½ of the P$_{2top}$H with a point where the height from the baseL$_2$ is ⅛ of the P$_{2top}$H is taken as P$_2$L, the elution time at which the P$_2$L and the baseL$_2$ are crossed is taken as T$_2$, and a peak area between the elution start point and T$_2$ above the baseL$_1$ is taken as areaB$_2$, the areaB$_2$ and the areaA$_2$ satisfy the condition represented by formula (F2) shown below.

$$\mathrm{areaB}_2/\mathrm{areaA}_2 \leq 0.02 \tag{F2}$$

On the chromatogram described above, the "maximum refractive index difference peak P$_2$" is a peak including the peak derived from the compound represented by formula (1) (hetero type polyethylene glycol). It is confirmed by performing measurement under the same conditions except for using a mass spectrometer in place of the differential refractometer as the detector that the maximum refractive index difference peak is a peak including the peak derived from the compound represented by formula (1).

Figure 2:
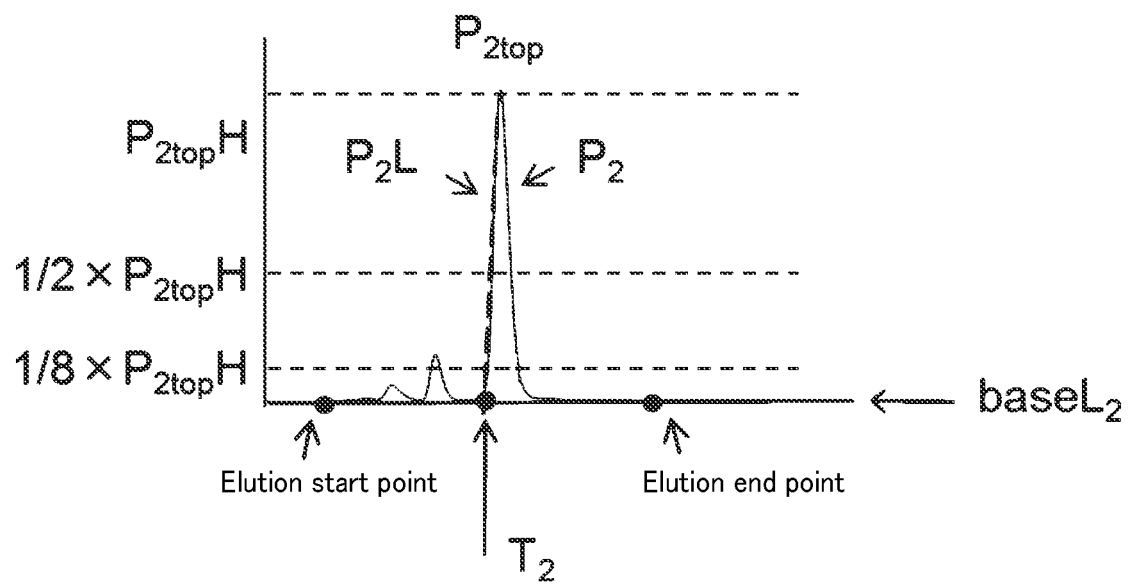
FIG. 2 is a schematic diagram of a chromatogram obtained by using (B) cation exchange chromatography according to the invention.

In FIG. 2, a schematic diagram of a chromatogram detected by a differential refractometer when the hetero type monodispersed polyethylene glycol is separated using cation exchange chromatography. When a sample solution is injected and developed in a cation exchange column, of the compounds contained in the sample solution, compounds having no amino group are eluted first and then compounds having an amino group are eluted. A straight line connecting from an elution start point to an elution end point is taken as baseL$_2$, and the total peak area above the baseL$_2$ is taken as AreaA$_2$. Next, the top of the maximum refractive index difference peak P$_2$ is taken as P$_{2top}$, and the height of the top P$_{2top}$ from the baseL$_2$ is taken as P$_{2top}$H. On the elution curve on the P$_2$ directed from the elution start point to the P$_{2top}$, a straight line connecting a point where the height from the baseL$_2$ is ½ of the P$_{2top}$H with a point where the height from the baseL$_2$ is ⅛ of the P$_{2top}$H is taken as P$_2$L, and the elution time at which the P$_2$L and the baseL$_2$ are crossed is taken as T$_2$. A peak area between the elution start point and T$_2$ above the baseL$_2$ is taken as areaB$_2$.

As to the hetero type monodispersed polyethylene glycol of the invention, the areaB$_2$/areaA$_2$ obtained in this manner is 0.02 or less, and preferably 0.01 or less. Since the value of areaB$_2$/areaA$_2$ is a ratio of a peak eluting before the maximum refractive index difference peak P$_2$ including the peak derived from the compound represented by formula (1), it corresponds to the content of impurities mainly having no amino group as the terminal functional group in the invention. The impurities having no amino group include, for example, polyethylene glycol having a carboxyl group in place of the amino group in formula (1) and polyethylene glycol having a hydroxyl group in place of the amino group in formula (1). In the case where the value of areaB$_2$/areaA$_2$ exceeds the upper limit described above, since the content of the impurities having no amino group increases, when such a hetero type monodispersed polyethylene glycol is used as a linker material for ADC, a compound losing either the antibody or the drug is generated to cause decrease in effectiveness as drug.

In the invention, the measurement conditions of the cation exchange chromatography are described below.
Equipment: build GPC system HLC-8220, produced by Tosoh Corp.
Detector: RI-8020, produced by Tosoh Corp.
Column: TSKgel SP-2SW (particle diameter: 5 μm, column size: 4.6 mm×25 cm), produced by Tosoh Corp.
Developing solvent: 5 mM ammonium acetate in methanol/distilled water=10/90
Flow rate: 0.6 mL/min
Column temperature: 30° C.
Sample volume: 0.2 mg/g, 20 μL <(C) Anion Exchange Chromatography>

As to the hetero type monodispersed polyethylene glycol of the invention, when the hetero type monodispersed polyethylene glycol containing the compound represented by formula (1) is derivatized to from a mixture containing a compound represented by formula (2) shown below:

$$\text{tBoc-NH}-(CH_2CH_2O)_a-CH_2CH_2COOH \quad (2)$$

(in formula (2), tBoc represents a tert-butoxycarbonyl group, and a represents an integer from 6 to 40) and the mixture is separated by using anion exchange chromatography, on the chromatogram detected by a differential refractometer, when a straight line connecting from an elution start point to an elution end point is taken as $baseL_3$, the total peak area derived from polyethylene glycol above the $baseL_3$ is taken as $AreaA_3$, the height of the top $P_{3top}$ of the maximum refractive index difference peak $P_3$ from the $baseL_3$ is taken as $P_{3top}H$, on the elution curve on the $P_3$ directed from the elution start point to the $P_{3top}$, a straight line connecting a point where the height from the $baseL_3$ is ½ of the $P_{3top}H$ with a point where the height from the $baseL_3$ is ⅛ of the $P_{3top}H$ is taken as $P_3L$, the elution time at which the $P_3L$ and the $baseL_3$ are crossed is taken as $T_3$, and a peak area between the elution start point and $T_3$ above the $baseL_3$ is taken as $areaB_3$, the $areaB_3$ and the $areaA_3$ satisfy the condition represented by formula (F3) shown below.

$$areaB_3/areaA_3 \leq 0.02 \quad (F3)$$

As a method for derivatizing the hetero type monodispersed polyethylene glycol containing the compound represented by formula (1) to the mixture containing the compound represented by formula (2), known methods can be used. For example, the compound represented by formula (2) can be obtained from the compound represented by formula (1) by dissolving the hetero type monodispersed polyethylene glycol containing the compound represented by formula (1) in water, adding sodium hydroxide as a base thereto, and then adding di-tert-butyl dicarboxylate thereto, followed by allowing to react. The mixture containing the compound represented by formula (2) can be obtained after the reaction, for example, by adjusting pH 4 or below with hydrochloric acid or the like, adding sodium chloride to saturation, and being subjected to separatory extraction using chloroform or dichloromethane. In the invention, the derivatization is required to perform sufficiently until the compound represented by the formula (1) disappears. The disappearance of the compound represented by the formula (1) can be confirmed by measurement using a mass spectrometer.

In the chromatogram described above, the "maximum refractive index difference peak $P_3$" is a peak including the peak derived from the compound represented by formula (2). It is confirmed by performing measurement under the same conditions except for using a mass spectrometer in place of the differential refractometer as the detector that the maximum refractive index difference peak is a peak including the peak derived from the compound represented by formula (2).

Figure 3:
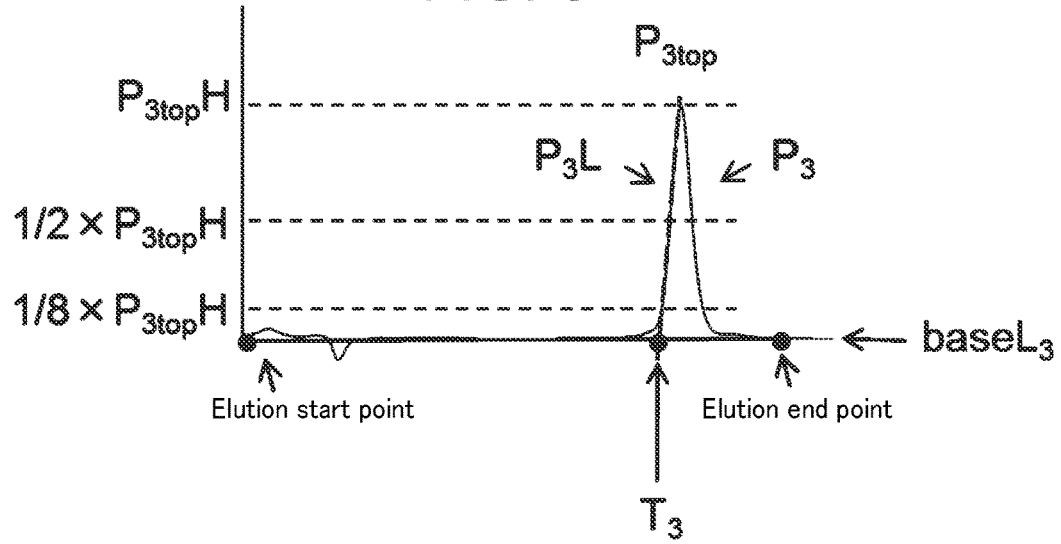
FIG. 3 is a schematic diagram of a chromatogram obtained by using (C) anion exchange chromatography according to the invention.

In FIG. 3, a schematic diagram of a chromatogram detected by a differential refractometer when the mixture containing the compound represented by formula (2) is separated using anion exchange chromatography. When a sample solution is injected and developed in an anion exchange column, of the compounds contained in the sample solution, compounds having no carboxyl group are eluted first and then compounds having a carboxyl group are eluted. A straight line connecting from an elution start point to an elution end point is taken as $baseL_3$, and the total peak area above the $baseL_3$ is taken as $AreaA_3$. Next, the top of the maximum refractive index difference peak $P_3$ is taken as $P_{3top}$, and the height of the top $P_{3top}$ from the $baseL_3$ is taken as $P_{3top}H$. On the elution curve on the $P_3$ directed from the elution start point to the $P_{3top}$, a straight line connecting a point where the height from the $baseL_3$ is ½ of the $P_{3top}H$ with a point where the height from the $baseL_3$ is ⅛ of the $P_{3top}H$ is taken as $P_3L$, and the elution time at which the $P_3L$ and the $baseL_3$ are crossed is taken as $T_3$. A peak area between the elution start point and $T_3$ above the $baseL_2$ is taken as $areaB_3$.

As to the hetero type monodispersed polyethylene glycol of the invention, the $areaB_3/areaA_3$ obtained in this manner is 0.02 or less, and preferably 0.01 or less. Since the value of $areaB_3/areaA_3$ is a ratio of a peak eluting before the maximum refractive index difference peak $P_3$ including the peak derived from the compound represented by formula (2), it corresponds to the content of impurities mainly having no carboxyl group as the terminal functional group in the invention. The impurities having no carboxyl group include, for example, polyethylene glycol having a group represented by t-Boc-NH in place of the carboxylic group in formula (2) and polyethylene glycol having a hydroxyl group in place of the carboxylic group in formula (2). In the case where the value of $areaB_3/areaA_3$ exceeds the upper limit described above, since the content of the impurities having no carboxylic group increases, when such a hetero type monodispersed polyethylene glycol is used as a linker material for ADC, a compound losing either the antibody or the drug is generated to cause decrease in effectiveness as drug.

In the invention, the measurement conditions of the anion exchange chromatography are described below.
Equipment: build GPC system HLC-8220, produced by Tosoh Corp.
Detector: RI-8020, produced by Tosoh Corp.
Column: TSKgel DEAE-2SW (particle diameter: 5 μm, column size: 4.6 mm×25 cm), produced by Tosoh Corp.
Developing solvent: 5 mM ammonium acetate in methanol/distilled water=10/90
Flow rate: 0.6 mL/min
Column temperature: 30° C.
Sample volume: 0.2 mg/g, 30 μL <Method for Producing Hetero Type Monodispersed Polyethylene Glycol>

The hetero type monodispersed polyethylene glycol satisfying the specific conditions described above of the invention can be obtained by the method for producing the hetero type monodispersed polyethylene glycol of the invention. The method for producing the hetero type monodispersed polyethylene glycol of the invention is characterized by containing step A, step B, step C and step D shown below.

[Step A]

Step A according to the invention is a step of obtaining a compound represented by formula (5) shown below by Michael addition reaction of a compound represented by formula (3) shown below with a compound represented by formula (4) shown below under temperature condition of 5° C. or less.

$$TsO-(CH_2CH_2O)_a-H \quad (3)$$

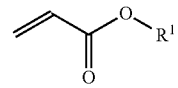

(4)

$$TsO-(CH_2CH_2O)_a-CH_2CH_2-COOR^1 \quad (5)$$

In formula (3), Ts represents a tosyl group, and a represents an integer from 6 to 40. In formula (4), $R^1$ represents a hydrocarbon group having from 1 to 6 carbon atoms. The hydrocarbon group having from 1 to 6 carbon atoms specifically includes a methyl group, an ethyl group, a propyl group, an isopropyl group, a butyl group, a tert-butyl group, an isobutyl group and a sec-butyl group. From the standpoint of stability under basic conditions, $R^1$ is preferably an isopropyl group or a tert-butyl group. In formula (5), Ts represents a tosyl group, $R^1$ represents a hydrocarbon group having from 1 to 6 carbon atoms, and a represents an integer from 6 to 40. The Ts in formula (5) is derived from the Ts in formula (3), and the $R^1$ in formula (5) is derived from the $R^1$ in formula (4).

As the compound represented by formula (3), that obtained by an appropriate known synthesis method can be used, and from the standpoint that the hetero type monodispersed polyethylene glycol satisfying the specific conditions described above of the invention is easily available, it is preferred to use an intermediate for production of the hetero type monodispersed polyethylene glycol described later as a material containing the compound represented by formula (3).

The Michael addition reaction can be performed in a solvent. The solvent is not particularly limited as long as it does not react with the compound represented by formula (3) and the compound represented by formula (4), and includes, for example, an organic solvent, for example, tetrahydrofuran, acetonitrile, chloroform, dichloromethane or toluene, and a mixture thereof. The use amount of the solvent is ordinarily from 1 to 100 times, preferably from 3 to 50 times, most preferably from 5 to 30 times, in a weight ratio, with respect to the compound represented by formula (3). In the case where the use amount of the solvent is less than the lower limit described above, the compounds represented by formula (3) are liable to react with each other, and on the other hand, in the case where the use amount of the solvent exceeds the upper limit described above, the progress of the Michael addition reaction tends to be slow.

In the Michael addition reaction, the use amount of the compound represented by formula (4) is ordinarily from 2 to 50 times, preferably from 5 to 25 times, in a molar ratio, with respect to the use amount of the compound represented by formula (3). In the case where the use amount of the compound represented by formula (4) is less than the lower limit described above, there is a possibility that the Michael addition reaction does not complete, and on the other hand, in the case where the use amount of the compound represented by formula (4) exceeds the upper limit described above, a side reaction of generating a polymer of the compound represented by formula (4) is liable to occur.

In the Michael addition reaction, a base catalyst is used. As to the base catalyst, there is no problem as long as it proceeds with the reaction. For example, an inorganic catalyst, for example, sodium hydroxide or potassium hydroxide is exemplified, and among them, potassium hydroxide is preferred and from the standpoint of reactivity, powdery potassium hydroxide is more preferred. The use amount of the base catalyst is ordinarily from 0.1 to 10 times, preferably from 0.5 to 5 times, in a molar ratio, with respect to the compound represented by formula (3).

The reaction temperature of the Michael addition reaction is ordinarily 10° C. or less, preferably 5° C. or less, and most preferably 0° C. or less. In the case where the reaction temperature exceeds the upper limit described above, the compounds represented by formula (3) are liable to react with each other. Further, the reaction time of the Michael addition reaction may vary according to the conditions, for example, the reaction temperature or the base catalyst and ordinarily it is preferably approximately from 0.2 to 12 hours.

In step A, the reaction product containing the compound represented by formula (5) can be obtained by the Michael addition reaction. Although the reaction product may be used as it is without purification in the next step B or may be used after purification of the compound represented by formula (5), for example, by silica gel column chromatography, separatory extraction treatment or adsorbent treatment, in the invention, even without purification by silica gel column chromatography, the hetero type monodispersed polyethylene glycol of the invention of high purity can be obtained.

[Step B]

Step B according to the invention is a step of obtaining a compound represented by formula (6) shown below by a reaction of the compound represented by formula (5) with potassium phthalimide.

$$PI—(CH_2CH_2O)_a—CH_2CH_2—COOR^1 \quad (6)$$

In formula (6), PI represents a phthalimido group, $R^1$ represents a hydrocarbon group having from 1 to 6 carbon atoms, and a represents an integer from 6 to 40. The hydrocarbon group having from 1 to 6 carbon atoms is derived from the RI in the compound represented by formula (5) and has the same meaning as the $R^1$ in formula (4).

The reaction in step B can be performed in a solvent. The solvent is not particularly limited as long as it does not react with the compound represented by formula (5) and potassium phthalimide, and includes, for example, an organic solvent, for example, tetrahydrofuran, acetonitrile, chloroform or dimethylformamide (DMF), and a mixture thereof. Among them, from the standpoint of reaction rate, tetrahydrofuran, DMF or acetonitrile is preferred. The use amount of the solvent is ordinarily from 1 to 100 times, preferably from 3 to 50 times, most preferably from 5 to 30 times, in a weight ratio, with respect to the compound represented by formula (5).

In step B, the use amount of the potassium phthalimide is ordinarily from 1.1 to 10 times, preferably from 1.5 to 5 times, in a molar ratio, with respect to the compound represented by formula (5). In the case where the use amount of the potassium phthalimide is less than the lower limit described above, there is a possibility that the reaction does not complete, and on the other hand, in the case where the use amount of the potassium phthalimide exceeds the upper limit described above, the unreacted potassium phthalimide remains so that it becomes necessary to remove it.

The reaction temperature in step B may vary according to the solvent used and is ordinarily from 10 to 100° C. Further, the reaction time of step B may vary according to the condition of the reaction temperature and ordinarily it is preferably approximately from 1 to 24 hours.

In step B, the reaction product containing the compound represented by formula (6) can be obtained by the reaction. Although the reaction product may be used as it is without purification in the next step C or may be used after purification of the compound represented by formula (6), for example, by silica gel column chromatography, separatory extraction treatment or adsorbent treatment, in the invention, even without purification by silica gel column chromatography, the hetero type monodispersed polyethylene glycol of the invention can be obtained in high purity.

[Step (C)]

Step (C) according to the invention is a step of obtaining a compound represented by formula (7) shown below by dephthalimidation of the compound represented by formula (6).

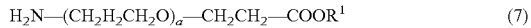

$$H_2N-(CH_2H_2CH_2O)_a-CH_2CH_2-COOR^1 \qquad (7)$$

In formula (7), $R^1$ represents a hydrocarbon group having from 1 to 6 carbon atoms, and a represents an integer from 6 to 40. The hydrocarbon group having from 1 to 6 carbon atoms is derived from the $R^1$ in the compound represented by formula (6) and has the same meaning as the $R^1$ in formula (4).

The dephthalimidation reaction can be performed in a solvent. The solvent is not particularly limited as long as it does not react with the compound represented by formula (6) and the compound represented by formula (7), and includes, for example, a solvent, for example, water, methanol, ethanol, isopropanol, tetrahydrofuran, acetonitrile or chloroform, and a mixture thereof. Among them, methanol or ethanol is preferred. The use amount of the solvent is ordinarily from 1 to 100 times, preferably from 3 to 50 times, most preferably from 5 to 30 times, in a weight ratio, with respect to the compound represented by formula (6). In the case where the use amount of the solvent is less than the lower limit described above, the phthalic acid deprotected deposits and the stirring is liable to be difficult, and on the other hand, in the case where the use amount of the solvent exceeds the upper limit described above, the progress of the reaction tends to be slow.

The dephthalimidation reaction is performed in the presence of a base compound. As to the base compound, there is no problem as long as it proceeds with the reaction. For example, an inorganic base, for example, sodium hydroxide or potassium hydroxide; and a primary amine, for example, hydrazine monohydrate or ethylenediamine are exemplified. Among them, from the standpoint of suppressing the side reaction, a primary amine having a weak basicity, for example, hydrazine monohydrate or ethylenediamine is preferred. The use amount of the base compound may vary according to the kind of the base compound used and is ordinarily from 1.0 to 20 times, preferably from 2.0 to 15 times, in a molar ratio, with respect to the compound represented by formula (6).

The reaction temperature of the dephthalimidation reaction may vary according to the base compound and solvent used and is ordinarily from 10 to 100° C. Further, the reaction time of the dephthalimidation reaction may vary according to the conditions, for example, the reaction temperature, and ordinarily it is preferably approximately from 0.5 to 12 hours.

In step C, the reaction product containing the compound represented by formula (7) can be obtained by the dephthalimidation reaction. Although the reaction product may be used as it is without purification in the next step D or may be used after purification of the compound represented by formula (7), for example, by silica gel column chromatography, separatory extraction treatment or adsorbent treatment, in the invention, even without purification by silica gel column chromatography, the hetero type monodispersed polyethylene glycol of the invention can be obtained in high purity.

[Step (D)]

Step D according to the invention is a step of obtaining the hetero type monodispersed polyethylene glycol containing the compound represented by formula (1) by subjecting the reaction product containing the compound represented by formula (7) obtained in the step C to separatory extraction treatment and acid hydrolysis treatment.

Any of the separatory extraction treatment and acid hydrolysis treatment may be performed first, but in the case of producing as the compound represented by formula (1), a compound having a short ethylene glycol chain, specifically, in the case where a in each of formulae (3) and (5) to (7) is an integer from 6 to 10 (hereinafter, referred to as "production I" in some cases), it is preferred to perform the acid hydrolysis treatment after the separatory extraction treatment. On the other hand, in the case of producing a compound having a long ethylene glycol chain as the compound represented by formula (1), specifically, in the case where a in each of formulae (3) and (5) to (7) is an integer from 11 to 40 (hereinafter, referred to as "production II" in some cases), it is preferred to perform the separatory extraction treatment after the acid hydrolysis treatment.

—Acid Hydrolysis Treatment

The acid hydrolysis treatment according to the invention is a treatment of obtaining the compound represented by formula (1) by acid hydrolysis of the compound represented by formula (7). The acid hydrolysis can be performed in a solvent. The solvent includes, for example, a solvent, for example, water, tetrahydrofuran, acetonitrile, chloroform or dichloromethane, and a mixture thereof. Among them, water or dichloromethane is preferred. The use amount of the solvent is ordinarily from 0.5 to 50 times, preferably from 0.8 to 40 times, most preferably from 1 to 30 times, in a weight ratio, with respect to the compound represented by formula (7). In the case where the use amount of the solvent is less than the lower limit described above, due to increase in viscosity the stirring efficiency is liable to be decreased, and on the other hand, in the case where the use amount of the solvent exceeds the upper limit described above, the progress of the reaction tends to be slow.

In the acid hydrolysis, an acid catalyst is used. As to the acid catalyst, there is no problem as long as it proceeds with the reaction. For example, hydrochloric acid, phosphoric acid and trifluoroacetic acid are exemplified. Among them, from the standpoint of suppressing the side reaction, hydrochloric acid is preferred. The use amount of the acid catalyst may vary according to the kind of the acid catalyst used and in the case of using, for example, 1M hydrochloric acid, it is ordinarily from 0.5 to 10 times, in a weight ratio, with respect to the compound represented by formula (7).

The reaction temperature of the acid hydrolysis may vary according to the acid catalyst used and is ordinarily from 10 to 100° C. Further, the reaction time of the acid hydrolysis may vary according to the conditions, for example, the reaction temperature and ordinarily it is preferably approximately from 0.5 to 12 hours.

—Separatory Extraction Treatment

The separatory extraction treatment is a treatment including washing step (w) of performing separatory washing with an organic solvent, and extraction step (e) of performing separatory extraction of the desired compound after the washing step (w).

(Washing Step)

The washing step (w) includes an acid washing treatment in which the desired compound is dissolved in an aqueous acidic solution and the solution is subjected to separatory washing with an organic solvent and a base washing treatment in which the desired compound is dissolved in an aqueous basic solution and the solution is subjected to separatory washing with an organic solvent. As the washing step (w), in the case of production I, washing step (w1) of performing the acid washing treatment in which the reaction product containing the compound represented by formula (7) is dissolved in an aqueous acidic solution and the solution is subjected to separatory washing with an organic solvent is preferred. On the other hand, in the case of production II, washing step (w2) of performing an acid washing treatment in which the reaction product containing the compound represented by formula (1) is dissolved in an aqueous acidic solution and the solution is subjected to separatory washing with an organic solvent and a base washing treatment in which the reaction product containing the compound represented by formula (1) is dissolved in an aqueous basic solution and the solution is subjected to separatory washing with an organic solvent is preferred. In the washing step (w2), any of the acid washing treatment and base washing treatment may be performed first, and from the standpoint that the solvent after the acid hydrolysis treatment can be used as it is as the aqueous acidic solution, it is preferred that the base washing treatment is performed after the acid washing treatment.

The organic solvent used in the washing step (w) includes, for example, ethyl acetate, toluene, chloroform and dichloromethane. From the standpoint of solubility of the impurities, chloroform or dichloromethane is preferred. The use amount of the organic solvent is ordinarily from 2 to 30 times, preferably from 3 to 20 times, in a weight ratio, with respect to the desired compound (the compound represented by formula (7) in the case of production I, or the compound represented by formula (1) in the case of production II). In the case where the use amount of the organic solvent is less than the lower limit described above, the washing efficiency is liable to be decreased, and on the other hand, in the case where the use amount of the organic solvent exceeds the upper limit described above, increase in the washing efficiency is not expected.

As to the aqueous acidic solution used in the acid washing treatment, there is no problem as long as it has acid strength at which the desired compound (the compound represented by formula (7) in the case of production I, or the compound represented by formula (1) in the case of production II) is not decomposed. It is preferably an aqueous acidic solution of pH 5 or less, and, for example, an aqueous hydrochloric acid solution or aqueous ammonium chloride solution, adjusted to pH 3 is exemplified. The use amount of the aqueous acidic solution is ordinarily from 2 to 30 times, preferably from 3 to 20 times, in a weight ratio, with respect to the desired compound (the compound represented by formula (7) in the case of production I, or the compound represented by formula (1) in the case of production II). In the case where the use amount of the aqueous acidic solution is less than the lower limit described above, the desired compound is liable to dissolve in the organic solvent, and on the other hand, in the case where the use amount of the aqueous acidic solution exceeds the upper limit described above, extraction efficiency in the extraction step described below tends to decrease.

As to the aqueous basic solution used in the base washing treatment, there is no problem as long as it has basicity at which the compound represented by formula (1) is not decomposed. It is preferably an aqueous basic solution of pH 8 or more, and, for example, an aqueous sodium hydroxide solution or aqueous potassium hydroxide solution, adjusted to pH 9 is exemplified. The use amount of the aqueous basic solution is ordinarily from 2 to 30 times, preferably from 3 to 20 times, in a weight ratio, with respect to the compound represented by formula (1). In the case where the use amount of the aqueous basic solution is less than the lower limit described above, the compound represented by formula (1) is liable to dissolve in the organic solvent, and on the other hand, in the case where the use amount of the aqueous basic solution exceeds the upper limit described above, extraction efficiency in the extraction step described below decreases.

In the washing step (w), the reaction product containing the desired compound (the compound represented by formula (7) in the case of production I, or the compound represented by formula (1) in the case of production II) is dissolved in the aqueous acidic solution or aqueous basic solution, the organic solvent is added thereto, the mixture is stirred and then the organic solvent is removed to perform separatory washing, thereby dissolving the impurities in the organic solvent and removing. The number of times of performing the separatory washing is not particularly limited, and it is preferred to perform plural times of the separatory washing, while checking the impurities contained in the aqueous solution by thin layer chromatography (TLC), mass spectrometry (MS) measurement or the like.

In the acid washing treatment, a ratio of the organic solvent and the aqueous acidic solution is ordinarily from 0.2 to 3.0, preferably from 0.5 to 2.0, as a value of organic solvent/aqueous acidic solution in a weight ratio. Further, in the base washing treatment, a ratio of the organic solvent and the aqueous basic solution is ordinarily from 0.2 to 3.0, preferably from 0.5 to 2.0, as a value of organic solvent/aqueous basic solution in a weight ratio.

(Extraction Step)

In the extraction step (e), the desired compound is subjected to separatory extraction. As the extraction step (e), in the case of production I, extraction step (e1) of performing separatory extraction of the compound represented by formula (7) after the washing step (w1) is preferred. On the other hand, in the case of production II, extraction step (e2) of performing separatory extraction of the hetero type monodispersed polyethylene glycol containing the compound represented by formula (1) after the washing step (w2) is preferred.

In the extraction step (e), the acid strength of the aqueous solution after the washing step (w) is adjusted and, if desired, the aqueous solution is saturated with salt. Subsequently, an organic solvent is added to the aqueous solution, the mixture is stirred and then the aqueous solution is removed, thereby being able to obtain the desired compound in the organic solvent.

As to the acid strength of the aqueous solution in the extraction step (e), there is no problem as long as it is an acid strength at which the desired compound (the compound represented by formula (7) in the case of production I, or the compound represented by formula (1) in the case of production II) is not decomposed. As to the salt concentration at the time of saturating the aqueous solution with the salt, there is no problem as long as it is a salt concentration at which the desired compound can be extracted with the organic solvent. As such an aqueous solution, for example, an aqueous solution prepared by adding sodium chloride or potassium chloride to an aqueous hydrochloric acid solution adjusted to pH 3 so that the salt concentration is 23% or more. The use amount of the aqueous solution is ordinarily from 2 to 30 times, preferably from 3 to 20 times, in a weight ratio, with respect to the desired compound (the compound represented by formula (7) in the case of production I, or the compound represented by formula (1) in the case of production II). In the case where the use amount of the aqueous solution is less than the lower limit described above, the impurities in the aqueous solution is liable to be extracted in the organic solvent, and on the other hand, in the case where the use amount of the aqueous solution exceeds the upper limit described above, the extraction efficiency tends to decrease.

The organic solvent used in the extraction step (e) includes, for example, ethyl acetate, toluene, chloroform and dichloromethane. From the standpoint of solubility of the desired compound (the compound represented by formula (7) in the case of production I, or the compound represented by formula (1) in the case of production II), chloroform or dichloromethane is preferred. The use amount of the organic solvent is ordinarily from 2 to 30 times, preferably from 3 to 20 times, in a weight ratio, with respect to the desired compound. In the case where the use amount of the organic solvent is less than the lower limit described above, the extraction efficiency is decreased, and on the other hand, in the case where the use amount of the organic solvent exceeds the upper limit described above, increase in the extraction efficiency is not expected.

In the extraction step (e), a ratio of the organic solvent and the aqueous solution is ordinarily from 0.2 to 3.0, preferably from 0.5 to 2.0, as a value of organic solvent/aqueous solution in a weight ratio. Further, the number of times of performing the extraction step (e) is not particularly limited, and it is preferred to perform plural times of the extraction step (e), while checking the compound represented by formula (1) or the compound represented by formula (7) contained in the aqueous solution by TLC, MS measurement or the like.

In step D, the hetero type monodispersed polyethylene glycol containing the compound represented by formula (1) of the invention can be obtained in high purity by subjecting the reaction product containing the compound represented by formula (7) obtained in step (C) to the separatory extraction treatment and the acid hydrolysis treatment. Additionally, by removing water after the hydrolysis treatment in the case of production I and by removing the organic solvent after extraction step (e2) of the separatory extraction treatment in the case of production II, respectively, the hetero type monodispersed polyethylene glycol can be obtained without performing purification by silica gel column chromatography or the like.

<Intermediate for Production of Hetero Type Monodispersed Polyethylene Glycol>

The intermediate for production of the hetero type monodispersed polyethylene glycol according to the invention is a compound used in the production of the hetero type monodispersed polyethylene glycol according to the invention, and contains as the main component, a compound represented by formula (3) shown below.

$$\text{TsO}-(\text{CH}_2\text{CH}_2\text{O})_a-\text{H} \quad (3)$$

In formula (3), Ts represents a tosyl group, and a represents an integer from 6 to 40. The intermediate for production of the hetero type monodispersed polyethylene glycol of the invention contains the compound represented by formula (3) in which the ethylene glycol chain length (that is, a value of a) is the same in high purity, and specifically, it satisfies the specific conditions described below on a chromatogram detected by a differential refractometer when separated by using (D) reverse phase chromatography.

<(D) Reverse Phase Chromatography>

As to the intermediate for production of the hetero type monodispersed polyethylene glycol of the invention, when it is separated by using reverse phase chromatography, on the chromatogram detected by a differential refractometer, when a straight line connecting from an elution start point to an elution end point is taken as base$L_4$, the total peak area derived from polyethylene glycol above the base$L_4$ is taken as area$A_4$, the height of the top $P_{4top}$ of the maximum refractive index difference peak $P_4$ from the base$L_4$ is taken as $P_{4top}H$, on the elution curve on the $P_4$ directed from the elution start point to the $P_{4top}$, a straight line connecting a point where the height from the base$L_4$ is ¼ of the $P_{4top}H$ with a point where the height from the base$L_4$ is ¾ of the $P_{4top}H$ is taken as $P_4L_a$, the elution time at which the $P_4L_a$ and the base$L_4$ are crossed is taken as $T_4a$, on an elution curve on the $P_4$ directed from the $P_{4top}$ to the elution end point, a straight line connecting a point where the height from base$L_4$ is ¼ of the $P_{4top}H$ with a point where the height from base$L_4$ is ¾ of the $P_{4top}H$ is taken as $P_4L_b$, the elution time at which the $P_4L_b$ and the base$L_4$ are crossed is taken as $T_4b$, and a peak area between $T_4a$ and $T_4b$ above the base$L_4$ is taken as area$P_4$, the area$A_4$ and the area$P_4$ satisfy the condition represented by formula (F4) shown below.

$$\text{area}P_4/\text{area}A_4 \geq 0.92 \quad (F4)$$

On the chromatogram described above, the "maximum refractive index difference peak $P_4$" is a peak including the peak derived from the compound represented by formula (3). It is confirmed by performing measurement under the same conditions except for using a mass spectrometer in place of the differential refractometer as the detector that the maximum refractive index difference peak is a peak including the peak derived from the compound represented by formula (3).

Figure 4:
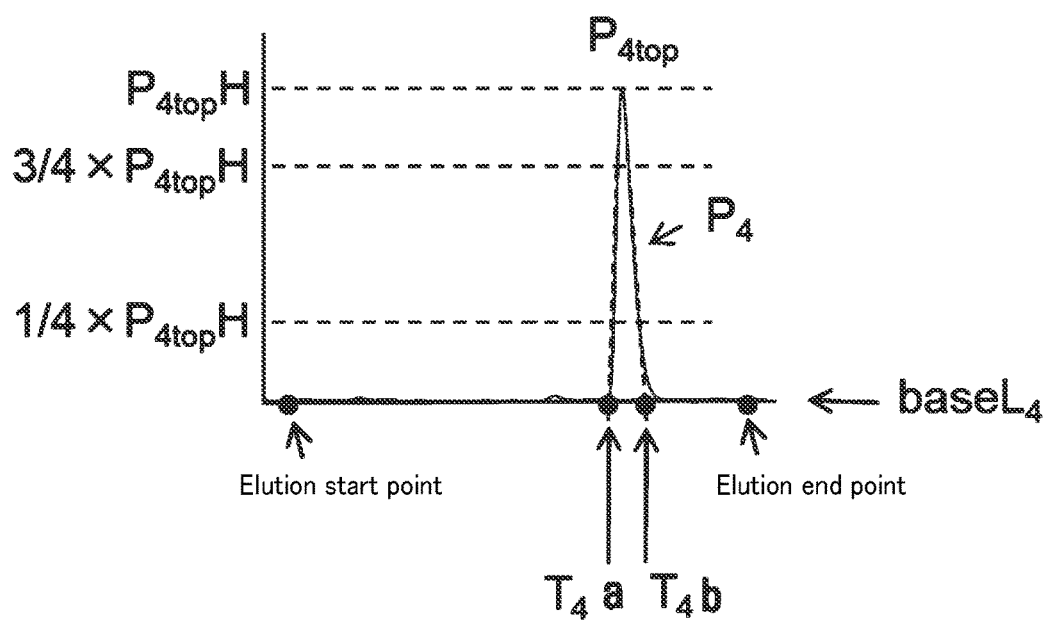
FIG. 4 is a schematic diagram of a chromatogram obtained by using (D) reverse phase chromatography according to the invention.

In FIG. 4, a schematic diagram of a chromatogram detected by a differential refractometer when the intermediate for production of the hetero type monodispersed polyethylene glycol is separated using reverse phase chromatography. When a sample solution is injected and developed in a reverse phase column, the compounds contained in the sample solution are eluted in order from a compound having higher hydrophilicity. A straight line connecting from an elution start point to an elution end point is taken as base$L_4$, and the total peak area above the base$L_4$ is taken as area$A_4$. Next, the top of the maximum refractive index difference peak $P_4$ is taken as $P_{4top}$, and the height of the top $P_{4top}$ from the base$L_4$ is taken as $P_{4top}H$. On the elution curve on the $P_4$ directed from the elution start point to the $P_{4top}$, a straight line connecting a point where the height from the base$L_4$ is ¼ of the $P_{4top}H$ with a point where the height from the base$L_4$ is ¾ of the $P_{4top}H$ is taken as $P_4L_a$, and the elution time at which the $P_4L_a$ and the base$L_4$ are crossed is taken as $T_4a$. Further, on the elution curve on the $P_4$ directed from the $P_{4top}$ to the elution end point, a straight line connecting a point where the height from the base$L_4$ is ¼ of the $P_{4top}H$ with a point where the height from the base$L_4$ is ¾ of the $P_{4top}H$ is taken as $P_4L_b$, and the elution time at which the $P_4L_b$ and the base$L_4$ are crossed is taken as $T_4b$. A peak area between $T_4a$ and $T_4b$ above the base$L_4$ is taken as area$P_4$.

As to the intermediate for production of the hetero type monodispersed polyethylene glycol of the invention, the area$P_4$/area$A_4$ obtained in this manner is 0.92 or more. Since the value of area$A_4$ represents the total peak area derived from polyethylene glycol and the value of area$P_4$ represents the peak area of the maximum refractive index difference peak $P_4$, in the case where the maximum refractive index difference peak $P_4$ is the peak derived only from the compound represented by formula (3), the value of area$P_4$/area$A_4$ corresponds to the content of the compound represented by formula (3). Additionally, in the case where impurities which cannot be separated by reverse phase chromatography, for example, a compound having a different ethylene glycol chain length by one from that of the desired compound represented by formula (3) or a compound having different functional groups at the terminals partially from the desired compound represented by formula (3) are contained in the intermediate for production of the hetero type monodispersed polyethylene glycol, there is a possibility in which the content of these compounds is also included in the value of areaP$_4$/areaA$_4$.

The value of areaP$_4$/areaA$_4$ is preferably 0.95 or more when a is from 6 to 24, and is preferably 0.92 or more when a is from 25 to 40. As to the intermediate for production of the hetero type monodispersed polyethylene glycol of the invention, since the number of production steps is increased along with the increase in the value of a in formula (3), the content of the compound having an ethylene glycol chain length different from that of the desired compound represented by formula (3) tends to increase. In the case where the value of areaP$_4$/areaA$_4$ is less than the lower limit described above, since the content of the impurity, for example, the compound having an different ethylene glycol chain length from the compound represented by formula (3) or the compound having a different combination of functional groups at the terminals from the compound represented by formula (3) increases, when a hetero type monodispersed polyethylene glycol synthesized by using such an intermediate for production of the hetero type monodispersed polyethylene glycol is used as a linker material for ADC, the problems, in that the difficulty of confirmation of the number of drugs conjugated, in that the unclearly of drug addition amount, and in that the superfluous evaluations are required at the time of drug application arise, and a compound losing either the antibody or the drug is generated to cause decrease in effectiveness as drug.

In the invention, the measurement conditions of the reverse phase chromatography are described below.
Equipment: build GPC system HLC-8220, produced by Tosoh Corp.
Detector: RI-8020, produced by Tosoh Corp.
Column: TSKgel ODS-80 Ts (particle diameter: 5 μm, column size: 4.6 mm×25 cm), produced by Tosoh Corp.
Flow rate: 0.6 mL/min
Sample volume: 0.2 mg/g, 40 μL In addition, in the case where a in the compound represented by formula (3) is from 6 to 10, the measurement conditions are as follows.
Developing solvent: 5 mM ammonium acetate in methanol/distilled water=50/50
Column temperature: 40° C.

In the case where a in the compound represented by formula (3) is from 11 to 20, the measurement conditions are as follows.
Developing solvent: 5 mM ammonium acetate in methanol/distilled water=60/40
Column temperature: 40° C.

In the case where a in the compound represented by formula (3) is from 21 to 40, the measurement conditions are as follows.
Developing solvent: 5 mM ammonium acetate in methanol/distilled water=65/35
Column temperature: 45° C.

<Method for Producing Intermediate for Production of Hetero Type Monodispersed Polyethylene Glycol>

The intermediate for production of the hetero type monodispersed polyethylene glycol satisfying the specific conditions described above of the invention can be obtained by the method for producing the intermediate for production of the hetero type monodispersed polyethylene glycol of the invention. The method for producing the intermediate for production of the hetero type monodispersed polyethylene glycol of the invention is characterized by containing step a, step b, step c and step d shown below.

[Step a]

Step a according to the invention is a step of obtaining a compound represented by formula (10) shown below by subjecting a compound represented by formula (8) and a compound represented by formula (9) to a nucleophilic substitution reaction so as to satisfy the condition represented by formula (F5) shown below.

HO—(CH$_2$CH$_2$O)$_b$—H　　(8)

LO—(CH$_2$CH$_2$O)$_c$—R$^2$　　(9)

6≤b+c≤40　　(F5)

HO—(CH$_2$CH$_2$O)$_a$—R$^2$　　(10)

In formula (8), b represents an integer from 3 to 37, in formula (9), L represents a tosyl group or a mesyl group, R$^2$ represents a trityl group or a benzyl group, and c represents an integer from 3 to 37. Further, b in formula (8) and c in formula (9) satisfy b+c=6 to 40 and also the condition represented by formula (F5).

The compound represented by formula (8) and the compound represented by formula (9) can be used commercially available products and also can be obtained by known synthesis methods. Further, as to the compound represented by formula (9), it is possible to synthesize a compound having a longer ethylene glycol chain length, that is, a larger number of a in formula (10) by using a compound obtained by tosylation or mesylation of the compound represented by formula (10) obtained by the step a or a compound represented by formula (11) obtained by the step b described below.

A reaction product containing the compound represented by formula (10) can be obtained by subjecting the compound represented by formula (8) and the compound represented by formula (9) to the nucleophilic substitution reaction in the presence of a base. In formula (10), R$^2$ represents a trityl group or a benzyl group, and a represents an integer from 6 to 40. The R$^2$ in formula (10) is derived from the R$^2$ in formula (9). Additionally, the reaction product contains a compound represented by formula (13) shown below as an impurity.

R$^2$O—(CH$_2$CH$_2$O)$_d$—R$^2$　　(13)

In formula (13), R$^2$ represents a trityl group or a benzyl group, and d represents an integer from 8 to 80. The R$^2$ in formula (13) is derived from the R$^2$ in formula (9).

The nucleophilic substitution reaction can be performed in a solvent. The solvent is not particularly limited as long as it does not react with the compound represented by formula (8) and the compound represented by formula (9), and includes, for example, an aprotic polar solvent, for example, tetrahydrofuran, acetonitrile, DMF, dichloromethane or chloroform, and a mixture thereof. The use amount of the solvent is ordinarily from 1 to 100 times, preferably from 2 to 50 times, most preferably from 3 to 30 times, most preferably from 3 to 30 times, in a weight ratio, with respect to the compound represented by formula (9). In the case where the use amount of the solvent is less than the lower limit described above, a production amount of the compound represented by formula (13) in which the compounds represented by formula (9) are connected to the both terminals of the compound represented by formula (8) tends to increase, and on the other hand, in the case where the use amount of the solvent exceeds the upper limit described above, the progress of the nucleophilic substitution reaction tends to be slow.

In the nucleophilic substitution reaction, the use amount of the compound represented by formula (8) is ordinarily from 1.1 to 50 times, preferably from 1.5 to 30 times, more preferably from 2.0 to 20 times, in a molar ratio, with respect to the compound represented by formula (9). In the case where the use amount of the compound represented by formula (8) is less than the lower limit described above, a production amount of the compound represented by formula (13) in which the compounds represented by formula (9) are connected to the both terminals of the compound represented by formula (8) tends to increase, and on the other hand, in the case where the use amount of the compound represented by formula (8) exceeds the upper limit described above, the progress of the nucleophilic substitution reaction tends to be slow.

As to the base used in the nucleophilic substitution reaction, there is no problem as long as it proceeds with the reaction. For example, metallic sodium, sodium hydride or potassium tert-butoxide is exemplified. The use amount of the base is ordinarily from 1.1 to 10 times, preferably from 1.2 to 5 times, in a molar ratio, with respect to the compound represented by formula (9).

The reaction temperature of the nucleophilic substitution reaction may vary according to the solvent used or the like and is ordinary from 0 to 100° C. In the case where the reaction temperature is less than the lower limit described above, the progress of the reaction liable to be slow, and on the other hand, in the case where the reaction temperature exceeds the upper limit described above, due to the excessive temperature the side reaction is liable to progress. Further, the reaction time of the nucleophilic substitution reaction may vary according to the conditions, for example, the reaction temperature and ordinarily it is preferably approximately from 0.2 to 48 hours.

In step a, the reaction product containing the compound represented by formula (10) and the compound represented by formula (13) can be obtained by the nucleophilic substitution reaction. Although the reaction product may be used as it is without purification in the next step b or may be used after purification of the compound represented by formula (10), for example, by silica gel column chromatography, separatory extraction treatment or adsorbent treatment, since the compound represented by formula (13) has no reactivity in the reaction in step b described later and is possible to be purified in the step described later, the reaction product can be used without purification.

[Step b]

Step b according to the invention is a step of obtaining a compound represented by formula (11) shown below by tosylation of the compound represented by formula (10).

TsO—(CH$_2$CH$_2$CH$_2$O)$_a$—R$^2$ (11)

In formula (11), Ts represents a tosyl group, R$^2$ represents a trityl group or a benzyl group, and a represents an integer from 6 to 40. The R$^2$ is derived from the R$^2$ in formula (10).

In step b, a reaction product containing the compound represented by formula (11) and the compound represented by formula (13) can be obtained by allowing to react the reaction product obtained in the step a with p-toluenesulfonyl chloride in the presence of a base.

The reaction in step b can be performed in a solvent. The solvent includes, for example, water, tetrahydrofuran, acetonitrile, DMF, dichloromethane and chloroform, and a mixture thereof. The use amount of the solvent is ordinarily from 1 to 100 times, preferably from 2 to 50 times, most preferably from 3 to 30 times, in a weight ratio, with respect to the compound represented by formula (10). In the case where the use amount of the solvent is less than the lower limit described above, due to heat generation control of the reaction is liable to become difficult, and on the other hand, in the case where the use amount of the solvent exceeds the upper limit described above, the progress of the reaction tends to be slow.

In step b, the use amount of p-toluenesulfonyl chloride is ordinarily from 0.8 to 5 times, preferably from 0.9 to 3 times, in a molar ratio, with respect to the compound represented by formula (10). In the case where the use amount of the p-toluenesulfonyl chloride is less than the lower limit described above, a large amount of the unreacted compound represented by formula (10) remains so that the yield decreases, and on the other hand, in the case where the use amount of the p-toluenesulfonyl chloride exceeds the upper limit described above, the unreacted p-toluenesulfonyl chloride remains and it is difficult to remove it.

As to the base used in the reaction, there is no problem as long as it proceeds with the reaction. For example, triethylamine, sodium hydroxide or pyridine is exemplified. The use amount of the base is ordinarily from 1.1 to 10 times, preferably from 1.2 to 5 times, in a molar ratio, with respect to the compound represented by formula (10).

The reaction temperature of the reaction may vary according to the solvent used or the like and is ordinary from 0 to 80° C. In the case where the reaction temperature is less than the lower limit described above, the progress of the reaction liable to be slow, and on the other hand, in the case where the reaction temperature exceeds the upper limit described above, the compound represented by formula (11) produced is liable to cause side reaction. Further, the reaction time of the reaction may vary according to the conditions, for example, the reaction temperature and ordinarily it is preferably approximately from 0.2 to 48 hours.

In step b, the reaction product containing the compound represented by formula (11) and the compound represented by formula (13) can be obtained by the reaction. Although the reaction product may be used as it is without purification in the next step c or may be used after purification of the compound represented by formula (11), for example, by silica gel column chromatography, separatory extraction treatment or adsorbent treatment, in the invention, since purification is possible in the step described later, the reaction product can be used without purification.

[Step c]

Step c according to the invention is a step of obtaining the compound represented by formula (3) by detritylation or debenzylation of the compound represented by formula (11). A reaction product containing the compound represented by formula (3) can be obtained by performing detritylation in the case where R$^2$ is a trityl group or performing debenzylation in the case where R$^2$ is a benzyl group, in the compound represented by formula (11) in the reaction product obtained in step b. Additionally, the reaction product contains a compound represented by formula (14) shown below which is obtained by detritylation or debenzylation of the compound represented by formula (13) as an impurity.

HO—(CH$_2$CH$_2$O)$_d$—H (14)

In formula (14), d represents an integer from 8 to 80.

As the method of detritylation or debenzylation, known methods can be used and, for example, methods described in Protective Groups in Organic Synthesis authored by Greene and Wuts are effective. Further, in the case where R$^2$ in formulae (11) and (13) is a trityl group, it is possible to perform the detritylation by a conversion reaction under acidic conditions, catalytic hydrogenation or the like. As the conversion reaction under acidic conditions, for example, a method of performing the reaction in 1M hydrochloric acid at 60° C. or a method of performing the reaction by adding a catalytic amount of p-toluenesulfonic acid monohydrate in methanol. Further, as the method of catalytic hydrogenation, a method of adding a catalytic amount of palladium/carbon in a methanol solvent under hydrogen atmosphere. On the other hand, in the case where $R^2$ in formulae (11) and (13) is a benzyl group, it is possible to perform the debenzylation by catalytic hydrogenation, for example, the debenzylation can be performed by adding a catalytic amount of palladium/carbon in a methanol solvent under hydrogen atmosphere.

In step c, the reaction product containing the compound represented by formula (3) and the compound represented by formula (14) can be obtained by the detritylation or debenzylation. Although the reaction product may be used as it is without purification in the next step d or may be used after purification of the compound represented by formula (3), for example, by silica gel column chromatography, separatory extraction treatment or adsorbent treatment, in the invention, since purification is possible in the step described later, the reaction product can be used without purification.

[Step d]

Step d according to the invention is a step of obtaining the intermediate for production of the hetero type monodispersed polyethylene glycol by performing purification of the reaction product containing the compound represented by formula (3) obtained in the step c.

Since the compound represented by formula (14) produced as the impurity in the step c has hydroxyl groups at both terminals, the reaction product containing the compound has the property that the polarity of the compound contained is high in comparison with the composition containing a compound having a protective group at at least one of the both terminals obtained by a conventional synthetic method of the intermediate for the production of the hetero type monodispersed polyethylene glycol. Therefore, it is possible to separate and remove easily the compound by purification operation, for example, silica gel column chromatography, separatory extraction treatment or adsorbent treatment compared with a conventional compound. In particular, according to the production method of the invention, the intermediate for production of the hetero type monodispersed polyethylene glycol of the invention can be obtained in high purity by only a simple separatory extraction treatment without performing purification by silica gel column chromatography.

As the separatory extraction treatment, a method including a washing step (w3) in which the reaction product obtained in the step c is dissolved in an organic solvent and then the organic solvent solution is subjected to separatory washing with an aqueous solution at 25° C. or less exemplified. The organic solvent includes toluene, chloroform and dichloromethane, and among them, chloroform or dichloromethane is preferred from the standpoint of solubility of the compound represented by formula (3). The use amount of the organic solvent is ordinarily from 2 to 30 times, preferably from 3 to 20 times, in a weight ratio, with respect to the reaction product containing the compound represented by formula (3) and the compound represented by formula (14). In the case where the use amount of the organic solvent is less than the lower limit described above, the compound represented by formula (3) is liable to be dissolved in the aqueous layer, and on the other hand, in the case where the use amount of the organic solvent exceeds the upper limit described above, the compound represented by formula (14) is liable to be dissolved in the organic layer.

The aqueous solution in the washing step (w3) is not particularly limited as long as it is capable of dissolving the compound represented by formula (14) and includes, for example, ion exchanged water and an aqueous low salt concentration solution of sodium chloride, potassium chloride or the like. The use amount of the aqueous solution is ordinarily from 2 to 30 times, preferably from 3 to 20 times, in a weight ratio, with respect to the reaction product containing the compound represented by formula (3) and the compound represented by formula (14). In the case where the use amount of the aqueous solution is less than the lower limit described above, the washing efficiency of the compound represented by formula (14) decreases, and on the other hand, in the case where the use amount of the aqueous solution exceeds the upper limit described above, the compound represented by formula (3) is liable to be dissolved in the aqueous layer.

In the washing step (w3), a ratio of the organic solvent and the aqueous solution is ordinarily from 0.2 to 3.0, preferably from 0.5 to 2.0, as a value of organic solvent/aqueous solution in a weight ratio.

The temperature of the washing step (w3) is preferably from 1 to 25° C. and more preferably from 5 to 20° C. In the case where the temperature exceeds the upper limit described above, the compound represented by formula (14) tends to be dissolved in the organic layer to be difficult to remove. Further, the number of times of performing the separatory washing is not particularly limited, and it is preferred to perform plural times of the separatory washing, while checking the compound represented by formula (14) contained in the organic solvent by TLC, MS measurement or the like.

In step d, the intermediate for production of the hetero type monodispersed polyethylene glycol containing the compound represented by formula (3) of the invention can be easily obtained in high purity by the separatory extraction treatment. According to the invention, since it is possible to remove the impurities generated in step a to step c by the simple purification, purification by silica gel column chromatography or the like is not necessary in each step. Additionally, although the intermediate for production of the hetero type monodispersed polyethylene glycol containing the compound represented by formula (3) may be used as it is for the production of the hetero type monodispersed polyethylene glycol of the invention, it may be used after further performing purification, for example, by crystallization, adsorbent treatment or silica gel column chromatography.

<Hetero Type Monodispersed Polyethylene Glycol, Hetero Type Monodispersed Polyethylene Glycol Conjugate>

A hetero type monodispersed polyethylene glycol containing the compound represented by formula (12) shown below can be obtained by using the hetero type monodispersed polyethylene glycol of the invention.

$$X-(CH_2CH_2O)_a-CH_2CH_2-Y \quad (12)$$

In formula (12), X and Y each represents an atomic group containing a functional group capable of forming a covalent bond with a functional group present in a biofunctional molecule, the functional group contained in the atomic group X and the functional group contained in the atomic group Y are different from each other, and a represents an integer from 6 to 40.

The atomic group X is an atomic group located at the polyethylene glycol chain terminal of the hetero type monodispersed polyethylene glycol represented by formula (12) and includes a functional group (X') capable of forming a covalent bond with a functional group present in a biofunctional molecule. X may be composed of only the functional group (X') or may be composed of the functional group (X') and a binding site (W) to the polyethylene glycol chain, as represented by the following formula:

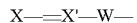

In the formula above, X' represents a functional group capable of forming a covalent bond with a functional group present in a biofunctional molecule, and W represents a binding site to the polyethylene glycol chain or a single bond.

The atomic group Y is an atomic group located at the polyethylene glycol chain terminal of the hetero type monodispersed polyethylene glycol represented by formula (12) and includes a functional group (Y') capable of forming a covalent bond with a functional group present in a biofunctional molecule. Y may be composed of only the functional group (Y') or may be composed of the functional group (Y') and a binding site (W') to the polyethylene glycol chain, as represented by the following formula:

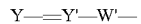

In the formula above, Y' represents a functional group capable of forming a covalent bond with a functional group present in a biofunctional molecule, and W' represents a binding site to the polyethylene glycol chain or a single bond.

The binding sites W and W' are each independently a linker bearing the binding to the polyethylene glycol chain, and the binding site is not particularly limited as long as it is a site constituting of covalent bonds and preferably includes, for example, an ester bond, a urethane bond, an amide bond, an ether bond, a carbonate bond, a divalent hydrocarbon group containing a secondary amino group, a single bond and a divalent hydrocarbon group. The hydrocarbon group preferably has 12 or less carbon atoms and includes, for example, a methylene group, an ethylene group, a triethylene, a propylene group, an isopropylene group, a tetramethylene group, a butylene group, an isobutylene group, a pentamethylene group and a hexamethylene group.

The functional groups X' and Y' are different functional groups from each other and the functional group is not particularly limited as long as it is a functional group capable of forming a covalent bond by reacting with a functional group present in a biofunctional molecule (protein drug, polypeptide, enzyme, antibody, antibody drug, gene, nucleic acid compound containing oligonucleic acid or the like, nucleic acid drug, anticancer drug, and other drugs, for example, low molecular weight drug), which is a target for modification by the hetero type monodispersed polyethylene glycol. Among them, X' and Y' each independently is preferably a functional group capable of reacting under mild conditions and with a high reaction efficiency with a group (for example, an amino group, a thiol group, an aldehyde group or a carboxyl group) present in a naturally occurring biofunctional molecule represented by protein or a group (for example, a maleimide group, a ketone group, an azide group or an alkynyl group) capable of artificially introducing into a biofunctional polymer. More specifically, it is preferably an acetal group, an aldehyde group, a maleimide group, a vinylsulfone group, an iodoacetamide group, an active ester group, an active carbonate group, a carboxyl group, an amino group, an aminooxy group, a thiol group, an allyl group, a vinyl group, an alkynyl group or an azide group. Further, taking the reaction efficiency and the like into consideration, X' and Y' each is preferably a functional group selected from the group consisting of an acetal group, an aldehyde group, a maleimide group, an active ester group, an active carbonate group, a carboxyl group, an amino group, an aminooxy group, an alkynyl group and an azide group.

Further, X' and Y' each is preferably an acetal group, an aldehyde group, an active ester group, an active carbonate group or a carboxyl group in the case where the functional group present in the biofunctional molecule targeted is an amino group; a maleimide group, a vinylsulfone group, an iodoacetamide group, an allyl group or a vinyl group in the case where the functional group present in the biofunctional molecule targeted is a thiol group; an amino group or an aminooxy group in the case where the functional group present in the biofunctional molecule targeted is an aldehyde group or a ketone group; an amino group, an aminooxy group or a thiol group in the case where the functional group present in the biofunctional molecule targeted is a carboxyl group; a thiol group in the case where the functional group present in the biofunctional molecule targeted is a maleimide group; an alkynyl group in the case where the functional group present in the biofunctional molecule targeted is an azide group; and an azide group in the case where the functional group present in the biofunctional molecule targeted is an alkynyl group.

As to a combination of X' in the atomic group X and Y' in the atomic group Y, it is preferred that X' is one functional group selected from the group consisting of a maleimide group, an azide group an alkynyl group and an iodoacetamide group, and Y' is one functional group selected from the group consisting of a carboxyl group and an active ester group.

The maleimide group in the invention is a group represented by formula (15) shown below including the binding site (W, W') and a group reacts with a nucleophilic group, for example, a thiol group.

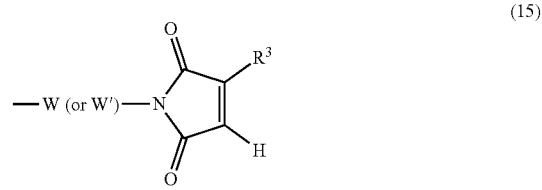

In formula (15), $R^3$ is preferably a hydrogen atom or a methyl group, and more preferably a hydrogen atom. In the case where X' in the atomic group X is a maleimide group or Y' in the atomic group Y is a maleimide group in the invention, the atomic group X or the atomic group Y includes, for example, an atomic group represented by the formula shown below.

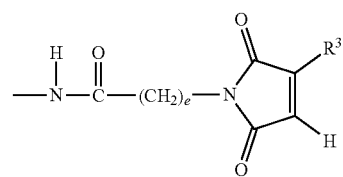

In the above formula, e represents an integer from 2 to 5, and $R^3$ has the same meaning as $R^3$ in formula (15).

The active ester group in the invention is a group represented by formula (16) shown below including the binding site (W, W') and a group reacts with a nucleophilic group, for example, an amino group.

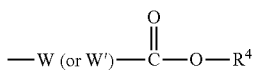  (16)

In formula (16), $R^4$ is preferably a phenyl group, a 3-pyridyl group, a succinimide group, a 2-benzothiazole group or a 1-benzotriazole group, more preferably a succinimide group or a 1-benzotriazole group, and most preferably a succinimide group. In the case where X' in the atomic group X is an active ester group or Y' in the atomic group Y is an active ester group in the invention, the atomic group X or the atomic group Y includes, for example, an atomic group represented by the formula shown below.

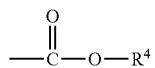

In the above formula, $R^4$ has the same meaning as $R^3$ in formula (16).

The alkynyl group in the invention is a group represented by any one of formulae (17) to (20) shown below including the binding site (W, W') and reacts with an azide group or the like.

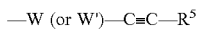  (17)

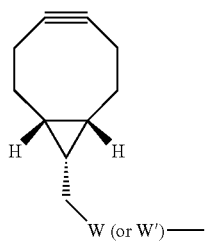  (18)

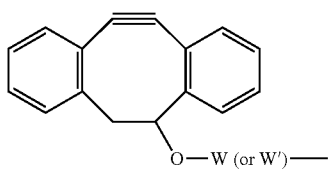  (19)

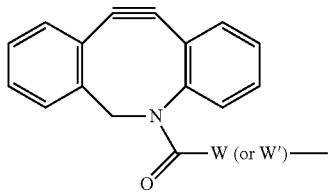  (20)

In formula (17), $R^5$ is preferably a saturated hydrocarbon group having 8 or less carbon atoms or a hydrogen atom, and more preferably a hydrogen atom. In the case where X' in the atomic group X is an alkynyl group or Y' in the atomic group Y is an alkynyl group in the invention, the atomic group X or the atomic group Y includes, for example, atomic groups represented by formulae (21) to (23) shown below.

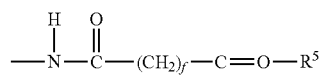  (21)

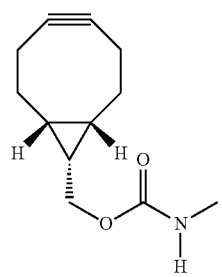  (22)

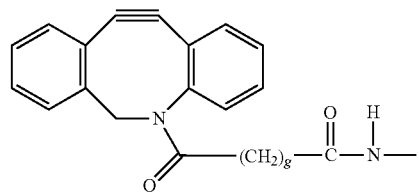  (23)

In formula (21), f represents an integer from 2 to 5, and $R^5$ has the same meaning as $R^5$ in formula (17). In formula (23), g represents an integer from 1 to 6.

In the case where X' in the atomic group X is an iodoacetamide group or Y' in the atomic group Y is an iodoacetamide group in the invention, the atomic group X or the atomic group Y includes, for example, an atomic group represented by the formula shown below.

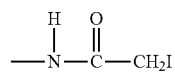

In the case where X' in the atomic group X is a carboxyl group or Y' in the atomic group Y is a carboxyl group in the invention, the atomic group X or the atomic group Y includes, for example, an atomic group represented by the formula shown below.

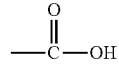

As a method for obtaining the compound represented by formula (12), known synthesis methods can be appropriately used. For example, a method for introducing a maleimide group includes a method wherein 3-maleimidopropionic acid or maleimidobutyric acid is reacted with a condensing agent, for example, 1-(3-dimethylaminopropyl)-3-ethylcarbodiimide hydrochloride and then reacted with the hetero type monodispersed polyethylene glycol containing the compound represented by formula (1) of the invention as the main component and a method wherein 3-maleimidopropionic acid N-succinimidyl or maleimidobutyric acid N-succinimidyl is reacted with the hetero type monodispersed polyethylene glycol containing the compound represented by formula (1) of the invention as the main component in the presence of a base, for example, triethylamine. Additionally, a method for introducing an active ester group includes, for example, a method wherein N-hydroxysuccineimide is reacted with the hetero type monodispersed polyethylene glycol containing the compound represented by formula (1) of the invention as the main component in the presence of a condensing agent, for example, 1-(3-dimethylaminopropyl)-3-ethylcarbodiimide hydrochloride. Further, a method for introducing an iodoacetamide group includes, for example, a method wherein di(iodoacetic) anhydride is reacted with the hetero type monodispersed polyethylene glycol containing the compound represented by formula (1) of the invention as the main component in the presence of a base, for example, triethylamine. A method for introducing an alkylene group includes, for example, a method wherein propargyl chloroformate, (1R, 8S, 9S)-bicyclo[6.1.0]non-4-yn-9-ylmethyl N-succinimidyl carbonate, dibenzocyclooctyne-N-hydroxysuccinimidyl ester or the like is reacted with the hetero type monodispersed polyethylene glycol containing the compound represented by formula (1) of the invention as the main component in the presence of a base such as triethylamine.

In this way, the hetero type monodispersed polyethylene glycol containing the compound represented by formula (12) can be obtained as the main component. The hetero type monodispersed polyethylene glycol obtained by using the hetero type monodispersed polyethylene glycol containing the compound represented by formula (1) of the invention can contain the compound which is represented by formula (12) and in which the ethylene glycol chain length (that is, a value of a) is the same (hetero type polyethylene glycol) in high purity.

Further, by using the hetero type monodispersed polyethylene glycol containing the compound represented by formula (1) or the hetero type monodispersed polyethylene glycol containing the compound represented by formula (12), a hetero type monodispersed polyethylene glycol conjugate in which the compound (hetero type polyethylene glycol) and a biofunctional molecule are conjugated can be obtained. In the invention, by using the hetero type monodispersed polyethylene glycol of the invention, generation of a compound having drugs introduced into both terminals and a compound having targeting molecules introduced into both terminals can be sufficiently suppressed.

The biofunctional molecule includes protein drug, polypeptide, enzyme, antibody, antibody drug, gene, nucleic acid compound containing oligonucleic acid or the like, nucleic acid drug, anticancer drug, and other drugs, for example, low molecular weight drug.

The method for obtaining the hetero type monodispersed polyethylene glycol conjugate includes, for example, a method wherein first, a targeting molecule, for example, an antibody or a peptide ligand is introduced into one terminal of the compound represented by formula (1) or the compound represented by formula (12), that is, an amino group or a carboxyl group in formula (1) or the atomic group X in formula (12), and then a drug, for example, an anticancer drug or a protein drug is introduced into the other terminal, that is, an amino group or a carboxyl group in formula (1) or the atomic group Y in formula (12). Additionally, the terminals to which the drug and the targeting molecule are introduced may be reversed.

EXAMPLES

The invention will be described more specifically with reference to the examples, but the invention should not be construed as being limited thereto. In each synthesis example, JMTC-400 produced by JEOL Ltd. was used for measurement of nuclear magnetic resonance ($^1$H-NMR) and Quattro micro tandem type mass spectrometer produced by Waters Corp. was used for measurement of mass spectrometry (ESI-MS).

<Synthesis of Polyethylene Glycol>

Example 1-1

Synthesis of Compound 13 Represented by Formula (1) Wherein a is 8

Synthesis Example I

Synthesis of Compound 8 Represented by Formula (3) Wherein a is 8

Synthesis Example I-1

Synthesis of Compound 4 Represented by Formula (9) Wherein c is 4, L is Tosyl Group, and $R^2$ is Trityl Group

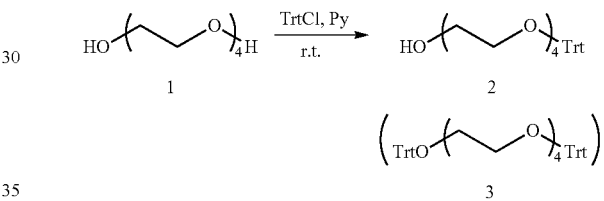

First, Compound 2 was synthesized according to the reaction route shown in the formula above. That is, tetraethylene glycol 1 (200 mL, 1.15 mol) was charged in a two-necked eggplant-shaped flask and azeotropic dehydration was performed twice with toluene (50 mL×2 times). The inside of the eggplant-shaped flask was purged with nitrogen, pyridine (18 mL, 0.22 mol) and trityl chloride (TrtCl, 40 g, 0.144 mol) were added, and the mixture was stirred at room temperature for 3 hours. After 3 hours, the disappearance of TrtCl was confirmed using thin layer chromatography (TLC, hexane:ethyl acetate=1:1 (by volume ratio)), and 200 ml of ion-exchanged water was added thereto. To the mixed solution obtained was added 100 mL of toluene, after separation, the organic layer was washed once with 100 ml of a mixed solution of ion-exchanged water/saturated brine (ion-exchanged water:saturated brine=4:1 (by volume ratio)), once with 50 mL of 1M aqueous hydrochloric acid solution, and 4 times with 50 mL of saturated brine. To the organic layer obtained was added sodium sulfate to dry, followed by filtration. To the filtrate was added toluene (50 mL×3 times) to perform azeotropic dehydration 3 times to obtain a reaction product containing Compound 2 as pale yellow colored transparent liquid. Further, it was confirmed that the resulting reaction product also contained Compound 3 by ESI-MS measurement.

Yield: 63.3 g

MS (ESI$^+$): Compound 2 454.5 [M+NH$_4$]$^+$, Compound 3 696.9 [M+NH$_4$]$^+$.

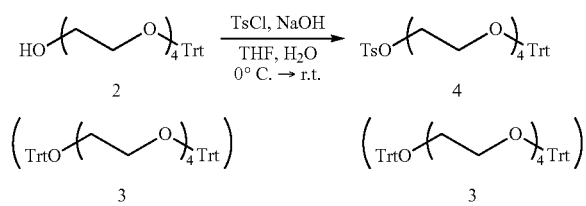

Subsequently, Compound 4 was synthesized according to the reaction route shown in the formula above. That is, in an eggplant-shaped flask were charged the reaction product containing Compound 2 (Compound 2: 62.8 g, 0.144 mol or less) and 200 mL of tetrahydrofuran (THF), followed by cooling to 0° C. An aqueous sodium hydroxide solution (20.0 g, 0.50 mol/60 mL) was added thereto and the mixture was stirred at 0° C. for 20 minutes. To the reaction mixed solution was dropwise added a tosyl chloride (TsCl)/THF solution (30.0 g, 0.157 mol/60 mL) over 30 minutes, and the mixture was stirred at 0° C. for 4 hours. After 4 hours, the disappearance of Compound 2 was confirmed using TLC (hexane:ethyl acetate=1:1 (by volume ratio)), and then the mixture was stirred at room temperature for 15 hours in order to eliminate the unreacted TsCl. After 15 hours, the disappearance of TsCl was confirmed using TLC, and 30 mL of ion-exchanged water and 50 mL of diethyl ether were added thereto. The mixed solution was washed once with 50 mL of an aqueous saturated sodium bicarbonate solution, and 3 times with 50 mL of saturated brine. To the organic layer were added 0.5 g of activated carbon and sodium sulfate to dry, followed by filtration. The filtrate was concentrated under a reduced pressure to obtain a reaction product containing Compound 4 as pale yellow colored transparent liquid. Further, it was confirmed that the resulting reaction product also contained Compound 3 by ESI-MS measurement.

Yield: 81.8 g

MS (ESI$^+$): Compound 4 608.7 [M+NH$_4$]$^+$, Compound 3 696.8 [M+NH$_4$]$^+$.

Synthesis Example I-2 (step a)

Synthesis of Compound 5 Represented by Formula (10) Wherein a is 8, and R$^2$ is Trityl Group

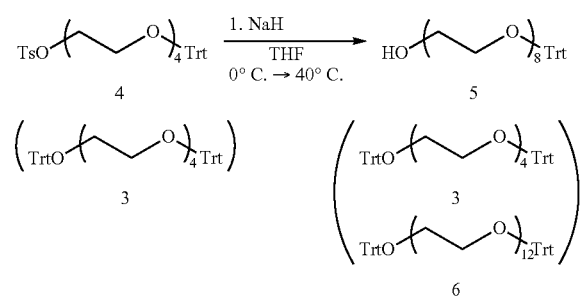

Compound 5 was synthesized according to the reaction route shown in the formula above. That is, sodium hydride (8.1 g) was charged in a two-necked eggplant-shaped flask and nitrogen substitution was performed. After washing twice with dehydrated hexane (50 mL×2 times), 180 mL of THF was added thereto, followed by cooling to 0° C. Tetraethylene glycol 1 (compound represented by formula (8) wherein b is 4, 200 mL, 1.15 mol) which had been subjected to azeotropic dehydration 3 times with 50 mL of toluene was charged in a dropping funnel and added dropwise over 30 minutes. After the completion of the dropwise addition, the reaction product containing Compound 4 (Compound 4: 81.3 g, 0.144 mol or less) obtained in Synthesis Example I-1 which had been subjected to azeotropic dehydration 3 times with 50 mL of toluene was mixed with 100 mL of THF, and the mixture was charged in the same dropping funnel and added dropwise over 15 minutes. After the completion of the dropwise addition, the reaction mixed solution was heated to 40° C. and stirred for 19 hours. After 19 hours, the disappearance of Compound 4 was confirmed using TLC (ethyl acetate), and the reaction mixed solution was allowed to cool to room temperature. To the reaction mixed solution were added 200 mL of ion-exchanged water and 200 mL of saturated brine to perform separation. To the aqueous layer was added 50 mL of diethyl ether to perform extraction. The extract was mixed with the organic layer separated and the mixture was washed once with 50 ml of a mixed solution of ion-exchanged water/saturated brine (ion-exchanged water:saturated brine=1:1 (by volume ratio)), and 5 times with 50 mL of saturated brine. To the organic layer were added 0.5 g of activated carbon and sodium sulfate to dry, followed by filtration. The filtrate was concentrated under a reduced pressure to obtain a reaction product containing Compound 5 as pale yellow colored transparent liquid. Further, it was confirmed that the resulting reaction product also contained Compounds 3 and 6 by ESI-MS measurement.

Yield: 78.8 g

MS (ESI$^+$): Compound 5 630.8 [M+NH$_4$]$^+$, Compound 3 696.8 [M+NH$_4$]$^+$, Compound 6 1048.4 [M+NH$_4$]$^+$ Synthesis Example I-3 (step b)

Synthesis of Compound 7 Represented by Formula (11) Wherein a is 8, and R$^2$ is Trityl Group

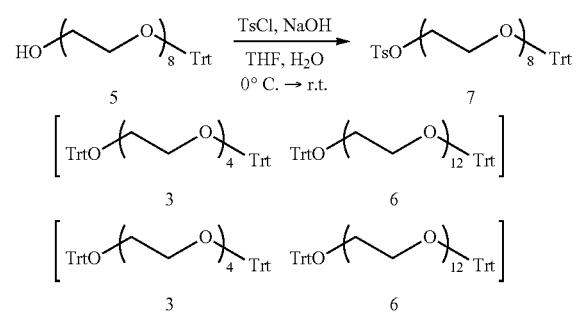

Compound 7 was synthesized according to the reaction route shown in the formula above. That is, in an eggplant-shaped flask were charged the reaction product containing Compound 5 (Compound 5: 77.8 g, 0.144 mol or less) obtained in Synthesis Example I-2 and 200 mL of THF, followed by cooling to 0° C. An aqueous sodium hydroxide solution (20.0 g, 0.50 mol/60 mL) was added thereto and the mixture was stirred at 0° C. for 20 minutes. To the reaction mixed solution was dropwise added a TsCl/THF solution (29.5 g, 0.157 mol/60 mL) over 30 minutes, and the mixture was stirred at 0° C. for 1.5 hours. After 1.5 hours, the disappearance of Compound 5 was confirmed using TLC (ethyl acetate). The mixture was further stirred at room temperature for 12.5 hours in order to deactivate the excess TsCl. After 12.5 hours, the disappearance of TsCl was confirmed using TLC, and 50 mL of ion-exchanged water and 50 mL of diethyl ether were added. The mixed solution was washed once with 50 mL of an aqueous saturated sodium bicarbonate solution, and 3 times with 50 mL of saturated brine. To the organic layer was added sodium sulfate to dry, followed by filtration. The filtrate was concentrated under a reduced pressure to obtain a reaction product containing Compound 7 as pale yellow colored transparent liquid. Further, it was confirmed that the resulting reaction product also contained Compounds 3 and 6 by ESI-MS measurement.

Yield: 86.1 g

MS (ESI+): Compound 7 785.2 [M+NH$_4$]+, Compound 3 697.0 [M+NH$_4$]+, Compound 6 1048.7 [M+NH$_4$]+.

Synthesis Example I-4 (steps c to d)

Synthesis of Compound 8 Represented by Formula (3) Wherein a is 8

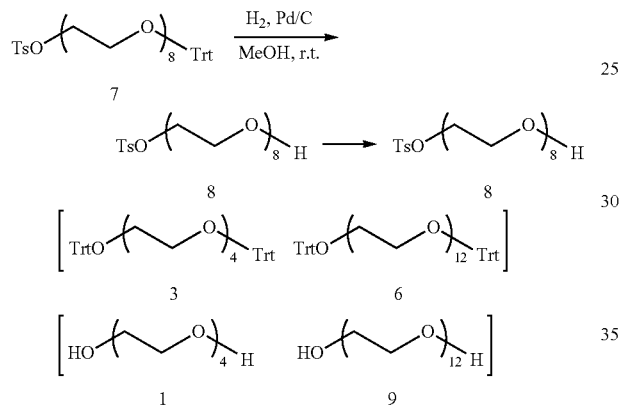

Compound 8 was synthesized according to the reaction route shown in the formula above. That is, first, in an eggplant-shaped flask were charged the reaction product containing Compound 7 (Compound 7: 85.6 g, 0.144 mol or less) obtained in Synthesis Example 1-3, 200 mL of methanol and 2 g of palladium on carbon (Pd/C), and the inside of the eggplant-shaped flask was replaced with hydrogen, followed by stirring at room temperature for 18 hours. After 18 hours, the disappearance of Compound 7 was confirmed using TLC (ethyl acetate), and Pd/C was removed by celite filtration. To the filtrate was added 130 mL of ion-exchanged water and the solid (triphenylmethane) generated was removed by filtration. Since triphenylmethane remained in the filtrate, the filtrate was washed 5 times with 100 mL of hexane to remove triphenylmethane. The methanol/ion-exchanged water layer was concentrated under a reduced pressure to obtain a crude product containing Compound 8. As a result of ESI-MS measurement, it was confirmed that the resulting crude product also contained Compounds 1 and 9.

Subsequently, to the crude product was added 120 mL of dichloromethane and the mixture was washed 3 times with 100 mL of ion-exchanged water and twice with 100 mL of saturated brine under condition of 20° C. To the organic layer was added sodium sulfate to dry, followed by filtration. The filtrate was concentrated under a reduced pressure to obtain a purified product containing Compound 8 as pale yellow colored transparent liquid.

Purified Product

Yield: 52.0 g

MS (ESI+): Compound 8 542.4 [M+NH$_4$]+.

$^1$H-NMR (CDCl$_3$, 400 MHz): 7.80 (d, 2H), 7.35 (d, 2H), 4.16 (t, 2H), 3.65 (m, 30H), 2.73 (t, 1H), 2.45 (s, 3H)

Crude Product

MS (ESI+): Compound 8 542.4 [M+NH$_4$]+, Compound 1 212.7 [M+NH$_4$]+, Compound 9 564.5 [M+NH$_4$]+

Synthesis Example II

Synthesis of Compound 13 Represented by Formula (1) Wherein a is 8

Synthesis Example II-1 (step A)

Synthesis of Compound 10 Represented by Formula (5) Wherein a is 8, and R$^1$ is Tert-Butyl Group

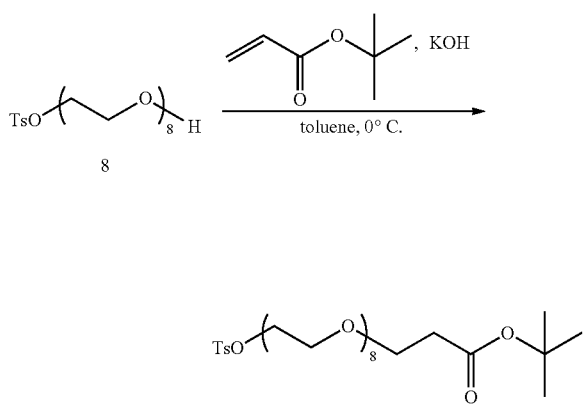

Compound 10 was synthesized according to the reaction route shown in the formula above. That is, in an eggplant-shaped flask were charged the purified product containing Compound 8 (Compound 8: 1.0 g, 1.91 mmol) obtained in Synthesis Example I, tert-butyl acrylate (compound represented by formula (4) wherein R$^1$ is a tert-butyl group, 1.82 mL, 19.1 mmol) and toluene (25 mL). The mixture was cooled to 0° C., potassium hydroxide (powder, 53 mg, 0.9 mmol) was added thereto, and the mixture was stirred at 0° C. for one hour. After one hour, the disappearance of Compound 8 was confirmed by ESI-MS, and 20 mL of ion-exchanged water was added to the mixed solution to perform separation. The organic layer was washed once with 20 mL of saturated brine. To the organic layer was added sodium sulfate to dry, followed by filtration. The filtrate was concentrated under a reduced pressure to obtain a reaction product containing Compound 10 as pale yellow colored transparent liquid.

Yield: 1.06 g

MS (ESI+): Compound 10 670.6 [M+NH$_4$]+

$^1$H-NMR (CDCl$_3$, 400 MHz): 7.80 (d, 2H), 7.34 (d, 2H), 4.16 (t, 2H), 3.64 (m, 32H), 2.50 (t, 2H), 2.45 (s, 3H), 1.45 (s, 9H)

Synthesis Example II-2 (step B)

Synthesis of Compound 11 Represented by Formula (6) Wherein a is 8, and $R^1$ is Tert-Butyl Group

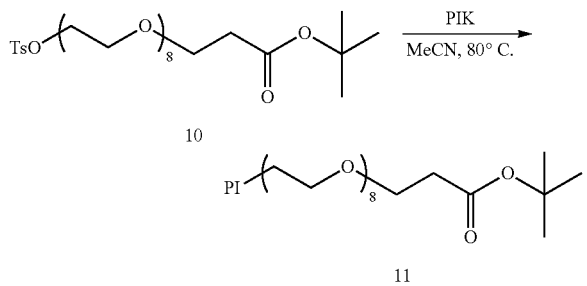

Compound 11 was synthesized according to the reaction route shown in the formula above. That is, in an eggplant-shaped flask were charged the reaction product containing Compound 10 (Compound 10: 1.06 g, 1.60 mmol) obtained in Synthesis Example II-1 and 25 mL of acetonitrile (MeCN). The inside of the eggplant-shaped flask was purged with nitrogen, phthalimide potassium salt (PIK, 520 mg, 2.80 mmol) was added, and the mixture was stirred at 80° C. for 8 hours. After 8 hours, the disappearance of Compound 10 was confirmed by ESI-MS and $^1$H-NMR (CDCl$_3$), and the reaction solution was concentrated under a reduced pressure. To the concentrate was added, 7 mL of dichloromethane, and the solid content was filtered. The filtrate was washed once with 7 mL of 0.1 M aqueous sodium hydroxide solution and once with 10 mL of saturated brine. To the organic layer was added sodium sulfate to dry, followed by filtration. The filtrate was concentrated under a reduced pressure to obtain a reaction product containing Compound 11 as pale yellow colored transparent liquid.

Yield: 965 mg

MS (ESI$^+$): Compound 11 945.7 [M+NH$_4$]$^+$ $^1$H-NMR (CDCl$_3$, 400 MHz): 7.85 (dd, 2H), 7.71 (dd, 2H), 3.90 (t, 2H), 3.63 (m, 32H), 2.50 (t, 2H), 1.45 (s, 9H)

Synthesis Example II-3 (Steps C to D (Separatory Extraction Treatment))

Synthesis of Compound 12 Represented by Formula (7) Wherein a is 8, and $R^1$ is Tert-Butyl Group

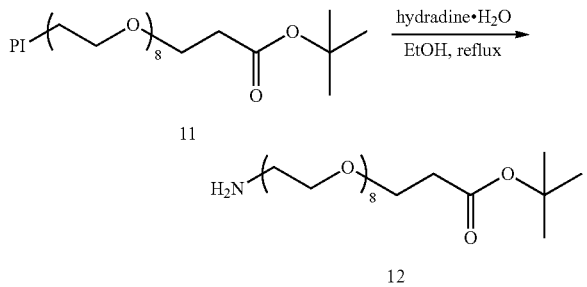

Compound 12 was synthesized according to the reaction route shown in the formula above. That is, in an eggplant-shaped flask were charged the reaction product containing Compound 11 (Compound 11: 510 mg, 0.80 mmol) obtained in Synthesis Example 11-2, 10 mL of ethanol and hydrazine monohydrate (334 mg, 6.70 mmol), and the mixture was stirred at 85° C. for 45 minutes. After 45 minutes, the disappearance of Compound 11 was confirmed by ESI-MS, the mixture was cooled to room temperature. In order to dissolve the white solid deposited, 5 mL of 12% aqueous potassium carbonate solution was added, and the mixed solution was concentrated under a reduced pressure and subjected to azeotropic dehydration twice with 5 mL of toluene to obtain a reaction product containing Compound 12 as a solid.

Subsequently, to the reaction product obtained was added 3 mL of ion-exchanged water, and dropwise added 0.6 mL of concentrated hydrochloric acid to adjust pH to 3, and the solid content was filtered. The filtrate was washed 3 times with dichloromethane and to the aqueous layer was added 2 g of NaCl to saturate. The aqueous solution was extracted 5 times with dichloromethane, and the organic layer was dried with sodium sulfate, followed by filtration. The filtrate was concentrated under a reduced pressure to obtain a purified product containing Compound 12 as pale yellow colored transparent liquid.

Yield: 400 mg

MS (ESI$^+$): Compound 12 498.4 [M+H]$^+$ $^1$H-NMR (CDCl$_3$, 400 MHz): 7.97 (s, 2H), 3.94 (t, 2H), 3.66 (m, 30H), 3.19 (t, 2H), 2.50 (t, 2H), 1.45 (s, 9H)

Synthesis Example II-4 (Step D (Acid Hydrolysis Treatment))

Synthesis of Compound 13 Represented by Formula (1) Wherein a is 8

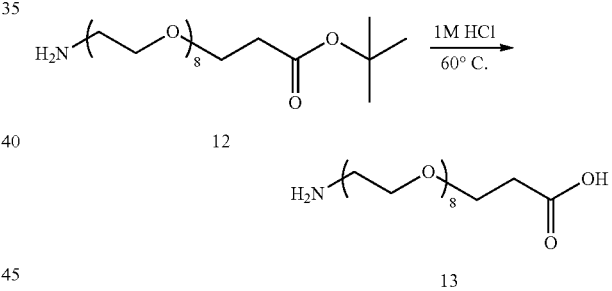

Compound 13 was synthesized according to the reaction route shown in the formula above. That is, in an eggplant-shaped flask were charged the purified product containing Compound 12 (Compound 12: 400 mg, 0.80 mmol) obtained in Synthesis Example II-3 and 502 μL of 1M aqueous hydrochloric acid solution, and the mixture was stirred at 60° C. for 5 hours. After 5 hours, the disappearance of Compound 12 was confirmed by ESI-MS, 1M aqueous sodium hydroxide solution was added to the reaction solution to adjust pH to 5. Water was subjected to azeotropic dehydration twice with toluene (5 mL) and to the solid content obtained was added 10 mL of dichloromethane, followed by filtration. The filtrate was concentrated under a reduced pressure to obtain a purified product containing Compound 13 as a pale yellow colored solid.

Yield: 320 mg

MS (ESI$^+$): Compound 13 442.4 [M+H]$^+$ $^1$H-NMR (D$_2$O, 400 MHz): 3.60 (m, 32H), 3.12 (t, 2H), 2.51 (t, 2H)

Example 2-1

Synthesis of Compound 23 Represented by Formula (1) Wherein a is 12

Synthesis Example III

Synthesis of Compound 18 Represented by Formula (3) Wherein a is 12

Synthesis Example III-1

Synthesis of Compound 14 Represented by Formula (9) Wherein c is 8, L is Mesyl Group, and $R^2$ is Trityl Group

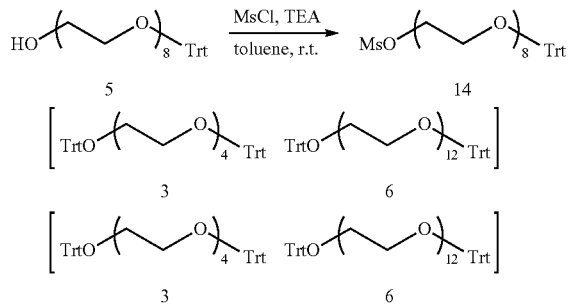

First, Compound 14 was synthesized according to the reaction route shown in the formula above. That is, in an eggplant-shaped flask were charged the reaction product containing Compound 5 (Compound 5: 72.7 g, 0.119 mol or less) synthesized in Synthesis Example I-2 and toluene (350 mL). The inside of the eggplant-shaped flask was purged with nitrogen, and triethylamine (19.8 mL, 0.143 mol) was added. To the mixture was added dropwise methanesulfonyl chloride (10.1 mL, 0.131 mol) at 0° C., followed by stirring for 2 hours at room temperature. After 2 hours, the disappearance of Compound 5 was confirmed by ESI-MS measurement, 100 mL of 1M HClaq. was added to the mixture to perform separation. The organic layer was washed once with 100 mL of 1M aqueous hydrochloric acid solution, twice with 100 mL of an aqueous saturated sodium bicarbonate solution, and once with 100 mL of saturated brine. To the organic layer was added sodium sulfate to dry, followed by filtration. The filtrate was concentrated under a reduced pressure to obtain a reaction product containing Compound 14 as pale yellow colored transparent liquid. Further, it was confirmed that the resulting reaction product also contained Compounds 3 and 6 by ESI-MS measurement.

Yield: 80.1 g

MS (ESI$^+$): Compound 14 708.3 [M+NH$_4$]$^+$, Compound 3 696.4 [M+NH$_4$]$^+$, Compound 6 1048.5 [M+NH$_4$]$^+$

Synthesis Example III-2 (step a)

Synthesis of Compound 15 Represented by Formula (10) Wherein a is 12, and $R^2$ is Trityl Group

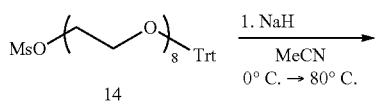

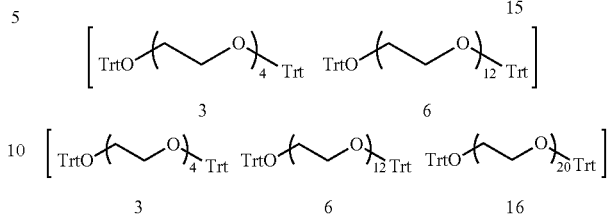

Compound 15 was synthesized according to the reaction route shown in the formula above. That is, sodium hydride (6.58 g) was charged in a two-necked eggplant-shaped flask and nitrogen substitution was performed. After washing twice with dehydrated hexane (50 mL×2 times), 200 mL of MeCN was added thereto, followed by cooling to 0° C. Tetraethylene glycol 1 (compound represented by formula (8) wherein b is 4, 180 g, 0.927 mol) which had been subjected to azeotropic dehydration 3 times with 50 mL of toluene was mixed with 50 mL of MeCN, and the mixture was charged in a dropping funnel and added dropwise over 30 minutes. After the completion of the dropwise addition, the reaction product containing Compound 14 (Compound 14: 80.1 g, 0.116 mol or less) obtained in Synthesis Example III-1 which had been subjected to azeotropic dehydration 3 times with 50 mL of toluene was mixed with 50 mL of MeCN, and the mixture was charged in the same dropping funnel and added dropwise over 15 minutes. After the completion of the dropwise addition, the reaction mixed solution was heated to 80° C. and stirred for 3 hours. After 3 hours, the disappearance of Compound 14 was confirmed by $^1$H-NMR (CDCl$_3$) and the reaction mixed solution was allowed to cool to room temperature. The reaction mixed solution was concentrated under a reduced pressure, and to the residue was added 200 mL of toluene. The toluene solution was washed twice with 100 mL of an aqueous saturated ammonium chloride solution and 3 times with 100 mL of saturated brine. To the organic layer was added sodium sulfate to dry, followed by filtration. The filtrate was concentrated under a reduced pressure to obtain a reaction product containing Compound 15 as pale yellow colored transparent liquid. Further, it was confirmed that the resulting reaction product also contained Compounds 3, 6 and 16 by ESI-MS measurement.

Yield: 85.4 g

MS (ESI$^+$): Compound 15 806.4 [M+NH$_4$]$^+$, Compound 3 696.6 [M+NH$_4$]$^+$, Compound 6 1048.1 [M+NH$_4$]$^+$, Compound 16 1400.9 [M+NH$_4$]$^+$

Synthesis Example III-3 (step b)

Synthesis of Compound 17 Represented by Formula (11) Wherein a is 12, and $R^2$ is Trityl Group

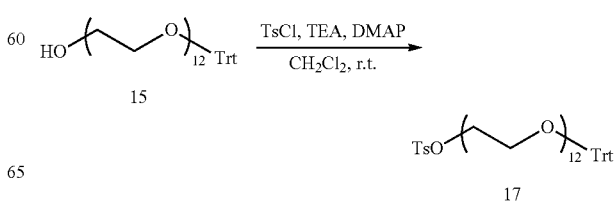

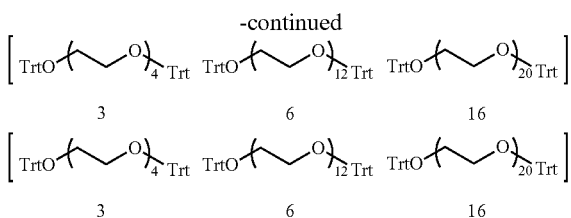

Compound 17 was synthesized according to the reaction route shown in the formula above. That is, in an eggplant-shaped flask were charged the reaction product containing Compound 15 (Compound 15: 57.3 g, 72.7 mmol or less) obtained in Synthesis Example III-2 and dichloromethane (280 mL). The inside of the eggplant-shaped flask was purged with nitrogen, and triethylamine (10.1 mL, 72.7 mmol), 4-dimethylaminipyridine (DMAP, 888 mg, 7.27 mmol) and TsCl (12.5 g, 65.5 mmol) were added, and the mixture was stirred at room temperature for 4.5 hours. After 4.5 hours, the disappearance of TsCl was confirmed by $^1$H-NMR, 150 mL of 1M aqueous hydrochloric acid solution was added to the mixture to perform separation. The organic layer was washed once with 150 mL of 1M aqueous hydrochloric acid solution, twice with 150 mL of an aqueous saturated sodium bicarbonate solution, and once with 150 mL of saturated brine. To the organic layer was added sodium sulfate to dry, followed by filtration. The filtrate was concentrated under a reduced pressure to obtain a reaction product containing Compound 17 as pale yellow colored transparent liquid. Further, it was confirmed that the resulting reaction product also contained Compounds 3, 6 and 16 by ESI-MS measurement.

Yield: 69.1 g

MS (ESI$^+$): Compound 17 960.3 [M+NH$_4$]$^+$, Compound 3 696.3 [M+NH$_4$]$^+$, Compound 6 1048.2 [M+NH$_4$]$^+$, Compound 16 1400.8 [M+NH$_4$]$^+$ Synthesis Example III-4 (steps c to d)

Synthesis of Compound 18 Represented by Formula (3) Wherein a is 12

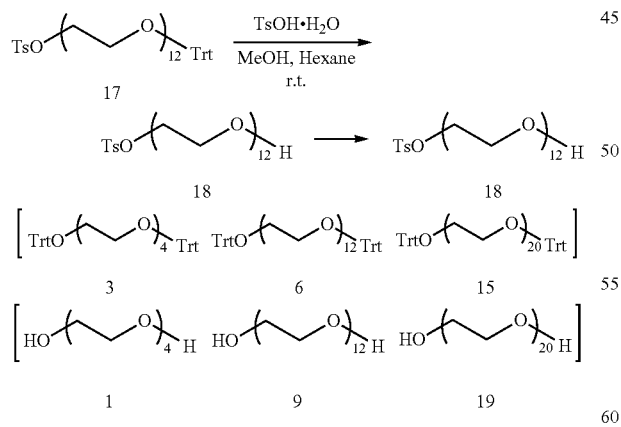

Compound 18 was synthesized according to the reaction route shown in the formula above. That is, first, in an eggplant-shaped flask were charged the reaction product containing Compound 17 (Compound 17: 69.1 g, 73.3 mmol or less) obtained in Synthesis Example III-3 and methanol (550 mL) and TsOH·H$_2$O (6.97 g, 36.7 mmol) and hexane (200 mL) were added, and the mixture was stirred at room temperature for 30 minutes. After 30 minutes, the hexane layer was removed and then hexane (200 mL) was added, and the mixture was stirred at room temperature for 30 minutes. After performing the same operation 6 times, the disappearance of Compound 17 was confirmed by ESI-MS, 200 mL of an aqueous saturated sodium bicarbonate solution was added at 0° C. The mixed solution was washed twice with 200 mL of hexane to remove trityl methyl ether. The methanol solution was concentrated under a reduced pressure to obtain a crude product containing Compound 18. As a result of MS measurement, it was confirmed that the resulting crude product also contained Compounds 1, 9 and 19.

Subsequently, to the crude product was added 200 mL of dichloromethane and the mixture was washed 3 times with 200 mL of ion-exchanged water and once with 200 mL of saturated brine under condition of 20° C. To the organic layer was added sodium sulfate to dry, followed by filtration. The filtrate was concentrated under a reduced pressure to obtain a purified product containing Compound 18 as pale yellow colored transparent liquid. Purified product Yield: 52.0 g MS (ESI$^+$): Compound 18 718.3 [M+NH$_4$]$^+$ $^1$H-NMR (CDCl$_3$, 400 MHz): 7.80 (d, 2H), 7.34 (d, 2H), 4.16 (t, 2H), 3.65 (m, 46H), 2.65 (t, 1H), 2.45 (s, 3H)

Crude Product

MS (ESI$^+$): Compound 18 718.3 [M+NH$_4$]$^+$, Compound 1 212.3 [M+NH$_4$]$^+$, Compound 9 564.5 [M+NH$_4$]$^+$, Compound 19 916.4 [M+NH$_4$]$^+$ Synthesis Example IV Synthesis of Compound 23 Represented by Formula (1) Wherein a is 12

Synthesis Example IV-1 (step A)

Synthesis of Compound 20 Represented by Formula (5) Wherein a is 12, and R$^1$ is Tert-Butyl Group

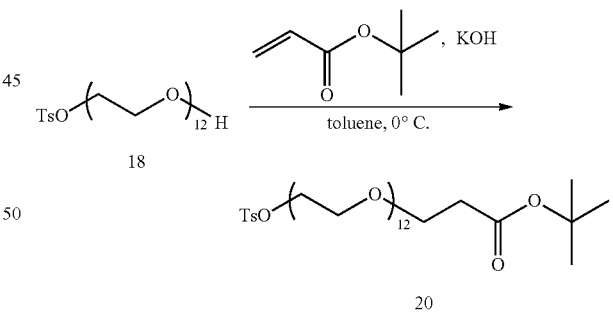

Compound 20 was synthesized according to the reaction route shown in the formula above. That is, in an eggplant-shaped flask were charged the purified product containing Compound 18 (Compound 18: 4.96 g, 7.08 mmol) obtained in Synthesis Example III, tert-butyl acrylate (compound represented by formula (4) wherein R$^1$ is a tert-butyl group, 3.09 mL, 21.2 mmol) and toluene (100 mL). To the mixture was added potassium hydroxide (powder, 199 mg, 3.54 mmol) at 0° C., and the mixture was stirred at 0° C. for one hour. After one hour, the disappearance of Compound 18 was confirmed by ESI-MS, and 50 mL of an aqueous saturated ammonium chloride solution was added. The mixed solution was subjected to separation, and the organic layer was washed once with 50 mL of saturated brine. To the organic layer was added sodium sulfate to dry, followed by filtration. The filtrate was concentrated under a reduced pressure to obtain a reaction product containing Compound 20 as colorless transparent liquid.

MS (ESI$^+$): Compound 20 847.0 [M+NH$_4$]$^+$, 432.6 [M+2NH$_4$]$^{2+}$ $^1$H-NMR (CDCl$_3$, 400 MHz): 7.80 (d, 2H), 7.34 (d, 2H), 4.16 (t, 2H), 3.64 (m, 48H), 2.49 (t, 2H), 2.45 (s, 3H), 1.45 (s, 9H)

Synthesis Example IV-2 (step B)

Synthesis of Compound 21 Represented by Formula (6) Wherein a is 12, and R$^1$ is Tert-Butyl Group

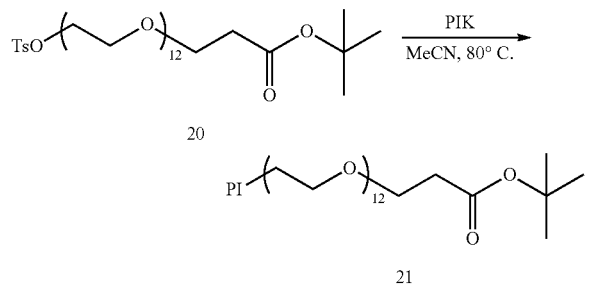

Compound 21 was synthesized according to the reaction route shown in the formula above. That is, in an eggplant-shaped flask were charged the reaction product containing Compound 20 (Compound 20: 5.43 g, 6.55 mmol) obtained in Synthesis Example IV-1 and acetonitrile (45 mL), followed by performing nitrogen substitution. Phthalimide potassium salt (1.58 g, 8.52 mmol) was added, and the mixture was stirred at 80° C. for 18 hours. After 18 hours, the disappearance of Compound 20 was confirmed by $^1$H-NMR, and the reaction solution was concentrated under a reduced pressure. To the residue was added 50 mL of dichloromethane, and the insoluble matter was filtered. The filtrate was washed once with 50 mL of 0.1 M aqueous sodium hydroxide solution and once with 50 mL of saturated brine. To the organic layer was added sodium sulfate to dry, followed by filtration. The filtrate was concentrated under a reduced pressure to obtain a reaction product containing Compound 21 as pale yellow colored transparent liquid.

Yield: 4.26 g

MS (ESI$^+$): Compound 21 821.8 [M+NH$_4$]$^+$, 420.0 [M+2NH$_4$]$^{2+}$ $^1$H-NMR (CDCl$_3$, 400 MHz): 7.84 (dd, 2H), 7.77 (dd, 2H), 3.90 (t, 2H), 3.64 (m, 48H), 2.50 (t, 2H), 1.45 (s, 9H)

Synthesis Example IV-3 (steps C))

Synthesis of Compound 22 Represented by Formula (7) Wherein a is 12, and R$^1$ is Tert-Butyl Group

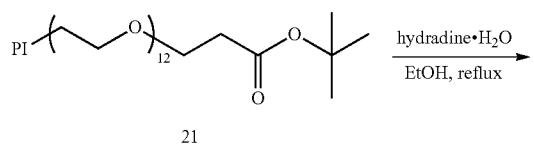

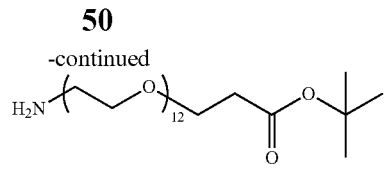

Compound 22 was synthesized according to the reaction route shown in the formula above. That is, in an eggplant-shaped flask were charged the reaction product containing Compound 21 (Compound 21: 4.26 g, 5.30 mmol) obtained in Synthesis Example IV-2, hydrazine monohydrate (3.86 mL, 79.5 mmol) and ethanol (60 mL), and the mixture was stirred at 85° C. for one hour. After one hour, the disappearance of Compound 21 was confirmed by ESI-MS, the mixture was cooled to room temperature. In order to dissolve the white solid deposited, 5 mL of 12% aqueous potassium carbonate solution was added, and the mixed solution was concentrated under a reduced pressure and subjected to azeotropic dehydration twice with 10 mL of toluene. The residue was dissolved in 20 mL of ion-exchanged water, and 35% hydrochloric acid was added to the solution to adjust pH to 3. The solid deposited was filtered, and to the filtrate was added 6 g of sodium chloride to saturate. The aqueous solution was extracted twice with 20 mL of dichloromethane. To the organic layer was added sodium sulfate to dry, followed by filtration. The filtrate was concentrated under a reduced pressure to obtain a reaction product containing Compound 22 as pale yellow colored transparent liquid.

Yield: 3.13 g

MS (ESI$^+$): Compound 22 674.8 [M+H]$^+$, 346.4 [M+H+NH$_4$]$^{2+}$ $^1$H-NMR (CDCl$_3$, 400 MHz): 7.95 (s, 2H), 3.94 (t, 2H), 3.66 (m, 46H), 3.18 (t, 2H), 2.50 (t, 2H), 1.45 (s, 9H)

Synthesis Example IV-4 (step D)

Synthesis of Compound 23 Represented by Formula (1) Wherein a is 12

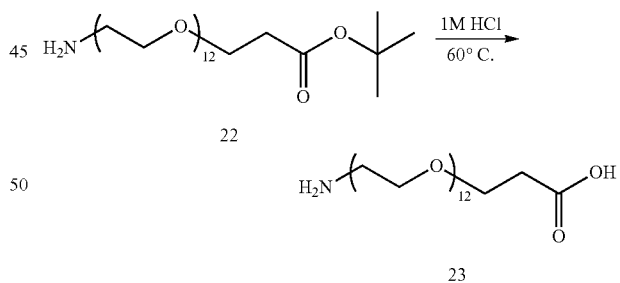

Compound 23 was synthesized according to the reaction route shown in the formula above. That is, first, in an eggplant-shaped flask were charged the reaction product containing Compound 22 (Compound 22: 3.13 g, 4.65 mmol) obtained in Synthesis Example IV-3 and 1M aqueous hydrochloric acid solution (3 mL) and the mixture was stirred at 60° C. for 2 hours. After 2 hours, the disappearance of Compound 22 was confirmed by ESI-MS measurement and the mixture was cooled to room temperature.

Subsequently, the reaction solution was diluted with 5 mL of ion-exchanged water and washed 3 times with 10 mL of dichloromethane. To the aqueous layer were added 2M aqueous sodium hydroxide solution and 0.1M aqueous sodium hydroxide solution to adjust pH to 9. The aqueous solution was washed 3 times with 10 mL of dichloromethane and to the aqueous layer was added 2 g of sodium chloride to saturate. The aqueous solution was washed 3 times with 10 mL of chloroform and to the organic layer was added sodium sulfate to dry, followed by filtration. The filtrate was concentrated under a reduced pressure to obtain 2.32 g of a reaction product containing Compound 23 as a pale yellow colored transparent liquid. To the resulting reaction product (1.96 g) was added 10 mL of ethyl acetate, followed by stirring. The solid was filtrated and dried under a reduced pressure for 3 hours to obtain a purified product containing Compound 23 as a white solid.

Yield: 1.82 g

MS (ESI$^+$): Compound 23 618.5 [M+H]$^+$, 318.3 [M+H+NH$_4$]$^{2+}$ $^1$H-NMR (D$_2$O, 400 MHz): 3.61 (m, 48H), 3.12 (t, 2H), 2.56 (t, 2H)

Comparative Example 1-1

Purified product 1-2 was obtained as a solid in the same manner as in Synthesis Example II except for using the crude product (Comparative purified compound 1-1) in Synthesis Example I-4 as it was.

Comparative Example 2-1

First, the reaction product containing Compound 12 was obtained as a solid in the same manner as in Synthesis Example 11-3. Subsequently, to the reaction product was added 3 mL of ion-exchanged water, and dropwise added 0.6 mL of concentrated hydrochloric acid to adjust pH to 3, and the solid content was filtered. To the filtrate was added 2 g of sodium chloride to saturate. The aqueous solution was extracted 5 times with dichloromethane, and the organic layer was dried with sodium sulfate, followed by filtration. The filtrate was concentrated under a reduced pressure to obtain a comparative purified product containing a compound as pale yellow colored transparent liquid. Comparative purified product 2 was obtained as a solid in the same manner as in Synthesis Example II-4 except for using the comparative purified product in place of the purified product containing Compound 12 obtained in Synthesis Example 11-3.

Comparative Example 3-1

First, in the same manner as in Synthesis Example IV-4, in an eggplant-shaped flask were charged the reaction product containing Compound 22 (Compound 22: 3.13 g, 4.65 mmol) obtained in Synthesis Example IV-3 and 1M aqueous hydrochloric acid solution (3 mL) and the mixture was stirred at 60° C. for 2 hours. After 2 hours, the disappearance of Compound 22 was confirmed by ESI-MS measurement and the mixture was cooled to room temperature. Subsequently, the resulting reaction product was concentrated under a reduced pressure as it was to obtain Comparative purified product 3 as a solid Comparative Example 4-1

Synthesis of Hetero Type Monodispersed Polyethylene Glycol Using Acrylonitrile

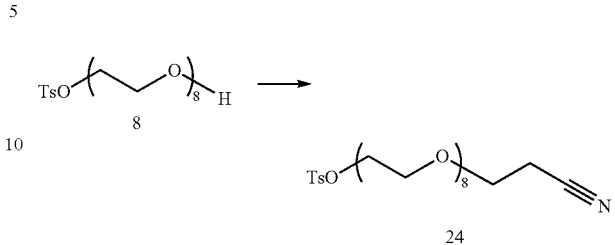

First, Compound 24 was synthesized according to the reaction route shown in the formula above. That is, in an eggplant-shaped flask was charged the purified product containing Compound 8 (Compound 8: 10.0 g, 19.1 mmol) obtained in Synthesis Example I-4 and an aqueous solution (10 mL) of potassium hydroxide (1.6 g, 1.5 eq.) was added at 0° C. Acrylonitrile (14.6 mL, 12 eq.) was charged in a dropping funnel and added dropwise at 0° C., and the mixture was stirred at 0° C. for 3 hours. After 3 hours, the consumption of Compound 8 was confirmed by ESI-MS measurement and 1.6 mL of 85% phosphoric acid was added to adjust pH so as to be less than 6. The solution was diluted with 100 mL of toluene and then washed twice with 100 mL of ion-exchanged water and once with 100 mL of saturated brine. To the organic layer was added sodium sulfate to dry, followed by filtration. The filtrate was concentrated under a reduced pressure to obtain a reaction product containing Compound 24 as colorless transparent liquid.

Yield: 10.8 g

MS (ESI$^+$): Compound 24 595.5 [M+NH$_4$]$^+$ $^1$H-NMR (CDCl$_3$, 400 MHz): 7.80 (d, 2H), 7.34 (d, 2H), 4.16 (t, 2H), 3.64 (m, 32H), 2.62 (t, 2H), 2.35 (s, 3H)

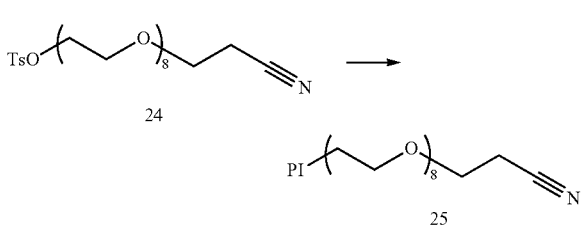

Subsequently, Compound 25 was synthesized according to the reaction route shown in the formula above. That is, in an eggplant-shaped flask were charged the reaction product containing Compound 24 (Compound 24: 2.62 g, 4.54 mmol) and acetonitrile (20 mL), followed by performing nitrogen substitution. Phthalimide potassium salt (1.2 g, 1.2 eq.) was added, and the mixture was stirred at 80° C. for 4.5 hours. After 4.5 hours, the disappearance of peak of Ts group was confirmed by $^1$H-NMR measurement, and the reaction solution was cooled to room temperature. The reaction solution was concentrated under a reduced pressure and to the residue was added 20 mL of dichloromethane, and the insoluble matter was removed by filtration. The filtrate was washed once with 20 mL of 0.1 M aqueous sodium hydroxide solution and once with 10 mL of saturated brine. To the organic layer was added sodium sulfate to dry, followed by filtration. The filtrate was concentrated under a reduced pressure to obtain a reaction product containing Compound 25 as colorless transparent liquid.

Yield: 2.1 g

MS (ESI+): Compound 25 570.6 [M+NH4]+

1H-NMR (CDCl3, 400 MHz): 7.84 (dd, 2H), 7.71 (dd, 2H), 3.90 (t, 2H), 3.64 (m, 32H), 2.63 (t, 2H)

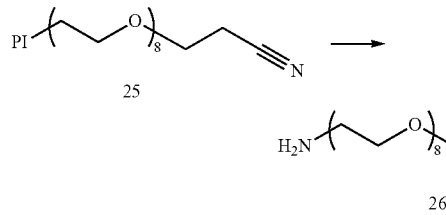

Subsequently, Compound 26 was synthesized according to the reaction route shown in the formula above. That is, in an eggplant-shaped flask were charged the reaction product containing Compound 25 (Compound 25: 1.03 g, 1.87 mmol) and ethanol (15 mL). Hydrazine monohydrate (1.4 mL, 15 eq.) was added, and the mixture was stirred at 85° C. for 45 minutes. After 45 minutes, the disappearance of Compound 25 was confirmed by ESI-MS measurement. In order to dissolve the white solid deposited, 7.5 mL of 12% aqueous potassium carbonate solution was added, and the mixed solution was concentrated under a reduced pressure and subjected to azeotropic dehydration twice with 10 mL of toluene. The residue was dissolved in 20 mL of ion-exchanged water, and 35% hydrochloric acid was added to the solution to adjust pH to 3. The solid deposited was filtered, and the filtrate was concentrated under a reduced pressure and subjected to azeotropic dehydration twice with 10 mL of toluene. The residue was dissolved in 20 mL of dichloromethane and to the solution was added sodium sulfate to dry, followed by filtration. The filtrate was concentrated under a reduced pressure to obtain a reaction product containing Compound 26 as pale yellow colored transparent liquid.

Yield: 736 mg

MS (ESI+): Compound 26 423.4 [M+H]+

1H-NMR (CDCl3, 400 MHz): 7.96 (s, 2H), 3.69 (m, 32H), 3.20 (t, 2H), 2.66 (t, 2H)

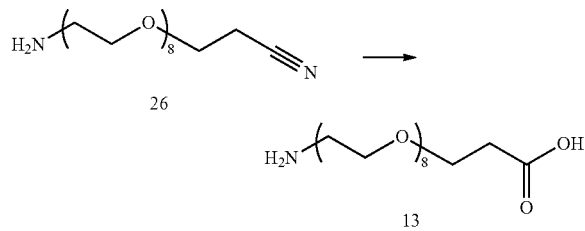

Subsequently, Compound 13 was synthesized according to the reaction route shown in the formula above. That is, in an eggplant-shaped flask were charged the reaction product containing Compound 26 (Compound 26: 629 mg, 1.49 mmol), 35% hydrochloric acid (6 mL) and formic acid (6 mL) and the mixture was stirred at 100° C. for 1.5 hours. After 1.5 hours, the disappearance of Compound 26 was confirmed by ESI-MS measurement and the reaction mixture was allowed to cool to room temperature. The reaction solution was concentrated under a reduced pressure, and solution was concentrated under a reduced pressure and subjected to azeotropic dehydration twice with 10 mL of toluene to obtain Comparative purified product 4 containing Compound 13 as pale yellow colored transparent liquid. Further, it was confirmed that the resulting composition also contained a compound having [M+H]+ of 370.3 by ESI-MS measurement and that the compound was a compound which had an amino group and a hydroxyl group at the terminals and had been generated by degradation of Compound 13.

Yield: 512 mg

MS (ESI+): Compound 13 442.4 [M+H]+, NH2-EG8-OH 370.3 [M+H]+

1H-NMR (D2O, 400 MHz): 3.56 (m, 32H), 3.08 (t, 2H), 2.53 (t, 2H)

<Column Chromatography Measurement>

Example 1-2

For the purified product containing Compound 13 obtained in Example 1-1, (A) reverse phase chromatography measurement, (B) cation exchange chromatography measurement, and (C) anion exchange chromatography measurement were performed.

(A) Reverse Phase Chromatography Measurement

The reverse phase chromatography measurement was performed using build GPC system HLC-8220 produced by Tosoh Corp. as an equipment, RI-8020 produced by Tosoh Corp. as a detector (differential refractometer), TSKgel ODS-80 Ts (particle diameter: 5 μm, column size: 4.6 mm×25 cm) produced by Tosoh Corp. as a column, and 5 mM ammonium acetate in methanol/distilled water=25/75 as a developing solvent, under conditions of flow rate of 0.6 mL/min, column temperature of 40° C., sample concentration of 0.2 mg/g and injection volume of 40 μL.

Figure 5:
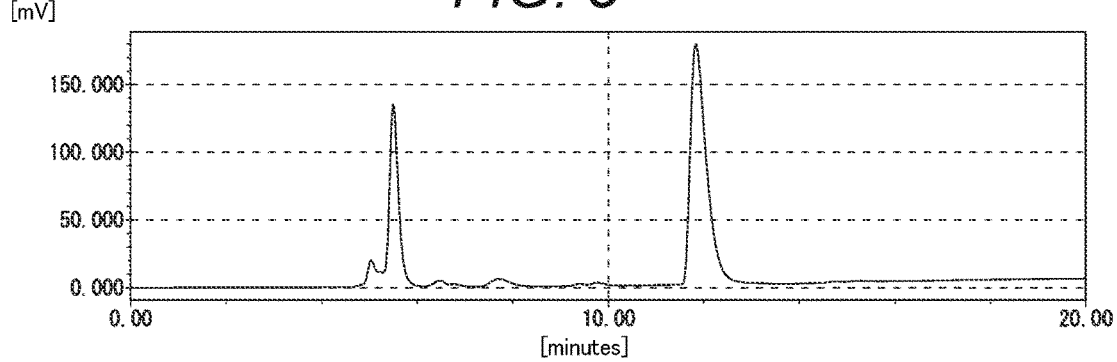
FIG. 5 is the chromatogram obtained by performing (A) reverse phase chromatography measurement for the purified product containing Compound 13 in Example 1-2.

The chromatogram obtained is shown in FIG. 5. Hereinafter, the vertical axis of the chromatogram indicates a signal intensity obtained from a detector and the horizontal axis indicates elution time (column retention time). The elution time at the elution start point was 9.10 minutes, the elution time at the elution end point was 15.58 minutes, the elution time at $P_{1top}$ was 11.98 minutes, $T_1a$ was 11.58 minutes, and $T_1b$ was 12.34 minutes. The areaP$_1$ was calculated as 4025.419, the areaA$_1$ was calculated as 4288.511, and the value of areaP$_1$/areaA$_1$ was 0.94. The results are shown in Table 1.

Figure 6:
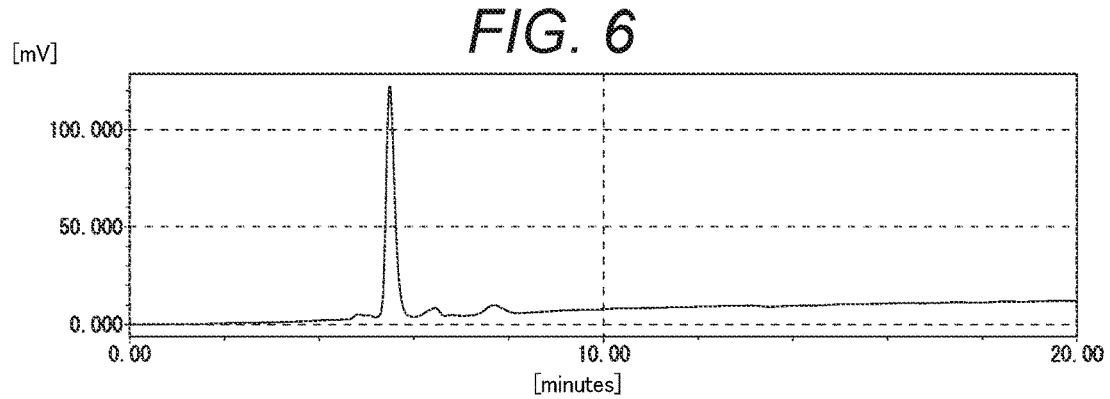
FIG. 6 is the chromatogram obtained by performing reverse phase chromatography measurement for the developing solvent in Example 1-2.

Additionally, the chromatogram obtained by performing injection of only the developing solvent containing no sample and measuring under the same conditions is shown in FIG. 6. From the result, it was confirmed that the peaks detected before the elution time of 8.25 minutes in the measurement described above were peaks caused by the developing solvent or the like and pseudo-peaks due to the fluctuation of the base line caused by the column and apparatus used.

(B) Cation Exchange Chromatography Measurement

The cation exchange chromatography measurement was performed using build GPC system HLC-8220 produced by Tosoh Corp. as an equipment, RI-8020 produced by Tosoh Corp. as a detector (differential refractometer), TSKgel SP-2SW (particle diameter: 5 μm, column size: 4.6 mm×25 cm) produced by Tosoh Corp. as a column, and 5 mM ammonium acetate in methanol/distilled water=10/90 as a developing solvent, under conditions of flow rate of 0.6 mL/min, column temperature of 30° C., sample concentration of 0.2 mg/g and injection volume of 20 μL.

Figure 7:
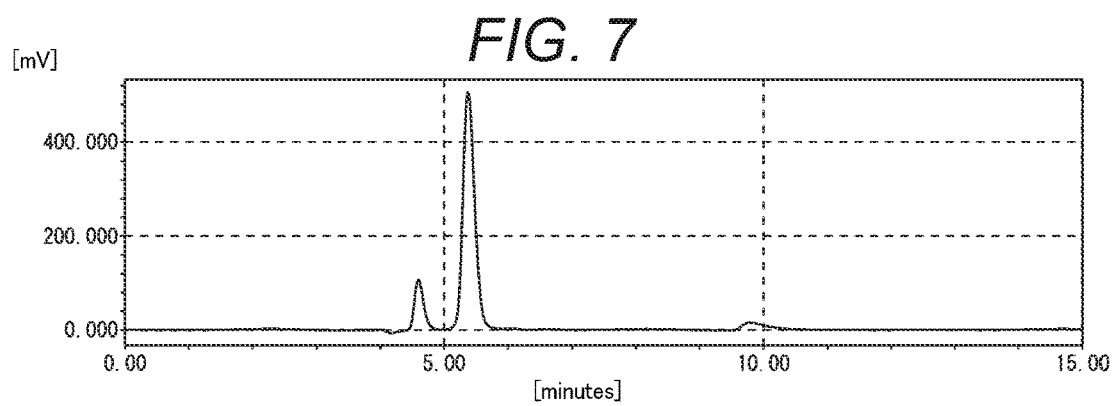
FIG. 7 is the chromatogram obtained by performing (B) cation exchange chromatography measurement for the purified product containing Compound 13 in Example 1-2.

The chromatogram obtained is shown in FIG. 7. The elution time at the elution start point was 3.95 minutes, the elution time at the elution end point was 6.24 minutes, the elution time at $P_{2top}$ was 5.38 minutes, and $T_2$ was 5.15 minutes. The areaB$_2$ was calculated as 21.651, the areaA$_2$ was calculated as 6610.714, and the value of areaB$_2$/areaA$_2$ was 0.00. The results are shown in Table 1.

Figure 8:
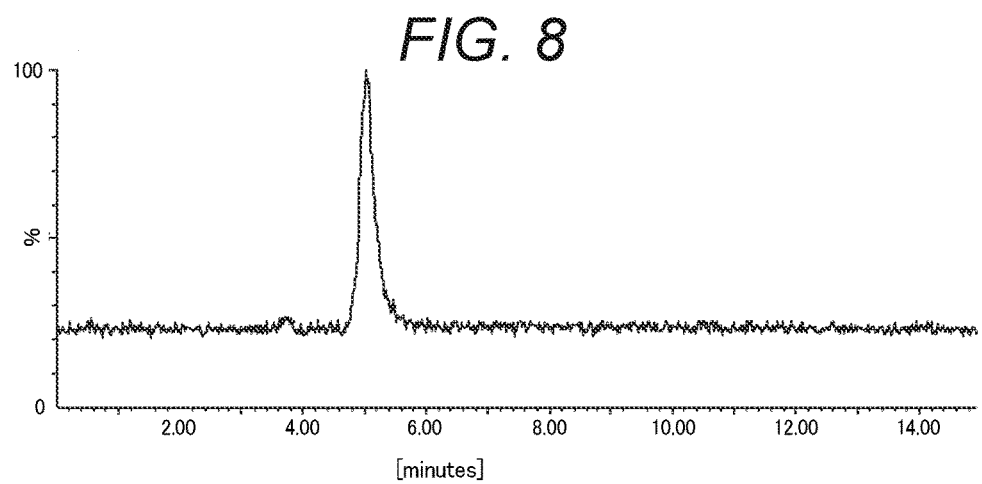
FIG. 8 is the chromatogram obtained by performing cation exchange chromatography measurement for the purified product containing Compound 13 in Example 1-2 using a mass spectrometer as a detector.

Additionally, the chromatogram obtained by measurement of the same sample using Alliance 2695 produced by Waters Corp. as an equipment, Quattro micro tandem type mass spectrometer produced by Waters Corp. as a detector (mass spectrometer), TSKgel SP-2SW (particle diameter: 5 μm, column size: 4.6 mm×25 cm) produced by Tosoh Corp. as a column, and 50 mM ammonium acetate in methanol/distilled water=10/90 as a developing solvent, under conditions of flow rate of 0.6 mL/min, column temperature of 30° C., sample concentration of 0.01 mg/g and injection volume of 5 μL is shown in FIG. 8. From the result, it was confirmed that the peaks detected at the elution time of 4.60 minutes in the measurement described above were peaks caused by the developing solvent or the like and pseudo-peaks due to the fluctuation of the base line caused by the column and apparatus used.

(C) Anion Exchange Chromatography Measurement (Derivatization)

The purified product containing Compound 13 (Compound 13: 60 mg) obtained in Example 1-1 was dissolved in one mL of ion-exchanged water. To the solution were added sodium hydroxide (16.3 mg, 3 eq.) and di-tert-butyl dicarboxylate (0.086 mL, 2.8 eq.) and the mixture was stirred at room temperature for 18 hours. After 18 hours, the consumption of Compound 13 was confirmed by ESI-MS measurement and 1M aqueous hydrochloric acid solution was added to adjust pH to 3. To the aqueous solution was added 300 mg of sodium chloride to saturate. The aqueous solution was extracted twice with 2 mL of dichloromethane, and to the organic layer was added sodium sulfate to dry, followed by filtration. The filtrate was concentrated under a reduced pressure to obtain a mixture containing a compound represented by formula (2) wherein a was 8 as colorless transparent liquid (yield: 45 mg). The mixture was used as a sample for the anion exchange chromatography described below.

(Anion Exchange Chromatography)

The anion exchange chromatography measurement was performed using build GPC system HLC-8220 produced by Tosoh Corp. as an equipment, RI-8020 produced by Tosoh Corp. as a detector (differential refractometer), TSKgel DEAE-2SW (particle diameter: 5 μm, column size: 4.6 mm×25 cm) produced by Tosoh Corp. as a column, and 50 mM ammonium acetate in methanol/distilled water=10/90 as a developing solvent, under conditions of flow rate of 0.6 mL/min, column temperature of 30° C., sample concentration of 0.2 mg/g and injection volume of L.

Figure 9:
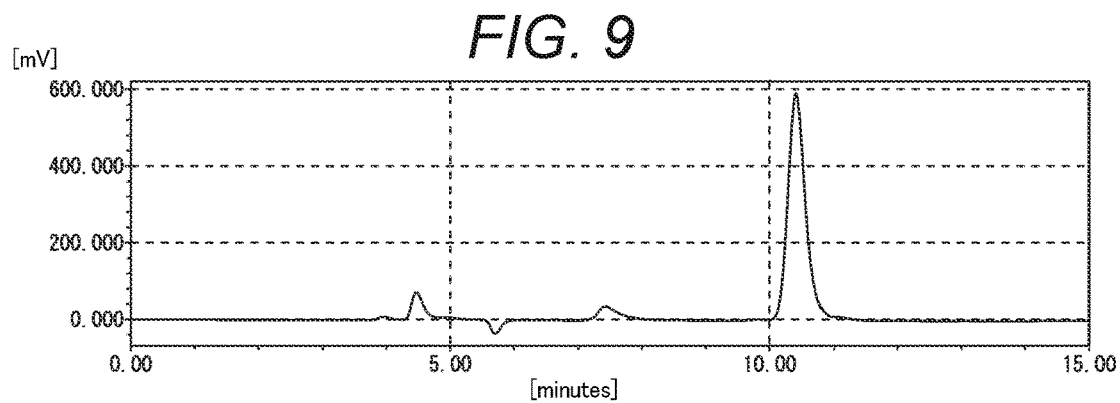
FIG. 9 is the chromatogram obtained by performing (C) anion exchange chromatography measurement for the derivatized purified product containing Compound 13 in Example 1-2.

The chromatogram obtained is shown in FIG. 9. The elution time at the elution start point was 9.60 minutes, the elution time at the elution end point was 11.64 minutes, the elution time at $P_{3top}$ was 10.42 minutes, and $T_3$ was 10.11 minutes. The areaB$_3$ was calculated as 46.036, the areaA$_3$ was calculated as 1158.267, and the value of areaB$_3$/areaA$_3$ was 0.00. The results are shown in Table 1.

Figure 10:
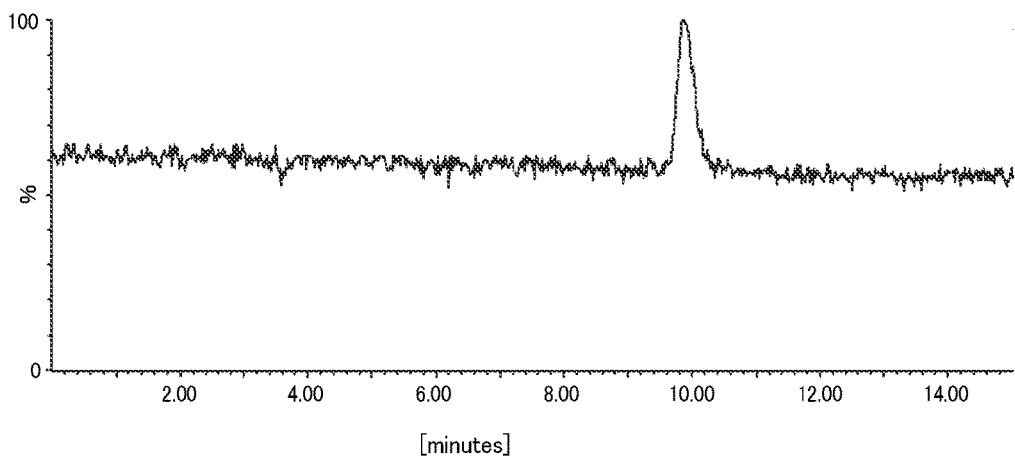
FIG. 10 is the chromatogram obtained by performing anion exchange chromatography measurement for the derivatized purified product containing Compound 13 in Example 1-2 using a mass spectrometer as a detector.

Additionally, the chromatogram obtained by measurement of the same sample using Alliance 2695 produced by Waters Corp. as an equipment, Quattro micro tandem type mass spectrometer produced by Waters Corp. as a detector (mass spectrometer), TSKgel DEAE-2SW (particle diameter: 5 μm, column size: 4.6 mm×25 cm) produced by Tosoh Corp. as a column, and 50 mM ammonium acetate in methanol/distilled water=10/90 as a developing solvent, under conditions of flow rate of 0.6 mL/min, column temperature of 30° C., sample concentration of 0.01 mg/g and injection volume of 5 μL is shown in FIG. 10. From the result, it was confirmed that the peaks detected at the elution time from 3.90 to 8.00 minutes in the measurement described above were peaks caused by the developing solvent or the like and pseudo-peaks due to the fluctuation of the base line caused by the column and apparatus used.

Example 2-2

For the purified product containing Compound 23 obtained in Example 2-1, (A) reverse phase chromatography measurement, (B) cation exchange chromatography measurement, and (C) anion exchange chromatography measurement were performed.

(A) Reverse Phase Chromatography Measurement

Figure 11:
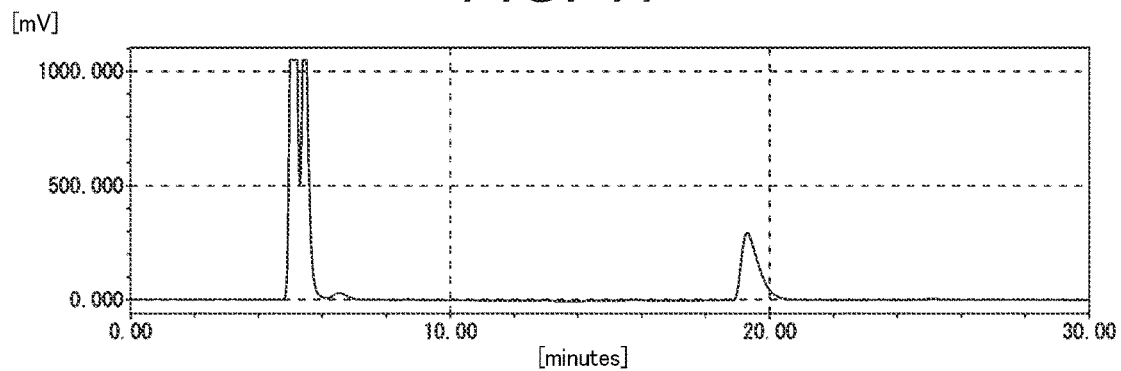
FIG. 11 is the chromatogram obtained by performing (A) reverse phase chromatography measurement for the purified product containing Compound 23 in Example 2-2.

The measurement was performed in the same manner as in Example 1-2 except for changing the developing solvent to 5 mM ammonium acetate in methanol/distilled water=30/70. The chromatogram obtained is shown in FIG. 11. The elution time at the elution start point was 8.50 minutes, the elution time at the elution end point was 25.67 minutes, the elution time at $P_{1top}$ was 19.30 minutes, $T_1a$ was 18.93 minutes, and $T_1b$ was 20.19 minutes. The areaP$_1$ was calculated as 11053.332, the areaA$_1$ was calculated as 11659.029, and the value of areaP$_1$/areaA$_1$ was 0.95. The results are shown in Table 1.

Additionally, as a result of performing injection of only the developing solvent containing no sample and measuring under the same conditions, it was confirmed that the peaks detected before the elution time of 7.10 minutes in the measurement described above were peaks caused by the developing solvent or the like and pseudo-peaks due to the fluctuation of the base line caused by the column and apparatus used.

(B) Cation Exchange Chromatography Measurement

Figure 12:
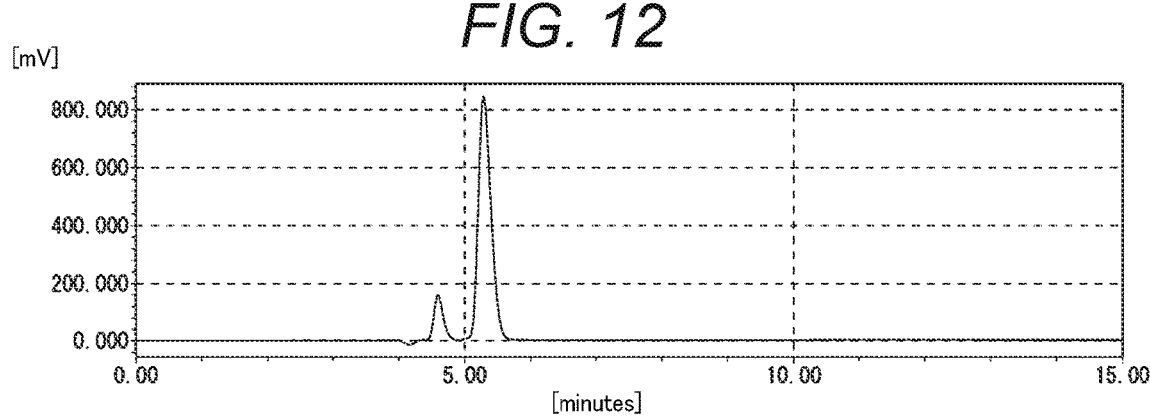
FIG. 12 is the chromatogram obtained by performing (B) cation exchange chromatography measurement for the purified product containing Compound 23 in Example 2-2.

The measurement was performed in the same manner as in Example 1-2. The chromatogram obtained is shown in FIG. 12. The elution time at the elution start point was 4.93 minutes, the elution time at the elution end point was 5.90 minutes, the elution time at $P_{2top}$ was 5.28 minutes, and $T_2$ was 5.10 minutes. The areaB$_2$ was calculated as 52.561, the areaA$_2$ was calculated as 11372.510, and the value of areaB$_2$/areaA$_2$ was 0.00. The results are shown in Table 1.

Figure 13:
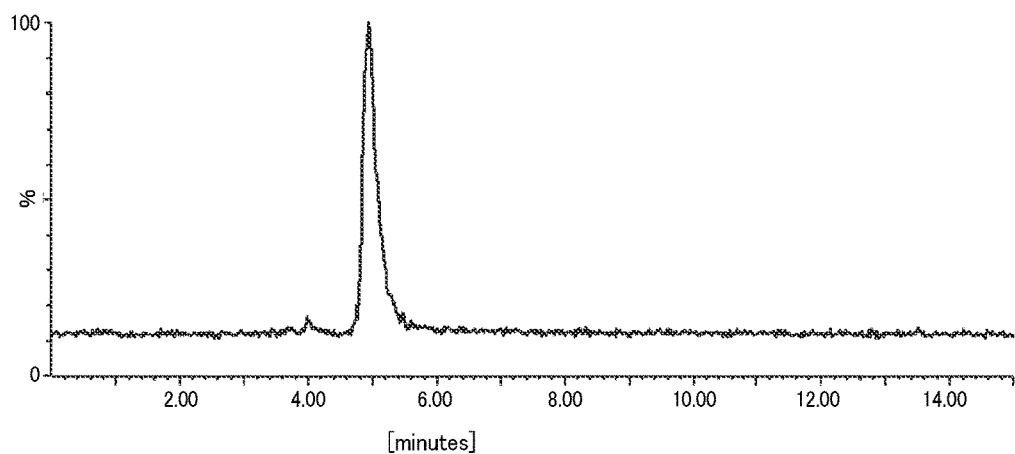
FIG. 13 is the chromatogram obtained by performing cation exchange chromatography measurement for the purified product containing Compound 23 in Example 2-2 using a mass spectrometer as a detector.

Additionally, the chromatogram obtained by detecting the same sample by a mass spectrometer in the same manner as in Example 1-2 is shown in FIG. 13. From the result, it was confirmed that the peaks detected at the elution time of 4.60 minutes in the measurement described above were peaks caused by the developing solvent or the like and pseudo-peaks due to the fluctuation of the base line caused by the column and apparatus used.

(C) Anion Exchange Chromatography Measurement

Figure 14:
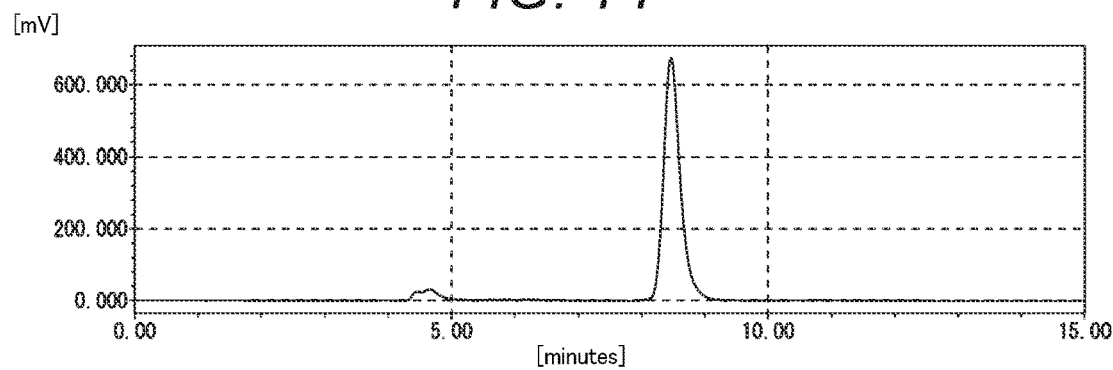
FIG. 14 is the chromatogram obtained by performing (C) anion exchange chromatography measurement for the derivatized purified product containing Compound 23 in Example 2-2.

The derivatization and measurement was performed in the same manner as in Example 1-2. The chromatogram obtained is shown in FIG. 14. The elution time at the elution start point was 8.02 minutes, the elution time at the elution end point was 9.56, the elution time at $P_{3top}$ was 8.47 minutes, and $T_3$ was 8.18 minutes. The areaB$_3$ was calculated as 60.675, the areaA$_3$ was calculated as 12484.535, and the value of areaB$_3$/areaA$_3$ was 0.00. The results are shown in Table 1.

Figure 15:
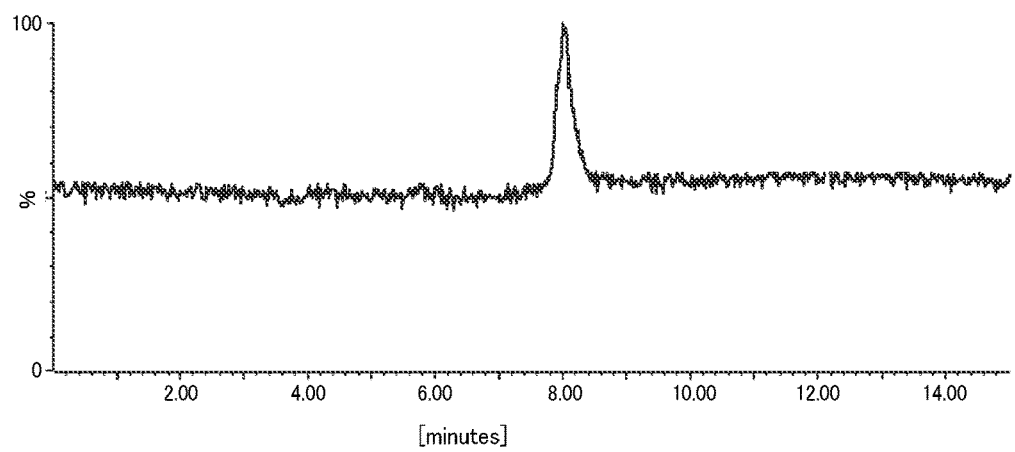
FIG. 15 is the chromatogram obtained by performing anion exchange chromatography measurement for the derivatized purified product containing Compound 23 in Example 2-2 using a mass spectrometer as a detector.

Additionally, the chromatogram obtained by measurement of the same sample using the mass spectrometer in the same manner as in Example 1-2 is shown in FIG. 15. From the result, it was confirmed that the peaks detected at the elution time from 3.90 to 5.20 minutes were peaks caused by the developing solvent or the like and pseudo-peaks due to the fluctuation of the base line caused by the column and apparatus used.

Comparative Example 1-2

For Comparative purified product 1-2 obtained in Comparative Example 1-1, (A) reverse phase chromatography measurement, (B) cation exchange chromatography measurement, and (C) anion exchange chromatography measurement were performed in the same manner as in Example 1-2.
(A) Reverse Phase Chromatography Measurement
The elution time at the elution start point was 9.10 minutes, the elution time at the elution end point was 24.23 minutes, the elution time at $P_{1top}$ was 19.31 minutes, $T_1a$ was 18.94 minutes, and $T_1b$ was 20.20 minutes. The $areaP_1$ was calculated as 11000.190, the $areaA_1$ was calculated as 12088.121, and the value of $areaP_1/areaA_1$ was 0.91. The results are shown in Table 1.
Additionally, in the measurement described above, a peak was detected at the elution time of 23.61 minutes. As a result of performing the measurement of the same sample using Alliance 2695 produced by Waters Corp. as an equipment, Quattro micro tandem type mass spectrometer produced by Waters Corp. as a detector (mass spectrometer), TSKgel ODS-80 Ts (particle diameter: 5 µm, column size: 4.6 mm×25 cm) produced by Tosoh Corp. as a column, and 5 mM ammonium acetate in methanol/distilled water=10/90 as a developing solvent, under conditions of flow rate of 0.6 mL/min, column temperature of 40° C., sample concentration of 0.01 mg/g and injection volume of 5 µL, it was confirmed that the peak detected at the elution time of 23.61 minutes described above was a peak derived from a compound in which the both terminals of Compound 9 were carboxylic acids.
(B) Cation Exchange Chromatography Measurement
The elution time at the elution start point was 3.42 minutes, the elution time at the elution end point was 6.46, the elution time at $P_{2top}$ was 5.40 minutes, and $T_2$ was 5.14 minutes. The $areaB_2$ was calculated as 442.050, the $areaA_2$ was calculated as 11051.251, and the value of $areaB_2/areaA_2$ was 0.04. The results are shown in Table 1.
Additionally, in the measurement described above, a peak was detected at the elution time of 3.97 minutes. As a result of detecting the same sample by a mass spectrometer in the same manner as in Example 1-2, it was confirmed that the peak detected at the elution time of 3.97 minutes described above was a peak derived from the compound in which the both terminals of Compound 9 were carboxylic acids.
(C) Anion Exchange Chromatography Measurement
The elution time at the elution start point was 9.55 minutes, the elution time at the elution end point was 11.99, the elution time at $P_{3top}$ was 10.37 minutes, and $T_3$ was 10.40 minutes. The $areaB_3$ was calculated as 50.414, the $areaA_3$ was calculated as 11709.544, and the value of $areaB_3/areaA_3$ was 0.00. The results are shown in Table 1.

Comparative Example 2-2

Figure 16:
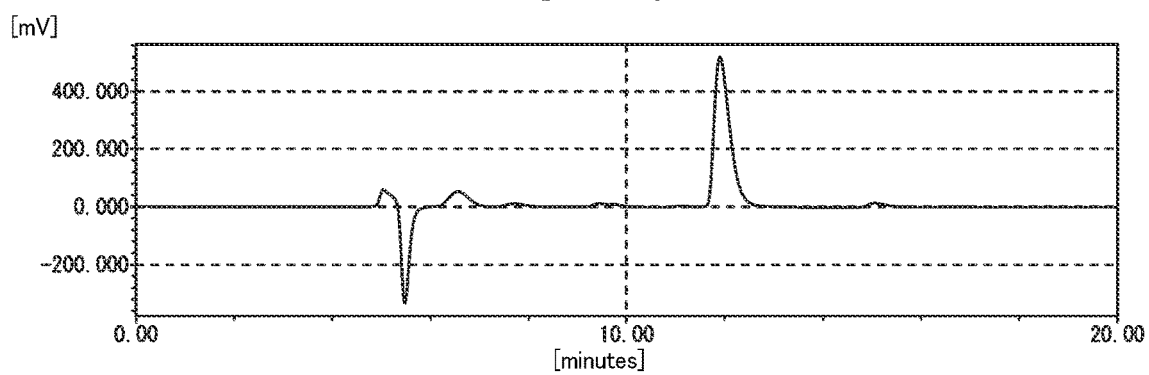
FIG. 16 is the chromatogram obtained by performing (A) reverse phase chromatography measurement for Comparative Purified Product 2 in Comparative Example 2-2.
Figure 17:
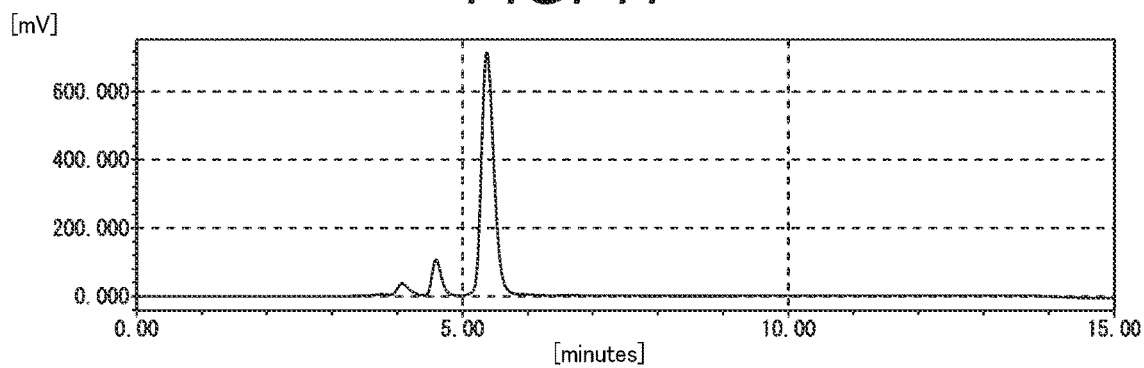
FIG. 17 is the chromatogram obtained by performing (B) cation exchange chromatography measurement for Comparative Purified Product 2 in Comparative Example 2-2.
Figure 18:
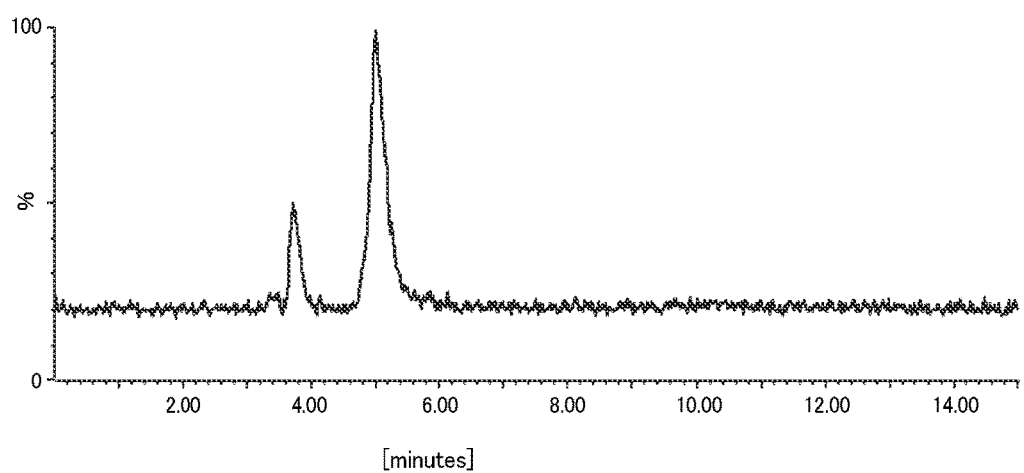
FIG. 18 is the chromatogram obtained by performing cation exchange chromatography measurement for Comparative Purified Product 2 in Comparative Example 2-2 using a mass spectrometer as a detector.
Figure 19:
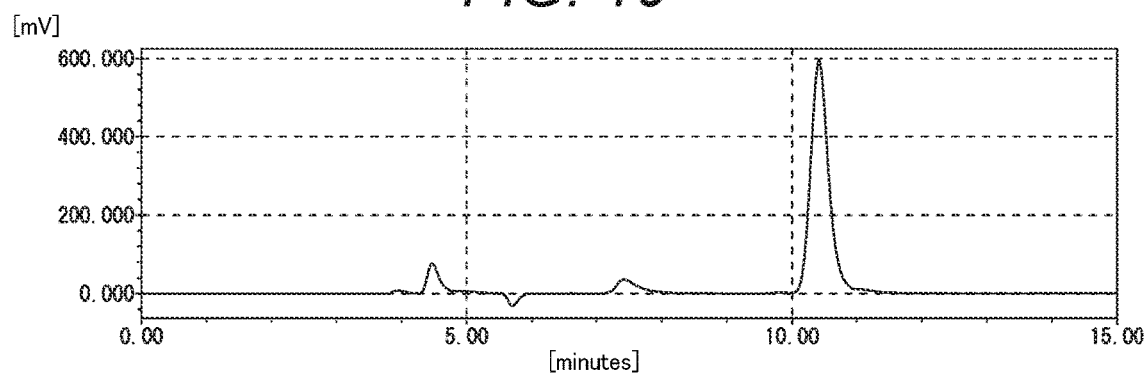
FIG. 19 is the chromatogram obtained by performing (C) anion exchange chromatography measurement for the derivatized Comparative Purified Product 2 in Comparative Example 2-2.

For Comparative purified product 2 obtained in Comparative Example 2-1, (A) reverse phase chromatography measurement, (B) cation exchange chromatography measurement, and (C) anion exchange chromatography measurement were performed in the same manner as in Example 1-2.
(A) Reverse Phase Chromatography Measurement
The chromatogram obtained is shown in FIG. 16. The elution time at the elution start point was 9.14 minutes, the elution time at the elution end point was 15.65 minutes, the elution time at $P_{1top}$ was 11.90 minutes, $T_1a$ was 11.62 minutes, and $T_1b$ was 12.45 minutes. The $areaP_1$ was calculated as 11239.879, the $areaA_1$ was calculated as 12178.507, and the value of $areaP_1/areaA_1$ was 0.92. The results are shown in Table 1.
Additionally, as a result of detecting the same sample by a mass spectrometer in the same manner as in Comparative Example 1-2, it was confirmed that the peak detected at the elution time of 15.19 minutes described above was a peak derived from a compound having a hydroxyl group in place of the amino group of Compound 13.
(B) Cation Exchange Chromatography Measurement
The chromatogram obtained is shown in FIG. 17. The elution time at the elution start point was 3.39 minutes, the elution time at the elution end point was 6.44, the elution time at $P_{2top}$ was 5.37 minutes, and $T_2$ was 5.17 minutes. The $areaB_2$ was calculated as 583.115, the $areaA_2$ was calculated as 10146.686, and the value of $areaB_2/areaA_2$ was 0.06. The results are shown in Table 1.
Further, the chromatogram obtained by detecting the same sample by a mass spectrometer in the same manner as in Example 1-2 is shown in FIG. 18. From the result, it was confirmed that the peak detected at the elution time of 4.08 minutes in the measurement described above was a peak derived from the compound having a hydroxyl group in place of the amino group of Compound 13.
(C) Anion Exchange Chromatography Measurement
The chromatogram obtained is shown in FIG. 19. The elution time at the elution start point was 9.54 minutes, the elution time at the elution end point was 12.12, the elution time at $P_{3top}$ was 10.40 minutes, and $T_3$ was 10.00 minutes. The $areaB_3$ was calculated as 120.731, the $areaA_3$ was calculated as 11006.335, and the value of $areaB_3/areaA_3$ was 0.01. The results are shown in Table 1.

Comparative Example 3-2

For Comparative purified product 3 obtained in Comparative Example 3-1, (A) reverse phase chromatography measurement, (B) cation exchange chromatography measurement, and (C) anion exchange chromatography measurement were performed in the same manner as in Example 2-2.
(A) Reverse Phase Chromatography Measurement
The elution time at the elution start point was 8.50 minutes, the elution time at the elution end point was 25.69 minutes, the elution time at $P_{1top}$ was 19.31 minutes, $T_1a$ was 18.94 minutes, and $T_1b$ was 20.19 minutes. The $areaP_1$ was calculated as 10319.256, the $areaA_1$ was calculated as 11216.583, and the value of $areaP_1/areaA_1$ was 0.92. The results are shown in Table 1.
(B) Cation Exchange Chromatography Measurement
The elution time at the elution start point was 3.13 minutes, the elution time at the elution end point was 5.92, the elution time at $P_{2top}$ was 5.30 minutes, and $T_2$ was 5.11 minutes. The $areaB_2$ was calculated as 43.769, the $areaA_2$ was calculated as 10094.224, and the value of $areaB_2/areaA_2$ was 0.04. The results are shown in Table 1.
Additionally, in the measurement described above, a peak was detected at the elution time of 3.98 minutes. As a result of detecting the same sample by a mass spectrometer in the same manner as in Example 1-2, it was confirmed that the peak detected at the elution time of 3.98 minutes described above was a peak derived from a compound having a hydroxyl group in place of the amino group of Compound 23.

(C) Anion Exchange Chromatography Measurement

The elution time at the elution start point was 3.39 minutes, the elution time at the elution end point was 9.59, the elution time at $P_{3top}$ was 8.48 minutes, and $T_3$ was 8.18 minutes. The areaB$_3$ was calculated as 116.216, the areaA$_3$ was calculated as 11639.907, and the value of areaB$_3$/areaA$_3$ was 0.01. The results are shown in Table 1.

Comparative Example 4-2

For Comparative purified product 4 obtained in Comparative Example 4-1, (A) reverse phase chromatography measurement, (B) cation exchange chromatography measurement, and (C) anion exchange chromatography measurement were performed in the same manner as in Example 1-2.

(A) Reverse Phase Chromatography Measurement

Figure 20:
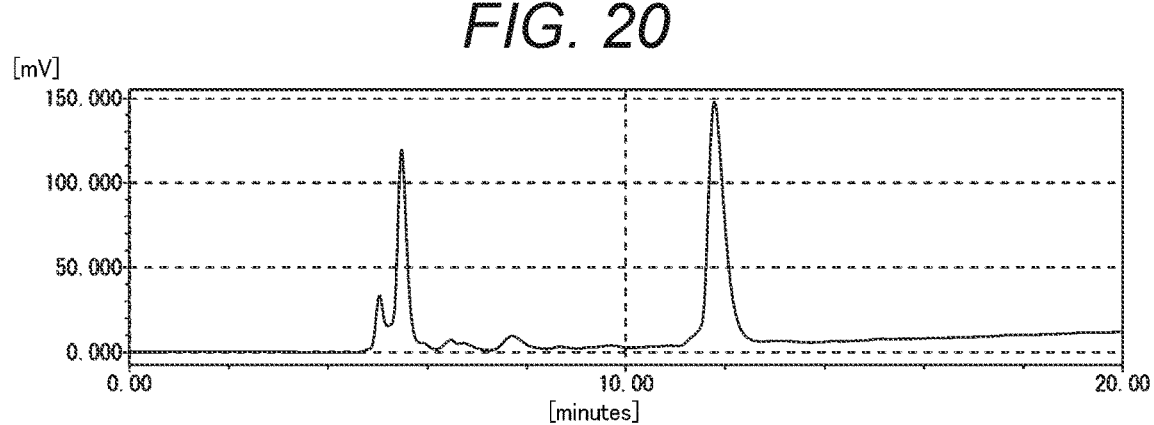
FIG. 20 is the chromatogram obtained by performing (A) reverse phase chromatography measurement for Comparative Purified Product 4 in Comparative Example 4-2.

The chromatogram obtained is shown in FIG. 20. The elution time at the elution start point was 9.03 minutes, the elution time at the elution end point was 18.24 minutes, the elution time at $P_{1top}$ was 11.78 minutes, $T_1a$ was 11.44 minutes, and $T_1b$ was 12.30 minutes. The areaP$_1$ was calculated as 3255.869, the areaA$_1$ was calculated as 3460.413, and the value of areaP$_1$/areaA$_1$ was 0.94. The results are shown in Table 1.

Additionally, as a result of detecting the same sample by a mass spectrometer in the same manner as in Comparative Example 1-2, a peak derived from a compound having a hydroxyl group in place of the carboxyl group of Compound 13 was confirmed as a forward peak overlapped with peak $P_1$.

(B) Cation Exchange Chromatography Measurement

Figure 21:
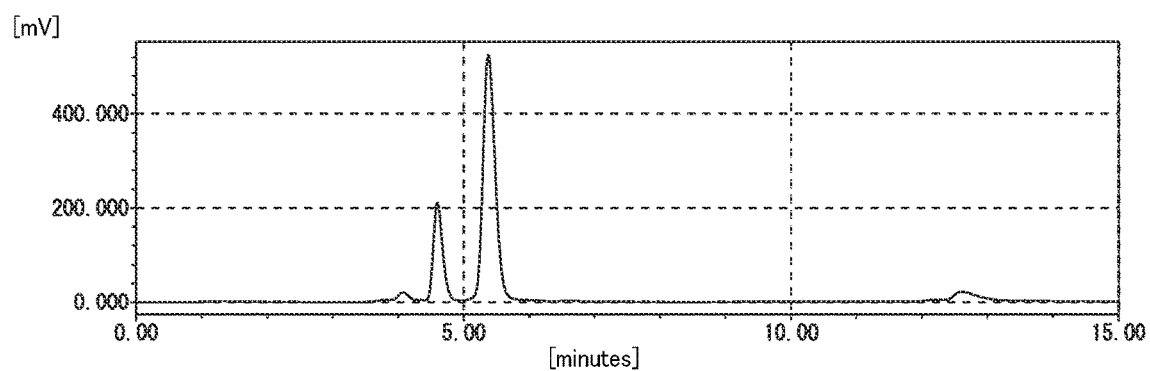
FIG. 21 is the chromatogram obtained by performing (B) cation exchange chromatography measurement for Comparative Purified Product 4 in Comparative Example 4-2.

The chromatogram obtained is shown in FIG. 21. The elution time at the elution start point was 3.56 minutes, the elution time at the elution end point was 13.70 minutes, the elution time at $P_{2top}$ was 5.34 minutes, and $T_2$ was 5.16 minutes. The areaB$_2$ was calculated as 364.429, the areaA$_2$ was calculated as 8113.224, and the value of areaB$_2$/areaA$_2$ was 0.04. The results are shown in Table 1.

Figure 22:
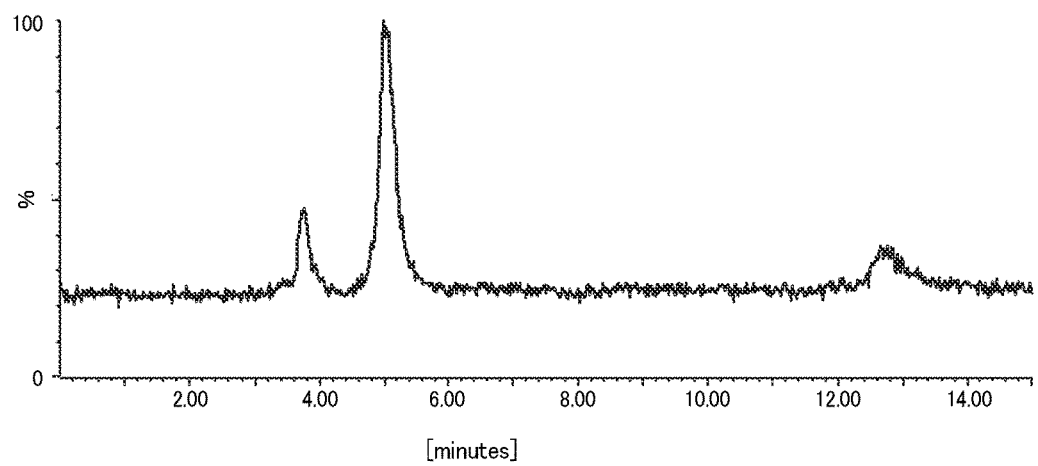
FIG. 22 is the chromatogram obtained by performing cation exchange chromatography measurement for Comparative Purified Product 4 in Comparative Example 4-2 using a mass spectrometer as a detector.

Further, the chromatogram obtained by detecting the same sample by a mass spectrometer in the same manner as in Example 1-2 is shown in FIG. 22. From the result, it was confirmed that the peaks detected at the elution time of 4.60 minutes in the measurement described above were peaks caused by the developing solvent or the like and pseudo-peaks due to the fluctuation of the base line caused by the column and apparatus used.

(C) Anion Exchange Chromatography Measurement

Figure 23:
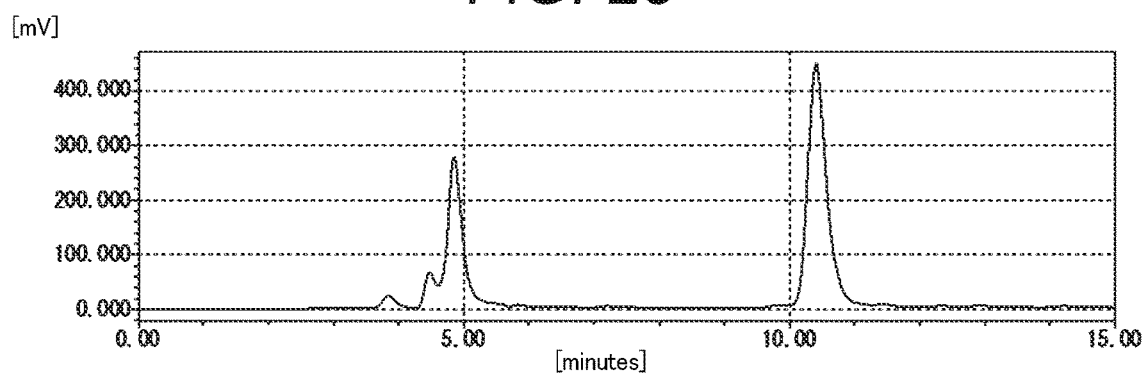
FIG. 23 is the chromatogram obtained by performing (C) anion exchange chromatography measurement for the derivatized Comparative Purified Product 4 in Comparative Example 4-2.

The chromatogram obtained is shown in FIG. 23. The elution time at the elution start point was 3.50 minutes, the elution time at the elution end point was 11.27, the elution time at $P_{3top}$ was 10.41 minutes, and $T_3$ was 10.08 minutes. The areaB$_3$ was calculated as 449.532, the areaA$_3$ was calculated as 9572.405, and the value of areaB$_3$/areaA$_3$ was 0.05. The results are shown in Table 1.

Figure 24:
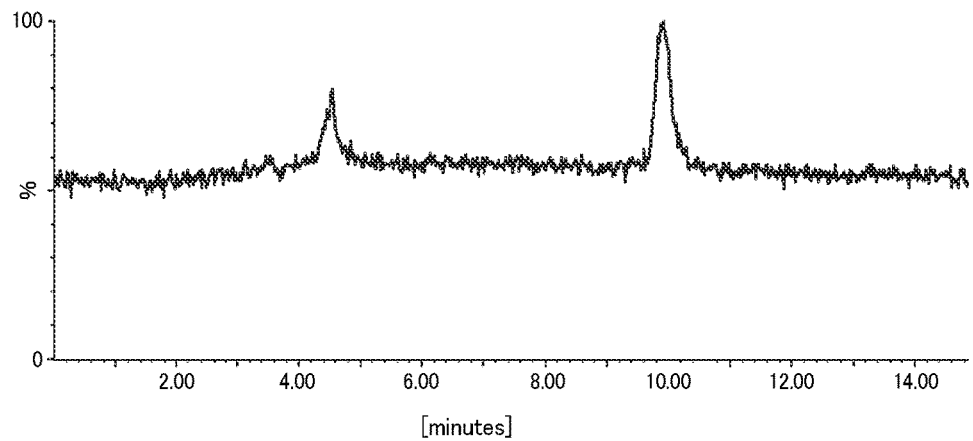
FIG. 24 is the chromatogram obtained by performing anion exchange chromatography measurement for the derivatized Comparative Purified Product 4 in Comparative Example 4-2 using a mass spectrometer as a detector.

Further, the chromatogram obtained by detecting the same sample by a mass spectrometer in the same manner as in Example 1-2 is shown in FIG. 24. From the result, it was confirmed that the peaks detected at the elution time from 4.30 to 5.70 minutes in the measurement described above were peaks caused by the developing solvent or the like and pseudo-peaks due to the fluctuation of the base line caused by the column and apparatus used, and that the peak detected at the elution time of 3.83 was a peak derived from a compound obtained by derivatizing a compound having a hydroxyl group in place of the carboxyl group of Compound 13.

Comparative Example 5

(A) Reverse phase chromatography measurement, (B) cation exchange chromatography measurement, and (C) anion exchange chromatography measurement were performed in the same manner as in Example 1-2 except for using commercially available Polyethylene glycol 1 (Amino-dPEGR8-acid, trade name, produced by Wako Pure Chemical Industries, Ltd.) containing Compound 13 in place of the purified product containing Compound 13 obtained in Example 1-1.

(A) Reverse Phase Chromatography Measurement

Figure 25:
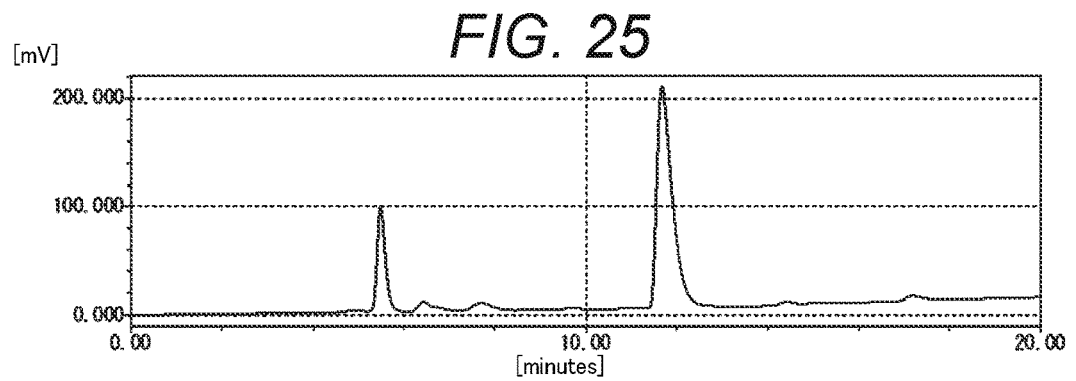
FIG. 25 is the chromatogram obtained by performing (A) reverse phase chromatography measurement for Polyethylene Glycol 1 in Comparative Example 5.

The chromatogram obtained is shown in FIG. 25. The elution time at the elution start point was 9.45 minutes, the elution time at the elution end point was 17.80 minutes, the elution time at $P_{1top}$ was 11.68 minutes, $T_1a$ was 11.43 minutes, and $T_1b$ was 12.27 minutes. The areaP$_1$ was calculated as 4719.533, the areaA$_1$ was calculated as 5044.844, and the value of areaP$_1$/areaA$_1$ was 0.94. The results are shown in Table 1.

(B) Cation Exchange Chromatography Measurement

Figure 26:
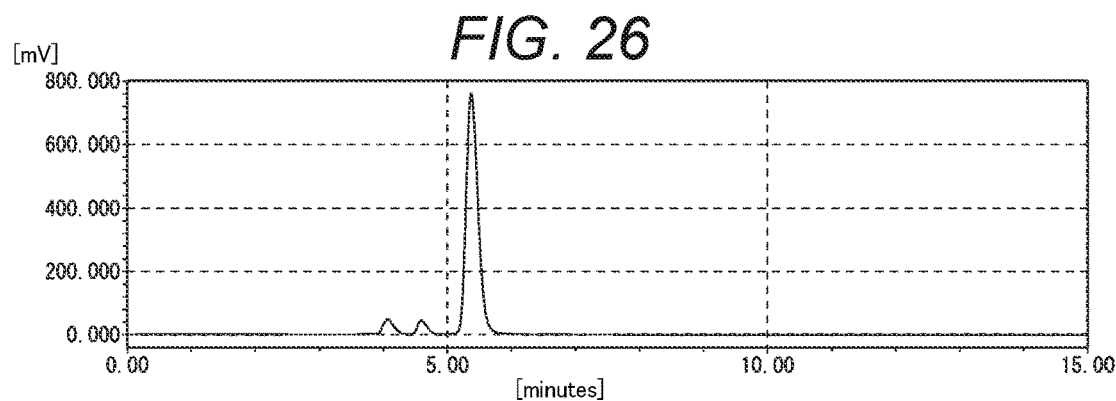
FIG. 26 is the chromatogram obtained by performing (B) cation exchange chromatography measurement for Polyethylene Glycol 1 in Comparative Example 5.

The chromatogram obtained is shown in FIG. 26. The elution time at the elution start point was 3.56 minutes, the elution time at the elution end point was 5.97, the elution time at $P_{2top}$ was 5.34 minutes, and $T_2$ was 5.17 minutes. The areaB$_2$ was calculated as 631.391, the areaA$_2$ was calculated as 10590.395, and the value of areaB$_2$/areaA$_2$ was 0.06. The results are shown in Table 1.

Figure 27:
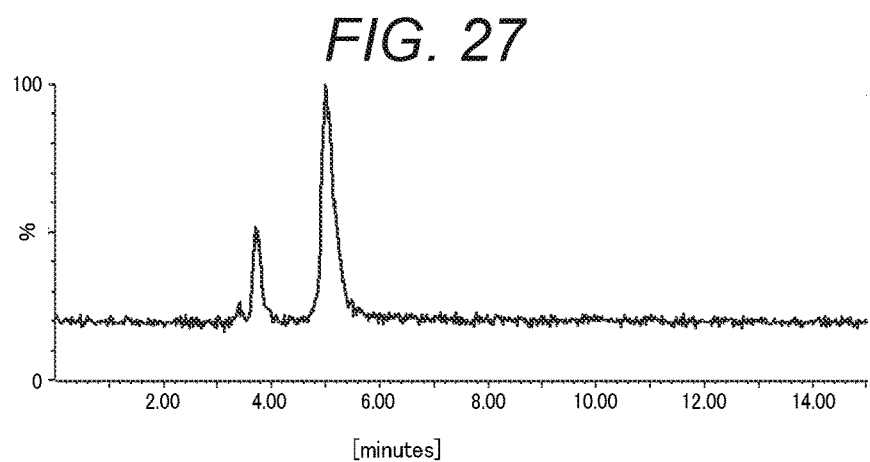
FIG. 27 is the chromatogram obtained by performing cation exchange chromatography measurement for Polyethylene Glycol 1 in Comparative Example 5 using a mass spectrometer as a detector.

Further, the chromatogram obtained by detecting the same sample by a mass spectrometer in the same manner as in Example 1-2 is shown in FIG. 27. From the result, it was confirmed that the peaks detected at the elution time of 4.60 minutes in the measurement described above were peaks caused by the developing solvent or the like and pseudo-peaks due to the fluctuation of the base line caused by the column and apparatus used.

(C) Anion Exchange Chromatography Measurement

Figure 28:
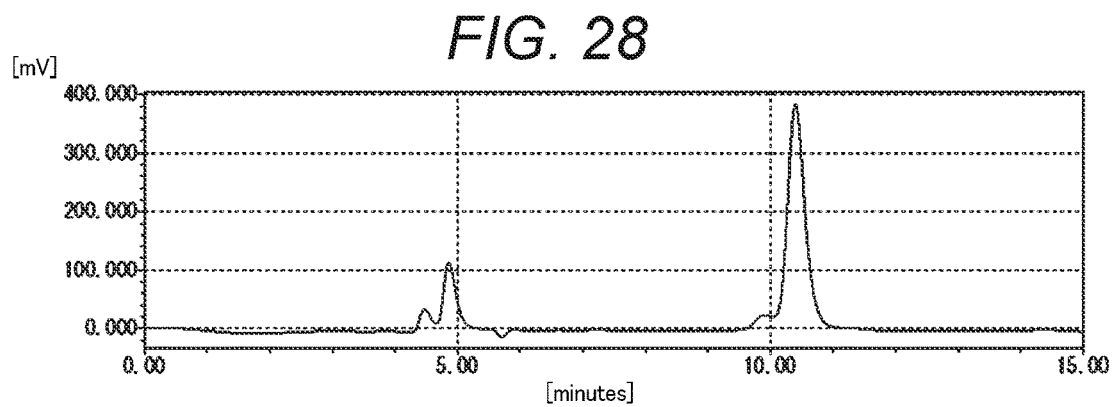
FIG. 28 is the chromatogram obtained by performing (C) anion exchange chromatography measurement for the derivatized Polyethylene Glycol 1 in Comparative Example 5.

The chromatogram obtained is shown in FIG. 28. The elution time at the elution start point was 3.72 minutes, the elution time at the elution end point was 11.35, the elution time at $P_{3top}$ was 10.40 minutes, and $T_3$ was 10.40 minutes. The areaB$_3$ was calculated as 511.882, the areaA$_3$ was calculated as 8378.781, and the value of areaB$_3$/areaA$_3$ was 0.06. The results are shown in Table 1.

Figure 29:
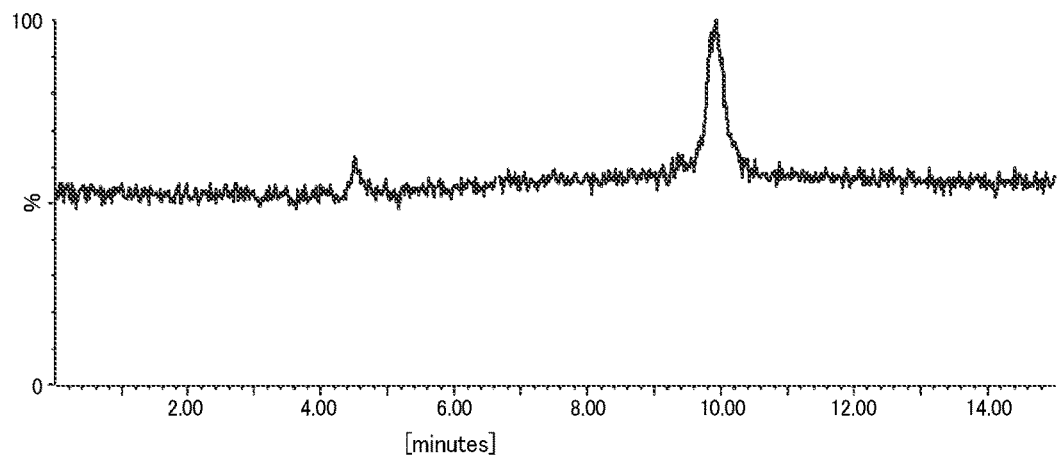
FIG. 29 is the chromatogram obtained by performing anion exchange chromatography measurement for the derivatized Polyethylene Glycol 1 in Comparative Example 5 using a mass spectrometer as a detector.

Further, the chromatogram obtained by detecting the same sample by a mass spectrometer in the same manner as in Example 1-2 is shown in FIG. 29. From the result, it was confirmed that the peaks detected at the elution time from 4.30 to 5.30 minutes in the measurement described above were peaks caused by the developing solvent or the like and pseudo-peaks due to the fluctuation of the base line caused by the column and apparatus used.

Comparative Example 6

(A) Reverse phase chromatography measurement, (B) cation exchange chromatography measurement, and (C) anion exchange chromatography measurement were performed in the same manner as in Example 2-2 except for using commercially available Polyethylene glycol 2 (Amino-dPEGR12-acid, trade name, produced by Wako Pure Chemical Industries, Ltd.) containing Compound 23 in place of the purified product containing Compound 23 obtained in Example 2-1.

(A) Reverse Phase Chromatography Measurement

Figure 30:
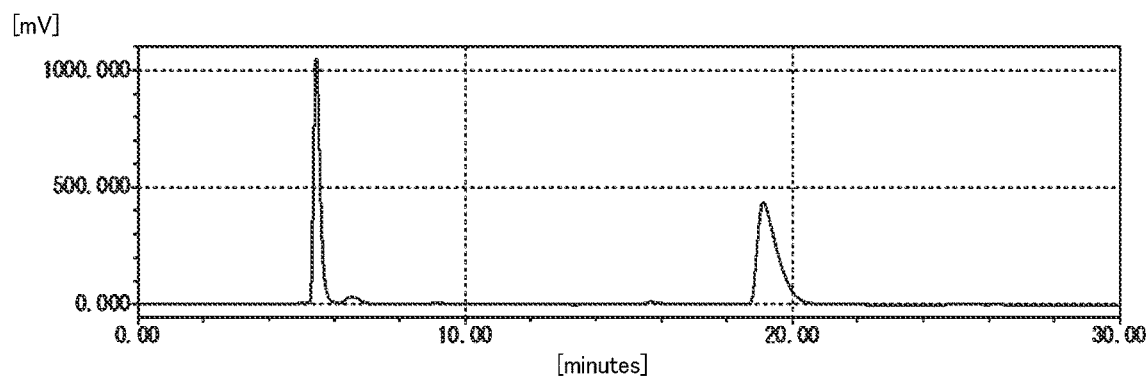
FIG. 30 is the chromatogram obtained by performing (A) reverse phase chromatography measurement for Polyethylene Glycol 2 in Comparative Example 6.

The chromatogram obtained is shown in FIG. 30. The elution time at the elution start point was 8.90 minutes, the elution time at the elution end point was 25.36 minutes, the elution time at $P_{1top}$ was 19.11 minutes, $T_1a$ was 18.72 minutes, and $T_1b$ was 20.18 minutes. The area$P_1$ was calculated as 17977.875, the area$A_1$ was calculated as 18751.068, and the value of area$P_1$/area$A_1$ was 0.96. The results are shown in Table 1.

(B) Cation Exchange Chromatography Measurement

Figure 31:
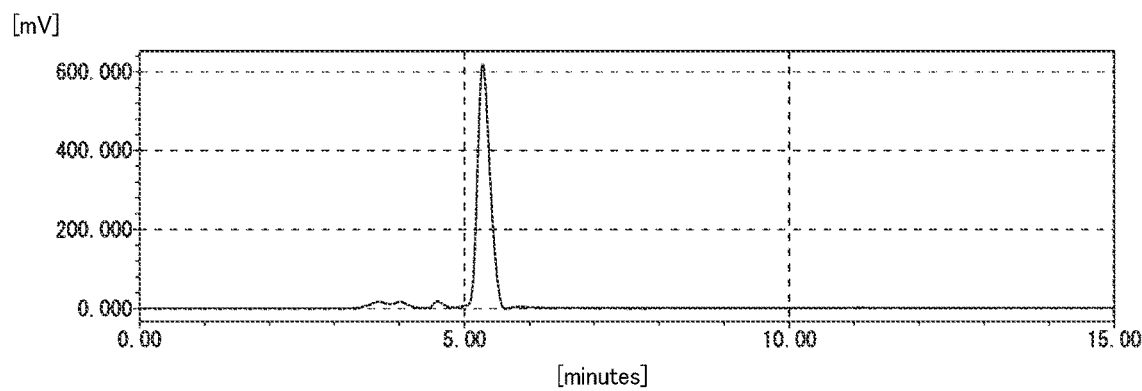
FIG. 31 is the chromatogram obtained by performing (B) cation exchange chromatography measurement for Polyethylene Glycol 2 in Comparative Example 6.

The chromatogram obtained is shown in FIG. 31. The elution time at the elution start point was 3.29 minutes, the elution time at the elution end point was 25.36, the elution time at $P_{2top}$ was 5.28 minutes, and $T_2$ was 5.09 minutes. The area$B_2$ was calculated as 600.199, the area$A_2$ was calculated as 9111.849, and the value of area$B_2$/area$A_2$ was 0.07. The results are shown in Table 1.

Figure 32:
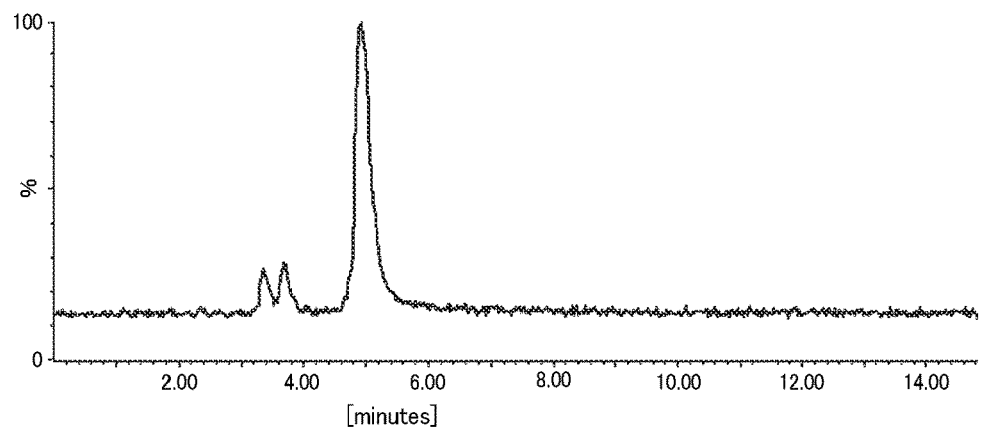
FIG. 32 is the chromatogram obtained by performing cation exchange chromatography measurement for Polyethylene Glycol 2 in Comparative Example 6 using a mass spectrometer as a detector.

Further, the chromatogram obtained by detecting the same sample by a mass spectrometer in the same manner as in Example 2-2 is shown in FIG. 32. From the result, it was confirmed that the peaks detected at the elution time of 4.60 minutes in the measurement described above were peaks caused by the developing solvent or the like and pseudo-peaks due to the fluctuation of the base line caused by the column and apparatus used.

(C) Anion Exchange Chromatography Measurement

Figure 33:
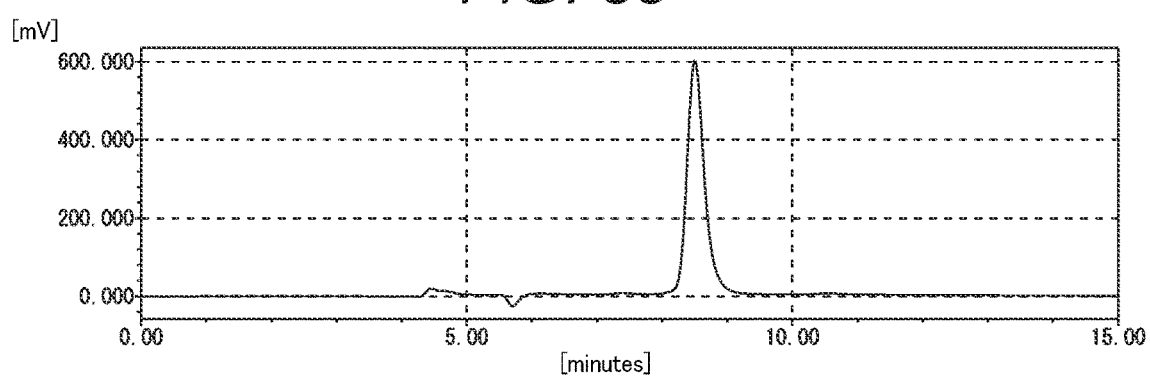
FIG. 33 is the chromatogram obtained by performing (C) anion exchange chromatography measurement for the derivatized Polyethylene Glycol 2 in Comparative Example 6.

The chromatogram obtained is shown in FIG. 33. The elution time at the elution start point was 7.90 minutes, the elution time at the elution end point was 9.46 minutes, the elution time at $P_{3top}$ was 8.50 minutes, and $T_3$ was 8.22 minutes. The area$B_3$ was calculated as 92.903, the area$A_3$ was calculated as 11168.932, and the value of area$B_3$/area$A_3$ was 0.01. The results are shown in Table 1.

Figure 34:
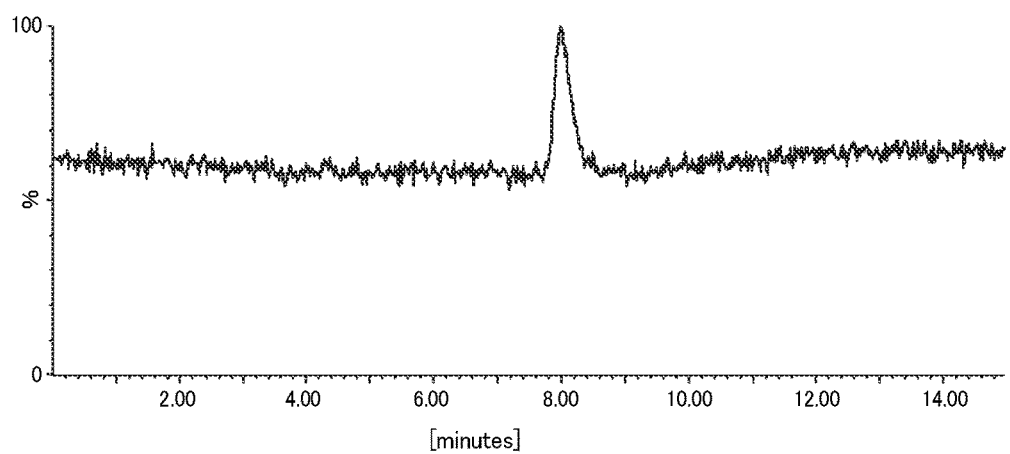
FIG. 34 is the chromatogram obtained by performing anion exchange chromatography measurement for the derivatized Polyethylene Glycol 2 in Comparative Example 6 using a mass spectrometer as a detector.

Further, the chromatogram obtained by detecting the same sample by a mass spectrometer in the same manner as in Example 2-2 is shown in FIG. 34. From the result, it was confirmed that the peaks detected at the elution time from 4.30 to 5.10 minutes in the measurement described above were peaks caused by the developing solvent or the like and pseudo-peaks due to the fluctuation of the base line caused by the column and apparatus used.

TABLE 1

|  |  | area$P_1$/ area$A_1$ | area$B_2$/ area$A_2$ | area$B_3$/ area$A_3$ |
|---|---|---|---|---|
| Example 1-1 | Purified Product Containing Compound 13 | 0.94 | 0.00 | 0.00 |
| Example 2-2 | Purified Product Containing Compound 23 | 0.95 | 0.00 | 0.00 |
| Comparative Example 1-2 | Comparative Purified Compound 1 | 0.91 | 0.04 | 0.00 |
| Comparative Example 2-2 | Comparative Purified Compound 2 | 0.92 | 0.06 | 0.01 |
| Comparative Example 3-2 | Comparative Purified Compound 3 | 0.92 | 0.04 | 0.01 |
| Comparative Example 4-2 | Comparative Purified Compound 4 | 0.94 | 0.04 | 0.05 |
| Comparative Example 5 | Polyethylene Glycol 1 | 0.94 | 0.06 | 0.06 |
| Comparative Example 6 | Polyethylene Glycol 2 | 0.96 | 0.07 | 0.01 |

From the results described above, it was confirmed that in the samples used in Comparative Examples 1-2 to 6 (the purified products obtained in Comparative Examples 1-1 to 4-1 and commercially available Polyethylene Glycols 1 to 2), the value of area$B_2$/area$A_2$ was greater than 0.02 and the compounds having no amino group were mixed as impurities. Further, it was confirmed that in the samples used in Comparative Examples 4-2 to 5 (the purified products obtained in Comparative Example 4-1 and commercially available Polyethylene Glycol 1), the value of area$B_3$/area$A_3$ was greater than 0.02 and the compounds having no carboxyl group were mixed as impurities.

Example 1-3

For the purified product containing Compound 8 obtained in Synthesis Example I-4 of Example 1-1, (D) reverse phase chromatography measurement was performed.

(D) Reverse Phase Chromatography Measurement

The reverse phase chromatography measurement was performed using build GPC system HLC-8220 produced by Tosoh Corp. as an equipment, RI-8020 produced by Tosoh Corp. as a detector (differential refractometer), TSKgel ODS-80 Ts (particle diameter: 5 μm, column size: 4.6 mm×25 cm) produced by Tosoh Corp. as a column, and 5 mM ammonium acetate in methanol/distilled water=50/50 as a developing solvent, under conditions of flow rate of 0.6 mL/min, column temperature of 40° C., sample concentration of 0.2 mg/g and injection volume of 40 μL.

Figure 35:
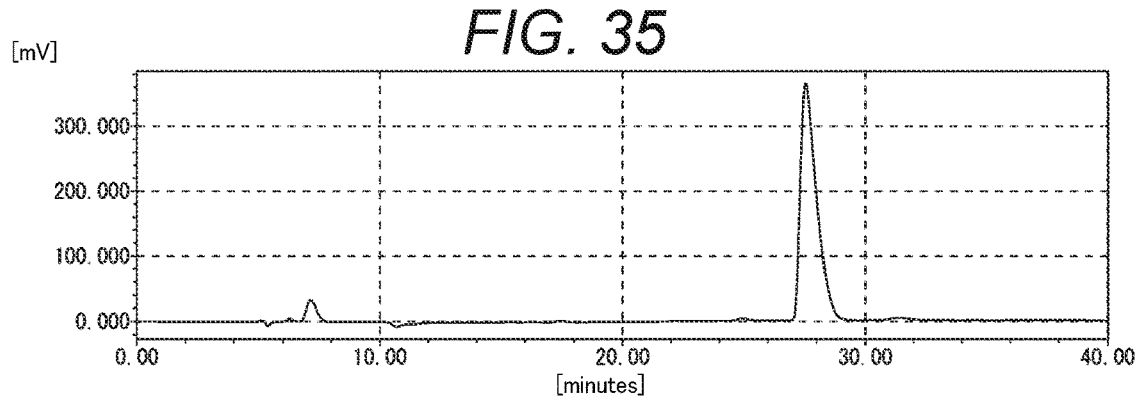
FIG. 35 is the chromatogram obtained by performing (D) reverse phase chromatography measurement for the purified product containing Compound 8 in Example 1-3.

The chromatogram obtained is shown in FIG. 35. The elution time at the elution start point was 15.00 minutes, the elution time at the elution end point was 32.38 minutes, the elution time at $P_{4top}$ was 27.57 minutes, $T_4a$ was 27.13 minutes, and $T_4b$ was 28.63 minutes. The area$P_4$ was calculated as 16481.986, the area$A_4$ was calculated as 17130.905, and the value of area$P_4$/area$A_4$ was 0.96.

Figure 36:
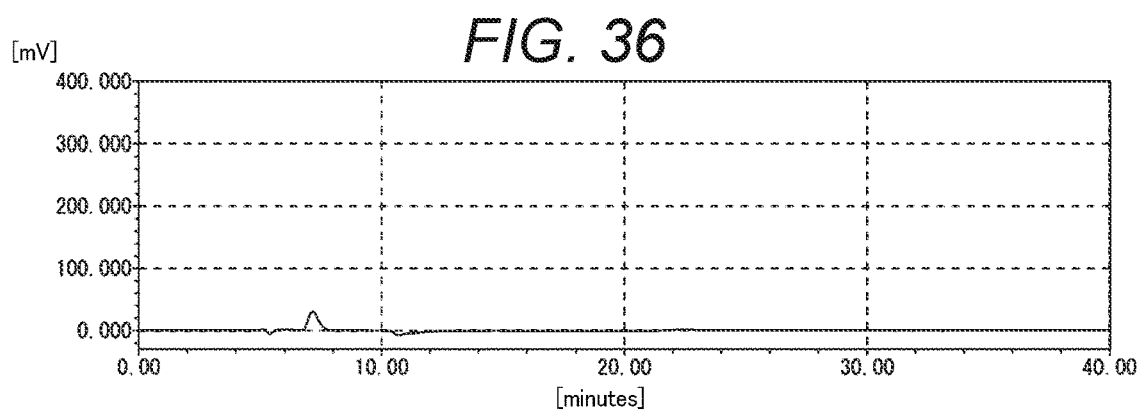
FIG. 36 is the chromatogram obtained by performing reverse phase chromatography measurement for the developing solvent in Example 1-3.

Additionally, the chromatogram obtained by performing injection of only the developing solvent containing no sample and measuring under the same conditions is shown in FIG. 36. From the result, it was confirmed that the peaks detected before the elution time of 10.50 minutes in the measurement described above were peaks caused by the developing solvent or the like and pseudo-peaks due to the fluctuation of the base line caused by the column and apparatus used.

Example 2-3

For the purified product containing Compound 18 obtained in Synthesis Example III-4 of Example 2-1, (D) reverse phase chromatography measurement was performed.

(D) Reverse Phase Chromatography Measurement

Figure 37:
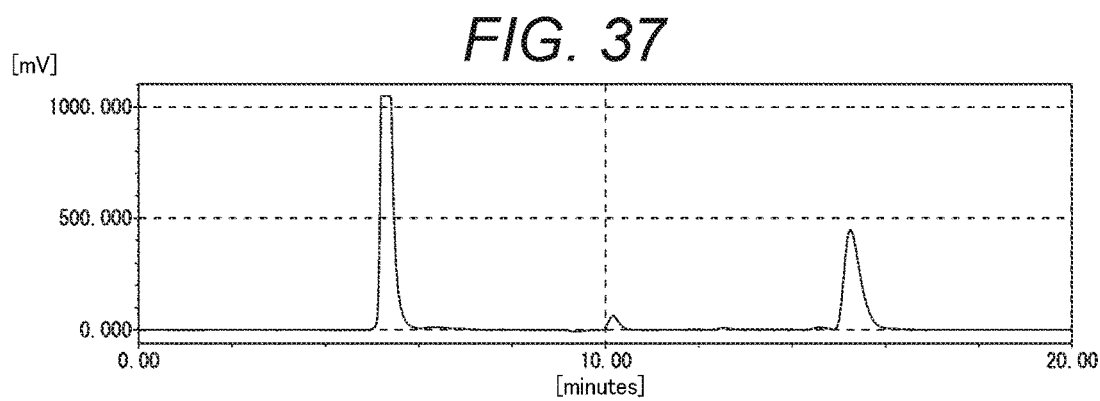
FIG. 37 is the chromatogram obtained by performing (D) reverse phase chromatography measurement for the purified product containing Compound 18 in Example 2-3.

The measurement was performed in the same manner as in Example 1-3 except for changing the developing solution to 5 mM ammonium acetate in methanol/distilled water=60/40. The chromatogram obtained is shown in FIG. 37. The elution time at the elution start point was 12.01 minutes, the elution time at the elution end point was 16.34 minutes, the elution time at $P_{4top}$ was 15.24 minutes, $T_4a$ was 14.96 minutes, and $T_4b$ was 15.78 minutes. The area$P_4$ was calculated as 10898.672, the area$A_4$ was calculated as 11427.921, and the value of area$P_4$/area$A_4$ was 0.95.

Further, as a result of performing injection of only the developing solvent containing no sample and measuring under the same conditions, it was confirmed that the peaks detected before the elution time of 10.50 minutes in the measurement described above were peaks caused by the developing solvent or the like and pseudo-peaks due to the fluctuation of the base line caused by the column and apparatus used.

Comparative Example 1-3

For Comparative purified product 1-1 obtained in Comparative Example 1-1, (D) reverse phase chromatography measurement was performed in the same manner as in Example 1-3.

(D) Reverse Phase Chromatography Measurement

Figure 38:
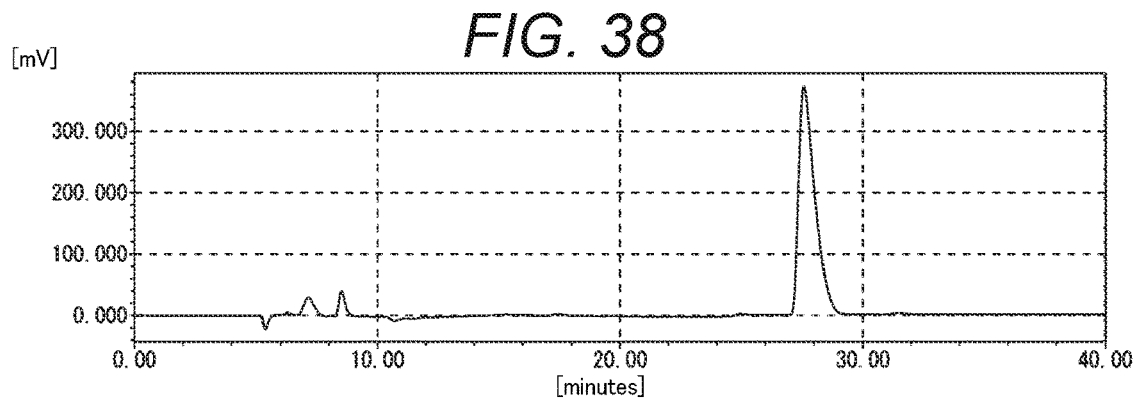
FIG. 38 is the chromatogram obtained by performing (D) reverse phase chromatography measurement for Comparative Purified Product 1-1 in Comparative Example 1-3.

The chromatogram obtained is shown in FIG. 38. The elution time at the elution start point was 8.20 minutes, the elution time at the elution end point was 32.02 minutes, the elution time at $P_{4top}$ was 27.59 minutes, $T_4a$ was 27.16 minutes, and $T_4b$ was 28.66 minutes. The area$P_4$ was calculated as 16677.178, the area$A_4$ was calculated as 18301.775, and the value of area$P_4$/area$A_4$ was 0.91.

Additionally, the same sample was measured using Alliance 2695 produced by Waters Corp. as an equipment, Quattro micro tandem type mass spectrometer produced by Waters Corp. as a detector (mass spectrometer), TSKgel ODS-80 Ts (particle diameter: 5 μm, column size: 4.6 mm×25 cm) produced by Tosoh Corp. as a column, and 5 mM ammonium acetate in methanol/distilled water=10/90 as a developing solvent, under conditions of flow rate of 0.6 mL/min, column temperature of 40° C., sample concentration of 0.01 mg/g and injection volume of 5 μL. From the result, it was confirmed that the peak detected at the elution time of 8.52 minutes in the measurement described above was a peak derived from Compound 9.

Example 3

Synthesis of Compound 27 Represented by Formula (12) Wherein a is 8, Atomic Group X is Atomic Group Containing Maleimide Group, and Atomic Group Y is Atomic Group Containing Active Ester Group

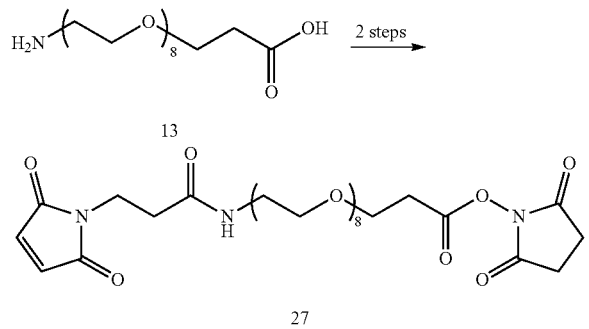

Compound 27 was synthesized according to the reaction route shown in the formula above. That is, first, the purified product containing Compound 13 (Compound 13: 1.00 g, 2.26 mmol) obtained in Example 1-1 was dissolved in 10 mL of acetonitrile, to the solution were added 3-maleimidopropionic acid N-succinimidyl (0.56 g, 2.49 mmol) and triethylamine (0.275 g, 2.72 mmol) and the mixture was stirred at room temperature for 3 hours. After 3 hours, the consumption of Compound 13 was confirmed by ESI-MS measurement and the reaction solution was concentrated under a reduced pressure. To the residue was added 10 mL of 0.1M aqueous sodium hydroxide solution and the aqueous solution was extracted 3 times with 10 mL of dichloromethane. To the organic layer was added sodium sulfate to dry, followed by filtration. The filtrate was concentrated under a reduced pressure to obtain 1.21 g of a reaction product containing a maleimidated compound as colorless transparent liquid.

Subsequently, the reaction product was dissolved in 5 mL of DMF and to the solution were added 1-(3-dimethylaminopropyl)-3-ethylcarbodiimide hydrochloride (0.47 g, 2.45 mmol) and N-hydroxysuccinimide (0.23 g, 2.45 mmol) and the mixture was stirred at room temperature for 18 hours. After 18 hours, the consumption of the maleimidated compound was confirmed by ESI-MS measurement, 15 mL of ethyl acetate was added and the organic layer was washed twice with 10 mL of 1M hydrochloric acid and twice with 10 mL of saturated brine. To the organic layer was added sodium sulfate to dry, followed by filtration. The filtrate was concentrated under a reduced pressure to obtain a purified product containing Compound 27 as colorless transparent liquid.

Yield: 1.20 g

MS (ESI$^+$): Compound 27 707.4 [M+NH$_4$]$^+$ $^1$H-NMR (CDCl$_3$, 400 MHz): 6.67 (s, 2H), 3.80 (m, 4H), 3.60 (m, 28H), 3.49 (t, 2H), 3.37 (m, 2H), 2.86 (t, 2H), 2.80 (s, 4H), 2.46 (t, 2H)

Example 4

Synthesis of Compound 28 Represented by Formula (12) Wherein a is 12, Atomic Group X is Atomic Group Containing Iodoacetamide Group, and Atomic Group Y is Atomic Group Containing Carboxyl Group

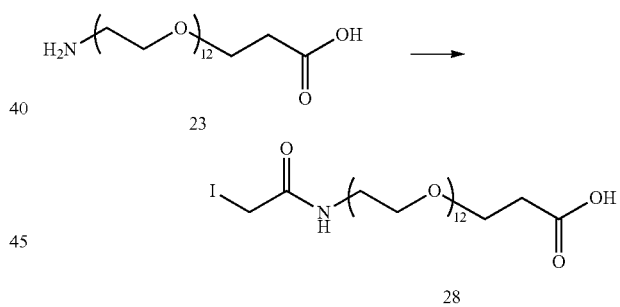

Compound 28 was synthesized according to the reaction route shown in the formula above. That is, in an eggplant-shaped flask were charged the purified product containing Compound 23 (Compound 23: 1.00 g, 1.62 mmol) obtained in Example 2-1, triethylamine (0.18 g, 1.78 mmol) and dichloromethane (8 mL) to be dissolved. The mixed solution was cooled to 0° C. and di(iodoacetic) anhydride (0.63 g, 1.78 mmol) dissolved in dichloromethane (2 mL) was added dropwise thereto over 10 minutes. After the completion of the dropwise addition, the reaction mixed solution was warmed to room temperature and allowed to react in the dark for 18 hours. The consumption of Compound 23 was confirmed by ESI-MS measurement, and the reaction mixed solution was washed once with 5 mL of an aqueous saturated sodium bicarbonate solution and twice with 5 mL of saturated brine. To the organic layer was added sodium sulfate to dry, followed by filtration. The filtrate was concentrated under a reduced pressure to obtain a purified product containing Compound 28 as pale yellow colored transparent liquid.

Yield: 1.16 g

MS (ESI$^+$): Compound 28 803.4 [M+NH$_4$]$^+$, 410.5 [M+2NH$_4$]$^{2+}$ $^1$H-NMR (CDCl$_3$, 400 MHz): 8.07 (s, 1H), 7.23 (br s, 1H), 3.79 (t, 2H), 3.74 (s, 2H), 3.61 (m, 46H), 3.48 (m, 2H), 2.56 (t, 2H)

Example 5

Synthesis of Compound 29 Represented by Formula (12) Wherein a is 12, Atomic Group X is Atomic Group Containing Alkynyl Group, and Atomic Group Y is Atomic Group Containing Carboxyl Group

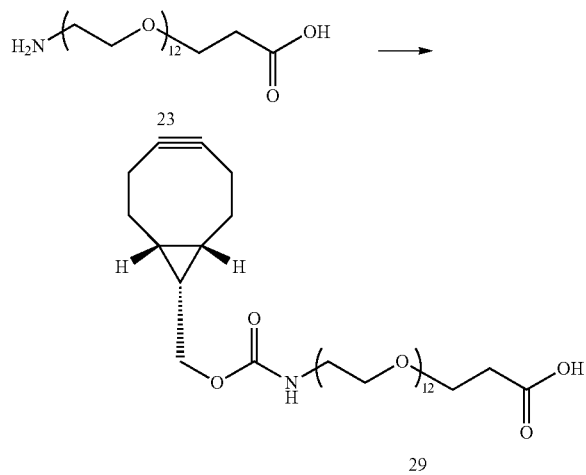

Compound 29 was synthesized according to the reaction route shown in the formula above. That is, in an eggplant-shaped flask were charged the purified product containing Compound 23 (Compound 23: 1.00 g, 1.62 mmol) obtained in Example 2-1, triethylamine (0.18 g, 1.78 mmol) and dichloromethane (8 mL) to be dissolved. The mixed solution was cooled to 0° C. and (1R, 8S, 9s)-bicyclo[6.1.0]non-4-yn-9-ylmethyl N-succinimidyl carbonate (0.52 g, 1.78 mmol) dissolved in dichloromethane (2 mL) was added dropwise thereto over 10 minutes. After the completion of the dropwise addition, the reaction mixed solution was warmed to room temperature and allowed to react for 5 hours. The disappearance of the (1R, 8S, 9s)-bicyclo[6.1.0]non-4-yn-9-ylmethyl N-succinimidyl carbonate was confirmed by ESI-MS measurement, and the reaction mixed solution was washed twice with 5 mL of 1M hydrochloric acid and twice with saturated brine. To the organic layer was added sodium sulfate to dry, followed by filtration. The filtrate was concentrated under a reduced pressure to obtain a purified product containing Compound 29 as white colored transparent liquid.

Yield: 1.16 g

MS (ESI$^+$): Compound 29 811.6 [M+NH$_4$]$^+$, 414.8 [M+2NH$_4$]$^{2+}$ $^1$H-NMR (CDCl$_3$, 400 MHz): 5.24 (br s, 1H), 4.14 (d, 2H), 3.79 (t, 2H), 3.65 (m, 44H), 3.56 (t, 2H), 3.33 (m, 2H), 2.56 (t, 2H), 2.25 (m, 6H), 1.60 (m, 2H), 1.35 (m, 1H), 0.95 (m, 2H)

While the invention has been described in detail and with reference to specific embodiments thereof, it will be apparent to those skilled in the art that various changes and modifications can be made therein without departing from the spirit and scope of the invention. This application is based on a Japanese patent application filed on Jun. 30, 2015 (Japanese Patent Application No. 2015-131744), and the whole contents thereof are incorporated herein by reference. Also, all the references cited herein are incorporated as a whole.

INDUSTRIAL APPLICABILITY

As described above, according to the invention, it is possible to provide a hetero type monodispersed polyethylene glycol containing as a main component, a compound which has an amino group and a carboxyl group at both terminals respectively and in which the ethylene glycol chain length is the same in particularly high purity. Therefore, since the hetero type monodispersed polyethylene glycol of the invention has a feature of the small content of a compound having a different ethylene glycol chain length and a compound having a different terminal functional group, in the case of using it as a linker material for ADC, a problem on the production of ADC or a problem on the drug application caused by the compound having a different ethylene glycol chain length is small, and generation of by-products which have no efficacy as drug, for example, a compound in which two drugs are conjugated, a compound in which two antibodies are conjugated or a compound in which a drug or an antibody is not conjugated caused by the compound having a different terminal functional group, in the production of ADC can be sufficiently suppressed.

Further, the production method of the hetero type monodispersed polyethylene glycol of the invention is a production method particularly suitable for industrialization because it makes the production of the hetero type monodispersed polyethylene glycol of high purity possible only by separatory extraction without using silica gel column chromatography or the like.

The invention claimed is:

1. A method for producing a hetero monodispersed polyethylene glycol comprising a compound represented by the following formula (1):

(1)

wherein, in the formula (1), a represents an integer from 6 to 40, the method comprising:

step A of obtaining a compound represented by the following formula (5) by Michael addition reaction of a compound represented by the following formula (3) with a compound represented by the following formula (4) under temperature condition of 5° C. or less:

(3)

wherein, in the formula (3), Ts represents a tosyl group, and a represents an integer from 6 to 40,

(4)

wherein, in the formula (4), R$^1$ represents a hydrocarbon group having from 1 to 6 carbon atoms,

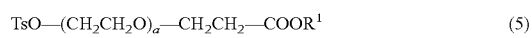

(5)

wherein, in the formula (5), Ts represents a tosyl group, $R^1$ represents a hydrocarbon group having from 1 to 6 carbon atoms, and a represents an integer from 6 to 40;

step B of obtaining a compound represented by the following formula (6) by a reaction of the compound represented by the formula (5) with potassium phthalimide:

$$PI-(CH_2CH_2O)_a-CH_2CH_2-COOR^1 \qquad (6)$$

wherein, in the formula (6), PI represents a phthalimido group, $R^1$ represents a hydrocarbon group having from 1 to 6 carbon atoms, and a represents an integer from 6 to 40;

step C of obtaining a compound represented by the following formula (7) by dephthalimidation of the compound represented by the formula (6):

$$H_2N-(CH_2CH_2O)_a-CH_2CH_2-COOR^1 \qquad (7)$$
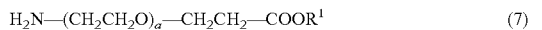

wherein, in the formula (7), $R^1$ represents a hydrocarbon group having from 1 to 6 carbon atoms, and a represents an integer from 6 to 40; and step D of obtaining the hetero monodispersed polyethylene glycol comprising the compound represented by the formula (1) by subjecting a reaction product comprising the compound represented by the formula (7) obtained in the step C to separatory extraction treatment and acid hydrolysis treatment.

2. The method for producing a hetero monodispersed polyethylene glycol as claimed in claim 1, wherein
a in each of the formulae (3) and (5) to (7) is an integer from 6 to 10,
the step D is a step of performing the acid hydrolysis treatment after the separatory extraction treatment,
the separatory extraction treatment is a treatment including washing step (w1) of performing an acid washing treatment in which the reaction product comprising the compound represented by the formula (7) is dissolved in an aqueous acidic solution and the solution is subjected to separatory washing with an organic solvent and after the washing step (w1), extraction step (e1) of performing separatory extraction of the compound represented by the formula (7), and
the acid hydrolysis treatment is a treatment of obtaining the hetero monodispersed polyethylene glycol comprising the compound represented by the formula (1) by acid hydrolysis of the compound represented by the formula (7).

3. The method for producing a hetero monodispersed polyethylene glycol as claimed in claim 1, wherein
a in each of the formulae (3) and (5) to (7) is an integer from 11 to 40,
the step D is a step of performing the separatory extraction treatment after the acid hydrolysis treatment,
the acid hydrolysis treatment is a treatment of obtaining a reaction product comprising the compound represented by the formula (1) by acid hydrolysis of the compound represented by the formula (7) in the reaction product, and
the separatory extraction treatment is a treatment including washing step (w2) of performing an acid washing treatment in which the reaction product comprising the compound represented by the formula (1) is dissolved in an aqueous acidic solution and the solution is subjected to separatory washing with an organic solvent and a base washing treatment in which the reaction product comprising the compound represented by the formula (1) is dissolved in an aqueous basic solution and the solution is subjected to separatory washing with an organic solvent and after the washing step (w2), extraction step (e2) of performing separatory extraction of the hetero e monodispersed polyethylene glycol comprising the compound represented by the formula (1).

4. A method for producing an intermediate for production of a hetero monodispersed polyethylene glycol, the intermediate comprising a compound represented by the following formula (3):

$$TsO-(CH_2CH_2O)_a-H \qquad (3)$$

wherein, in the formula (3), Ts represents a tosyl group, and a represents an integer from 6 to 40, the method comprising:

step a of obtaining a compound represented by the following formula (10) by subjecting a compound represented by the following formula (8) and a compound represented by the following formula (9) to a nucleophilic substitution reaction so as to satisfy a condition represented by the following formula (F5):

$$HO-(CH_2CH_2O)_b-H \qquad (8)$$

wherein, in the formula (8), b represents an integer from 3 to 37, $$LO-(CH_2CH_2O)_c-R^2 \qquad (9)$$

wherein, in the formula (9), L represents a tosyl group or a mesyl group, $R^2$ represents a trityl group or a benzyl group, and c represents an integer from 3 to 37, $$6 \leq b+c \leq 40 \qquad (F5)$$

wherein, in the formula (F5), b represents b in the formula (8), and c represents c in the formula (9)

$$HO-(CH_2CH_2O)_a-R^2 \qquad (10)$$

wherein, in the formula (10), $R^2$ represents a trityl group or a benzyl group, and a represents an integer from 6 to 40;

step b of obtaining a compound represented by the following formula (11) by tosylation of the compound represented by the formula (10):

$$TsO-(CH_2CH_2O)_a-R^2 \qquad (11)$$

wherein, in the formula (11), Ts represents a tosyl group, $R^2$ represents a trityl group or a benzyl group, and a represents an integer from 6 to 40;

step c of obtaining the compound represented by the formula (3) by detritylation or debenzylation of the compound represented by the formula (11); and step d of obtaining the intermediate for production of the hetero monodispersed polyethylene glycol by performing purification of the reaction product comprising the compound represented by the formula (3) obtained in the step c.

5. The method for producing a hetero monodispersed polyethylene glycol as claimed in claim 1, wherein, (A) when the hetero monodispersed polyethylene glycol is separated by using reverse phase chromatography, on a chromatogram detected by a differential refractometer, when a straight line connecting from an elution start point to an elution end point is taken as $baseL_1$, a total peak area derived from polyethylene glycol above the $baseL_1$ is taken as $areaA_1$, a height of a top $P_{1top}$ of a maximum refractive index difference peak $P_1$ from the $baseL_1$ is taken as $P_{1top}H$, on an elution curve on the $P_1$ directed from the elution start point to the $P_{1top}$, a straight line connecting a point where a height from the baseL$_1$ is ¼ of the P$_{1top}$H with a point where a height from the baseL$_1$ is ¾ of the P$_{1top}$H is taken as P$_1$L$_a$, an elution time at which the P$_1$L$_a$ and the baseL$_1$ are crossed is taken as T$_1$a, on an elution curve on the P$_1$ directed from the P$_{1top}$ to the elution end point, a straight line connecting a point where a height from baseL$_1$ is ¼ of the P$_{1top}$H with a point where a height from baseL$_1$ is ¾ of the P$_{1top}$H is taken as P$_1$L$_b$, an elution time at which the P$_1$L$_b$ and the baseL$_1$ are crossed is taken as T$_1$b, and a peak area between T$_1$a and T$_1$b above the baseL$_1$ is taken as areaP$_1$, the areaA$_1$ and the areaP$_1$ satisfy a condition represented by the following formula (F1):

$$\text{areaP}_1/\text{areaA}_1 \geq 0.90 \tag{F1},$$

(B) when the hetero monodispersed polyethylene glycol is separated by using cation exchange chromatography, on a chromatogram detected by a differential refractometer, when a straight line connecting from an elution start point to an elution end point is taken as baseL$_2$, a total peak area derived from polyethylene glycol above the baseL$_2$ is taken as areaA$_2$, a height of a top P$_{2top}$ of a maximum refractive index difference peak P$_2$ from the baseL$_2$ is taken as P$_{2top}$H, on an elution curve on the P$_2$ directed from the elution start point to the P$_{2top}$, a straight line connecting a point where a height from the baseL$_2$ is ½ of the P$_{2top}$H with a point where a height from the baseL$_2$ is ⅛ of the P$_{2top}$H is taken as P$_2$L, an elution time at which the P$_2$L and the baseL$_2$ are crossed is taken as T$_2$, and a peak area between the elution start point and T$_2$ above the baseL$_2$ is taken as areaB$_2$, the areaB$_2$ and the areaA$_2$ satisfy a condition represented by the following formula (F2):

$$\text{areaB}_2/\text{areaA}_2 \leq 0.02 \tag{F2},$$

and (C) when the hetero monodispersed polyethylene glycol comprising the compound represented by the formula (1) is derivatized to form a mixture comprising a compound represented by the following formula (2):

$$\text{tBoc-NH}—(\text{CH}_2\text{CH}_2\text{O})_a—\text{CH}_2\text{CH}_2\text{COOH} \tag{2}$$

wherein, in the formula (2), tBoc represents a tert-butoxycarbonyl group, and a represents an integer from 6 to 40, and the mixture is separated by using anion exchange chromatography, on a chromatogram detected by a differential refractometer, when a straight line connecting from an elution start point to an elution end point is taken as baseL$_3$, a total peak area derived from polyethylene glycol above the baseL$_3$ is taken as areaA$_3$, a height of a top P$_{3top}$ of a maximum refractive index difference peak P$_3$ from the baseL$_3$ is taken as P$_{3top}$H, on an elution curve on the P$_3$ directed from the elution start point to the P$_{3top}$, a straight line connecting a point where a height from the baseL$_3$ is ½ of the P$_{3top}$H with a point where a height from the baseL$_3$ is ⅛ of the P$_{3top}$H is taken as P$_3$L, an elution time at which the P$_3$L and the baseL$_3$ are crossed is taken as T$_3$, and a peak area between the elution start point and T$_3$ above the baseL$_3$ is taken as areaB$_3$, the areaB$_3$ and the areaA$_3$ satisfy a condition represented by the following formula (F3):

$$\text{areaB}_3/\text{areaA}_3 \leq 0.02 \tag{F3}.$$

6. The method for producing an intermediate for production of a hetero monodispersed polyethylene glycol as claimed in claim 4, wherein (D) when the intermediate is separated by using reverse phase chromatography, on a chromatogram detected by a differential refractometer, when a straight line connecting from an elution start point to an elution end point is taken as baseL$_4$, a total peak area derived from polyethylene glycol above the baseL$_4$ is taken as areaA$_4$, a height of a top P$_{4top}$ of a maximum refractive index difference peak P$_4$ from the baseL$_4$ is taken as P$_{4top}$H, on an elution curve on the P$_4$ directed from the elution start point to the P$_{4top}$, a straight line connecting a point where a height from the baseL$_4$ is ¼ of the P$_{4top}$H with a point where a height from the baseL$_4$ is ¾ of the P$_{4top}$H is taken as P$_4$L$_a$, an elution time at which the P$_4$L$_a$ and the baseL$_4$ are crossed is taken as T$_4$a, on an elution curve on the P$_4$ directed from the P$_{4top}$ to the elution end point, a straight line connecting a point where a height from baseL$_1$ is ¼ of the P$_{4top}$H with a point where a height from baseL$_4$ is ¾ of the P$_{4top}$H is taken as P$_4$L$_b$, an elution time at which the P$_4$L$_b$ and the baseL$_4$ are crossed is taken as T$_4$b, and a peak area between T$_4$a and T$_4$b above the baseL$_4$ is taken as areaP$_4$, the areaA$_4$ and the areaP$_4$ satisfy a condition represented by the following formula (F4):

$$\text{areaP}_4/\text{areaA}_4 \geq 0.92 \tag{F4}.$$

* * * * *